(12) United States Patent
Bandara et al.

(10) Patent No.: US 10,635,088 B1
(45) Date of Patent: Apr. 28, 2020

(54) HOLLOW TOPOLOGY GENERATION WITH LATTICES FOR COMPUTER AIDED DESIGN AND MANUFACTURING

(71) Applicant: Autodesk, Inc., San Rafael, CA (US)

(72) Inventors: Konara Mudiyanselage Kosala Bandara, Beckenham (GB); Karl Darcy Daniel Willis, San Bruno, CA (US); Andrew John Harris, London (GB); Andriy Banadyga, Uxbridge (GB); Adrian Adam Thomas Butscher, Toronto (CA); Hooman Shayani, Longfield (GB)

(73) Assignee: Autodesk, Inc., San Rafael, CA (US)

( * ) Notice: Subject to any disclaimer, the term of this patent is extended or adjusted under 35 U.S.C. 154(b) by 0 days.

(21) Appl. No.: 16/256,954

(22) Filed: Jan. 24, 2019

Related U.S. Application Data

(60) Provisional application No. 62/758,404, filed on Nov. 9, 2018.

(51) Int. Cl.
*G05B 19/4099* (2006.01)
*B29C 64/393* (2017.01)
(Continued)

(52) U.S. Cl.
CPC ........ *G05B 19/4099* (2013.01); *B29C 64/393* (2017.08); *G05B 19/182* (2013.01); *G06F 30/23* (2020.01); *G05B 2219/35167* (2013.01)

(58) Field of Classification Search
CPC .. G06F 17/50; G06F 17/5018; G05B 19/4099
See application file for complete search history.

(56) References Cited

U.S. PATENT DOCUMENTS 9,081,920 B2 7/2015 Yamada et al.
9,789,651 B2 * 10/2017 Musuvathy .......... B29O 64/386
(Continued)

FOREIGN PATENT DOCUMENTS

WO   WO 2017/186786   11/2017

OTHER PUBLICATIONS

Dakshnamoorthy, Vignesh. Automated Lattice Optimization of Hinge Fitting with Displacement Constraint. Diss. 2016. https://rc.library.uta.edu/uta-ir/handle/10106/26381 (Year: 2016).*
(Continued)

*Primary Examiner* — Dwin M Craig
*Assistant Examiner* — David A Hopkins
(74) *Attorney, Agent, or Firm* — Fish & Richardson P.C.

(57) ABSTRACT

Methods, systems, and apparatus, including medium-encoded computer program products, for computer aided design of physical structures using generative design processes, where three dimensional (3D) models of the physical structures are produced to include lattices and hollows, include: obtaining design criteria for an object; iteratively modifying 3D topology and shape(s) for the object using a generative design process that represents the 3D topology as one or more boundaries between solid(s) and void(s), in combination with physical simulation(s) with a hollow structure and a lattice representation; adjusting a thickness of the hollow structure; adjusting lattice thickness or density; and providing a 3D model of the generative design for the object for use in manufacturing a physical structure corresponding to the object using one or more computer-controlled manufacturing systems. The providing can include generating instructions for manufacturing machine (s), which can employ various manufacturing systems and techniques, including additive, subtractive and casting manufacturing methods.

30 Claims, 20 Drawing Sheets

(51) Int. Cl.
G05B 19/18 (2006.01)
G06F 30/23 (2020.01)

(56) References Cited

U.S. PATENT DOCUMENTS

| 2011/0270587 | A1* | 11/2011 | Yamada | G06F 17/5018 703/1 |
|---|---|---|---|---|
| 2018/0345647 | A1 | 12/2018 | Morris et al. | |
| 2018/0349531 | A1 | 12/2018 | Morris et al. | |

OTHER PUBLICATIONS

Jin, Yuan, Jianke Du, and Yong He. "Optimization of process planning for reducing material consumption in additive manufacturing." Journal of Manufacturing Systems 44 (2017): 65-78. (Year: 2017).*
James, Kai A., Edmund Lee, and Joaquim RRA Martins. "Stress-based topology optimization using an isoparametric level set method." Finite Elements in Analysis and Design 58 (2012): 20-30. (Year: 2012).*
Gardan, Nicolas, and Alexandre Schneider. "Topological optimization of internal patterns and support in additive manufacturing." Journal of Manufacturing Systems 37 (2015): 417-425. (Year: 2015).*
Mirzendehdel, Amir M., Behzad Rankouhi, and Krishnan Suresh. "Strength-based topology optimization for anisotropic parts." Additive Manufacturing 19 (2018): 104-113. (Year: 2018).*
Wang, Yiqiang, et al. "Design of graded lattice structure with optimized mesostructures for additive manufacturing." Materials & Design 142 (2018): 114-123. (Year: 2018).*
Jin, Yu-an, Yong He, and Jian-zhong Fu. "Support generation for additive manufacturing based on sliced data." The International Journal of Advanced Manufacturing Technology80.9-12 (2015): 2041-2052. (Year: 2015).*
Frémond, Michel. "Shape change and deformation." Meccanica 51.12 (2016): 2949-2955. (Year: 2016).*
van Dijk, Nico P., et al. "Level-set methods for structural topology optimization: a review." Structural and Multidisciplinary Optimization 48.3 (2013): 437-472. (Year: 2013).*
McMillan, Matthew, et al. "Programmatic lattice generation for additive manufacture." Procedia Technology 20 (2015): 178-184. (Year: 2015).*
Munteanu, Camelia Elena, et al. "Structural optimization of space components adapted for 3D printing.";Annals of DAAAM & Proceedings;(2018): 0821-826. (Year: 2018).*
Merriam Webster Dictionary, Accessed online on Oct. 8, 2019, Definition of "Define" (Year: 2019).*
Merriam Webster Dictionary, Accessed online on Oct. 8, 2019, Definition of "Express" (Year: 2019).*
Merriam Webster Dictionary, Accessed online on Oct. 8, 2019, Definition of "in accordance with" (Year: 2019).*
Arisoy, Erhan Batuhan, et al. "Design and topology optimization of lattice structures using deformable implicit surfaces for additive manufacturing." ASME 2015 international design engineering technical conferences and computers and information in engineering conference. (Year: 2015).*
Wang, Jidong, et al. "Cost-effective printing of 3D objects with self-supporting property." The Visual Computer 35.5 (2019): 639-651. (Year: 2019).*
Allaire et al., "Shape Optimization by the Homogenization Method," Numerische Mathematik, 76(1):27-68, 1997.
Allaire et al., "Structural Optimization Using Sensitivity Analysis and a Level-set Method," J. Comput. Phys., Feb. 2004, 194(1):363-393.
Aremu et al., "A Voxel-based Method of Constructing and Skinning Conformal and Functionally Graded Lattice Structures Suitable for Additive Manufacturing," Additive Manufacturing, 13:1-13, 2017.
Bendsoe, "Optimal Shape Design as a Material Distribution Problem," Structural Optimization, 1(4):193-202, 1989.

Bendsoe and Kikuchi, "Generating Optimal Topologies in Structural Design Using a Homogenization Method," Computer Methods in Applied Mechanics and Engineering, 71(2):197-224, 1988.
Butscher et al., U.S. Appl. No. 62/515,231, "Subtractive Manufacturing Constraint for Level Set Topology Optimization," filed Jun. 5, 2017, 22 pages.
Chen et al., "Topology Optimization for Manufacturability Based on the Visibility Map," Computer-Aided Design and Applications, 13(1):86-94, 2016.
Cheng et al., "Coupling Lattice Structure Topology Optimization with Design-dependent Feature Evolution for Additive Manufactured Heat Conduction Design," Computer Methods in Applied Mechanics and Engineering, 332:408-439, 2018.
Cheng et al., "Efficient Design Optimization of Variable-density Cellular Structures for Additive Manufacturing: Theory and Experimental Validation," Rapid Prototyping Journal, 23(4):660-677, 2017.
Chu et al., "Design for Additive Manufacturing of Cellular Structures," Computer-Aided Design and Applications, 5(5):686-696, 2008.
Cignoni et al., "A Comparison of Mesh Simplification Algorithms," Computers & Graphics, 22(1):37-54, 1998.
Deshpande et al., "Effective Properties of the Octet-truss Lattice Material," Journal of the Mechanics and Physics of Solids, 49(8):1747-1769, 2001.
Eschenauer et al., "Bubble Method for Topology and Shape Optimization of Structures," Structural Optimization, 8(1):42-51, 1994.
Eschenauer and Olhoff, "Topology Optimization of Continuum Structures: a Review," Applied Mechanics Reviews, 54(4):331, 2001.
Gallagher, "Fully Stressed Design," Optimum Structural Design, © 1973 John Wiley & Sons Ltd., pp. 19-32.
Gibou et al., "A Review of Level-set Methods and Some Recent Applications," Journal of Computational Physics, 353:82-109, 2018.
Guest and Zhu, "Casting and Milling Restrictions in Topology Optimization via Projection-based Algorithms," Proceedings of the ASME 2012 International Design Engineering Conferences & Computers and Information in Engineering Conference, Aug. 12-15, 2012, Chicago, IL, U.S.A., 8 pages.
Heckbert and Garland, "Survey of Polygonal Surface Simplification Algorithms," Technical Report, Carnegie Mellon University, 1997, 32 pages.
Ikeya et al., "Multi-objective Free-form Optimization for Shape and Thickness of Shell Structures with Composite Materials," Jun. 2015, [online] (retrieved from http://web.aeromech.usyd.edu.au/WCSMO2015/papers/1084_paper.pdf), 6 pages.
Lavars, "Under Armour's 3D-printed Shoes Bring Computer Designer to Heel," (Mar. 7 2016) [online] (retrieved from https://newatlas.com/under-armour-3d-printed-shoes/42193/), 3 pages.
Liu and Ma, "3D Level-set Topology Optimization: a Machining Feature-based Approach," Structural and Multidisciplinary Optimization, 52(3):563-582, 2015.
Liu and Ma, "A Survey of Manufacturing Oriented Topology Optimization Methods," Advances in Engineering Software, 100:161-175, 2016.
Liu et al., "Current and Future Trends in Topology Optimization for Additive Manufacturing," (Apr. 13, 2018) [online] (retrieved from https://www.researchgate.net/profile/Andrew_Gaynor/publication/324932012_Current_and_future_trends_in_topology_optimization_for_additive_manufacturing/links/5af49b46a6fdcc0c030af548/Current-and-future-trends-in-topology-optimization-for-additive-manufacturing.pdf), 28 pages.
Lu et al., "Build-to-Last: Strength to Weight 3D Printed Objects," (Oct. 11, 2018) [online] (retrieved from http://citeseerx.ist.psu.edu/viewdoc/download?doi=10.1.1.704.6282&rep=rep1&type=pdf) 10 pages.
Museth, "VDB: High-resolution Sparse Volumes with Dynamic Topology," ACM Transactions on Graphics (TOG), 32(3)(27):1-22, 2013.
Nakayama and Shimoda, "Shape-topology Optimization for Designing Shell Structures," in VII European Congress on Computational Methods in Applied Sciences and Engineering, Jun. 2016, 10 pages.

(56) References Cited

OTHER PUBLICATIONS

Nocedal and Wright, "Numerical Optimization," table of contents and pp. 339-341, 490-527, and 539-544, © 1999 Springer-Verlag New York, Inc.

Osher and Fedkiw, "Level Set Methods and Dynamic Implicit Surfaces," Applied Mathematical Science, vol. 153, Chapters 1-10, Springer, New York, N.Y., 2003.

Osher and Sethian, "Fronts Propagating with Curvature-dependent Speed: Algorithms Based on Hamilton-Jacobi Formulations," Journal of Computational Physics, 79(1):12-49, 1988.

Panesar et al., "Strategies for Functionally Graded Lattice Structures Derived Using Topology Optimisation for Additive Manufacturing," Additive Manufacturing, 19:81-94, 2018.

Patnaik and Hopkins, "Optimality of a Fully Stressed Design," May 1998, National Aeronautics and Space Administration, (Nov. 7, 2018) [online] (retrieved from https://ntrs.nasa.gov/archive/nasa/casi.ntrs.nasa.gov/19980148007.pdf), 16 pages.

Pérez, "Level Set Method Applied to Topology Optimization," Feb. 2012, Grupo de Optimización Estructural (GOE), 24 pages.

Rhodes, "So Algorithms Are Designing Chairs Now," (Oct. 3, 2016) [online] (retrieved from https://www.wired.com/2016/10/elbo-chair-autodesk-algorithm/), 4 pages.

Schumacher et al., "Microstructures to Control Elasticity in 3D Printing," ACM Transactions on Graphics (TOG), Aug. 2015, 34(4):136, 15 pages.

Sethian and Wiegmann, "Structural Boundary Design via Level Set and Immersed Interface Methods," Journal of Computational Physics, 163(2):489-528, 2000.

Sigmund and Maute, "Topology Optimization Approaches: a Comparative Review," Structural and Multidisciplinary Optimization, 48(6):1031-1055, 2013.

Svanberg, "The Method of Moving Asymptotes—a New Method for Structural Optimization," International Journal for Numerical Methods in Engineering, 24(2):359-373, 1987.

Tamburrino et al., "The Design Process of Additive Manufactured Mesoscale Lattice Structures: a Review," Journal of Computing and Information Science in Engineering, 18:040801-1-040801-16, 2018.

Tang et al., "Bidirectional Evolutionary Structural Optimization (BESO) Based Design Method for Lattice Structure to Be Fabricated by Additive Manufacturing," Computer-Aided Design, 69:91-101, 2015.

Vatanabe et al., "Topology Optimization with Manufacturing Constraints: a Unified Projection-based Approach," Advances in Engineering Software, 100:97-112, 2016.

Wang et al., "A Level Set Method for Structural Topology Optimization," Computer Methods in Applied Mechanics and Engineering, 192:227-246, 2003.

Wang et al., "Cost-effective Printing of 3D Objects with Skin-frame Structures," (2013) [online] (retrieved from http://staff.ustc.edu.cn/~lgliu/Projects/2013_SigAsia_3DPrinting/default.htm), 6 pages.

Wang et al., "Cross Section-based Hollowing and Structural Enhancement," (May 16, 2017) [online] (retrieved from http://staff.ustc.edu.cn/~lgliu/Publications/Publications/2017-TVC-CGI2017-CrossSection.pdf), 12 pages.

Wang et al., "Design of Graded Lattice Structure with Optimized Mesostructures for Additive Manufacturing," Materials and Design, 142:114-123, 2018.

Wang et al., "Support-free Hollowing," IEEE Transactions on Visualization and Computer Graphics, Oct. 2018, 24(10):2787-2798.

Wang and Kang, "Structural Shape and Topology Optimization of Cast Parts Using Level Set Method," International Journal for Numerical Methods in Engineering, 111(13):1252-1273, 2017.

Wu et al., "Infill Optimization for Additive Manufacturing—Approaching Bone-like Porous Structures," (Nov. 19, 2016) [online] (retrieved from https://arxiv.org/pdf/1608.04366.pdf), 14 pages.

Xia et al., "A Level Set Based Method for the Optimization of Cast Part," Structural and Multidisciplinary Optimization, 41(5):735-747, 2010.

Zegard and Paulino, "Bridging Topology Optimization and Additive Manufacturing," Structural and Multidisciplinary Optimization, 53(1):175-192, 2016.

\* cited by examiner

HOLLOW TOPOLOGY GENERATION WITH LATTICES FOR COMPUTER AIDED DESIGN AND MANUFACTURING

CROSS-REFERENCE TO RELATED APPLICATIONS

This application claims the benefit under 35 U.S.C. § 119(e) of U.S. Patent Application No. 62/758,404, entitled "MACROSTRUCTURE TOPOLOGY GENERATION WITH DISPARATE PHYSICAL SIMULATION FOR COMPUTER AIDED DESIGN AND MANUFACTURING", filed Nov. 9, 2018, which is incorporated herein by reference in its entirety.

BACKGROUND

This specification relates to computer aided design of physical structures, which can be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to manufacture the physical structures of those objects, e.g., using Computer Numerical Control (CNC) manufacturing techniques. Typically, CAD software stores the 3D representations of the geometry of the objects being modeled using a boundary representation (B-Rep) format. A B-Rep model is a set of connected surface elements specifying boundaries between a solid portion and a non-solid portion of the modelled 3D object. In a B-Rep model (often referred to as a B-Rep), geometry is stored in the computer using smooth and precise mathematical surfaces, in contrast to the discrete and approximate surfaces of a mesh model, which can be difficult to work with in a CAD program.

Further, CAD programs have been used in conjunction with additive manufacturing systems and techniques. Additive manufacturing, also known as solid free form fabrication or 3D printing, refers to any manufacturing process where 3D objects are built up from raw material (generally powders, liquids, suspensions, or molten solids) in a series of layers or cross-sections. Examples of additive manufacturing include Fused Filament Fabrication (FFF) and Selective Laser Sintering (SLS). Further, subtractive manufacturing refers to any manufacturing process where 3D objects are created from stock material (generally a "blank" or "workpiece" that is larger than the 3D object) by cutting away portions of the stock material.

In addition, CAD software has been designed so as to perform automatic generation of 3D geometry (generative design) for a part or one or more parts in a larger system of parts to be manufactured. This automated generation of 3D geometry is often limited to a design space specified by a user of the CAD software, and the 3D geometry generation is typically governed by design objectives and constraints, which can be defined by the user of the CAD software or by another party and imported into the CAD software. The design objectives (such as minimizing the waste material or weight of the designed part) can be used to drive the geometry generation process toward better designs. The design constraints can include both structural integrity constraints for individual parts (i.e., a requirement that a part should not fail under the expected structural loading during use of the part) and physical constraints imposed by a larger system (i.e., a requirement that a part not interfere with another part in a system during use). Further, some CAD software has included tools that facilitate 3D geometry enhancements using lattices and skins of various sizes, thicknesses and densities, where lattices are composed of beams or struts that are connected to each other at junctions, and skins are shell structures that overlay or encapsulate the lattices. Such tools allow redesign of a 3D part to be lighter in weight, while still maintaining desired performance characteristics (e.g., stiffness and flexibility). Such software tools have used lattice topologies of various types that can be used to generate lattice structures that can be manufactured.

SUMMARY

This specification describes technologies relating to computer aided design of physical structures using generative design processes, where the three dimensional (3D) models of the physical structures can be produced to include lattices, hollows, holes, and combinations thereof, and where the physical structures including these design features can then be manufactured using additive manufacturing, subtractive manufacturing and/or other manufacturing systems and techniques.

In general, one or more aspects of the subject matter described in this specification can be embodied in one or more methods, including: obtaining, by a computer aided design program, a design space for an object to be manufactured, a setup for physical simulation of the object, at least one design objective for the object, and at least one design constraint for the object; and iteratively modifying, by the computer aided design program, both a three dimensional topology of a generative model for the object and one or more outer shapes of the three dimensional topology using a generative design process that represents the three dimensional topology of the generative model as one or more boundaries between one or more solid regions and one or more void regions within the design space. The modifying includes: changing a constitutive model for the physical simulation in accordance with (i) a current iteration of the three dimensional topology and the one or more outer shapes of the three dimensional topology being offset inward to define a hollow structure in the three dimensional topology and (ii) a homogenized lattice material representation that expresses stiffness of a lattice, which is composed of solid beams and void regions, as a function of lattice topology and volume fraction for the lattice with a uniform thickness of the beams in the lattice; performing the physical simulation of the object using the changed constitutive model to produce a physical assessment with respect to the at least one design objective and the at least one design constraint; computing shape change velocities for the one or more outer shapes of the three dimensional topology in the current iteration in accordance with the physical assessment; and updating the generative model for the object with the generative design process using the shape change velocities.

The one or more methods further include: adjusting, by the computer aided design program after the modifying completes changes to both the three dimensional topology and the one or more outer shapes of the three dimensional topology, a thickness of the hollow structure in accordance with the physical simulation, the at least one design objective and the at least one design constraint, while keeping the one or more outer shapes of the three dimensional topology constant; adjusting, by the computer aided design program after the modifying completes changes to both the three dimensional topology and the one or more outer shapes of the three dimensional topology, (i) a thickness of the beams in the lattice, or (ii) a density of the lattice, in accordance with the physical simulation, the at least one design objective and the at least one design constraint, while keeping both the one or more outer shapes of the three dimensional topology and the adjusted thickness of the hollow structure constant; and providing, by the computer aided design program, a three dimensional model of the object in accordance with the three dimensional topology, the one or more outer shapes of the three dimensional topology, the adjusted thickness of the hollow structure and the adjusted lattice, for use in manufacturing a physical structure corresponding to the object using one or more computer-controlled manufacturing systems.

The modifying can include adjusting the volume fraction for the homogenized lattice material representation in accordance with a constitutive matrix for the homogenized lattice material representation of lattice topology. The physical simulation can include a finite element analysis (FEA) simulation. Note that various types of physical simulations can be used. The physical simulation performed by the systems and techniques described in this document can simulate one or more physical properties and can use one or more types of simulation. For example, FEA, including linear static FEA, finite difference method(s), and material point method(s) can be used. Further, the simulation of physical properties can include, among other possibilities, simulating buckling, natural frequency, thermal, electric or electro-magnetic flux, and material solidification properties. Moreover, different types of generative models and generative design processes can be used.

Performing the physical simulation can include performing finite element analysis simulation using a body-fitted mesh based solver, and the constitutive model can be changed by mapping geometric field data and finite element simulation data between voxel grid points of a level-set representation of the generative model and elements of a solid mesh model used by the finite element analysis simulation. Computing the shape change velocities can include using an augmented Lagrangian method to compute advection velocities.

Adjusting the thickness of the hollow structure can include, starting from one or more inner shapes of the hollow structure, iteratively modifying the one or more inner shapes of the three dimensional topology using the generative design process, including changing the constitutive model for the physical simulation in accordance with (i) a current iteration of the three dimensional topology and the one or more inner shapes and (ii) the homogenized lattice material representation, such that the thickness of the hollow structure varies across the three dimensional topology after modifying the one or more inner shapes is completed. The generative model can include a level-set representation of the one or more inner shapes and the one or more outer shapes of the three dimensional topology, and the generative design process can employ a level-set method of topology optimization to iteratively modify the one or more inner shapes and the one or more outer shapes of the three dimensional topology.

The one or more methods can include: identifying (i) stress levels, (ii) ease of formation or removal of supporting material, (iii) ability to support or inhibit material formation during fabrication, (iv) visibility of a hole for aesthetic considerations, or (v) a combination thereof, in different regions of the three dimensional topology of the hollow structure; and determining locations for one or more holes in the three dimensional topology of the hollow structure, for formation or removal of support material used during manufacturing, based on the identified (i) stress levels, (ii) ease of formation or removal of supporting material, (iii) ability to support or inhibit material formation during fabrication, (iv) visibility of the hole for aesthetic considerations, or (v) a combination thereof, for a subset of the different regions as compared to remaining regions.

The offset inward to define the hollow structure can be a constant offset selected by a user of the computer aided design program. The obtaining can include receiving input indicating an initial three dimensional model defining at least a portion of the design space. The homogenized lattice material representation can express structural behavior of a given lattice as an anisotropic solid material being a continuous material with properties approximately equivalent to the given lattice. Moreover, the one or more computer-controlled manufacturing systems can include an additive manufacturing machine, and the providing can include: generating toolpath specifications for the additive manufacturing machine from the three dimensional model; and manufacturing the physical structure corresponding to the object with the additive manufacturing machine using the toolpath specifications.

These and other methods described herein can be implemented using a non-transitory computer-readable medium encoding a computer aided design program operable to cause one or more data processing apparatus to perform the method(s). In some implementations, a system includes: a non-transitory storage medium having instructions of a computer aided design program stored thereon; and one or more data processing apparatus configured to run the instructions of the computer aided design program to perform the method(s). Further, such systems can include an additive manufacturing machine, or other manufacturing machines, and the one or more data processing apparatus can be configured to run the instructions of the computer aided design program to generate instructions for such machines (e.g., toolpath specifications for the additive manufacturing machine) from the three dimensional model, and manufacture the physical structure corresponding to the object with the machines using the instructions (e.g., the additive manufacturing machine using the toolpath specifications).

Particular embodiments of the subject matter described in this specification can be implemented to realize one or more of the following advantages. A CAD program can provide a variety of different generative design synthesis methods to choose from, including: a level-set-based topology optimization that provides a basic level-set method for topology optimization, a lattice and skin optimization that provides a thickness optimization of lattice and skin, a hybrid topology optimization that provides a topology optimization with lattice infill, an inside-out hybrid topology optimization in which the lattice infill is present in a negative space between the topology-optimized design and the original design space, a hollow topology optimization that provides a method for topology optimization with internal hollow regions, and a hybrid-hollow topology optimization that provides a method for topology optimization with lattice infill and internal hollow regions. The user can be enabled to mix and match different generative design synthesis methods, as well as a variety of input design variables, to produce generative design processes that facilitate the creation of new generative designs that meet the user's goals. Moreover, one or more of the generative design processes can employ macrostructure topology generation combined with disparate physical simulation operations that treat the modeled object differently from the macrostructure topology generation, which allows the macrostructure topology generation to be informed by more accurate structural characteristics of the type of generative design being created. This can result in improved topologies and shapes for generative designs that achieve the physical structural requirements for an object to be manufactured from the generative design.

Introducing a lattice inside a part during the topology optimization process can increase the specific stiffness of the part (stiffness/mass) and improve manufacturability of the design, e.g., when using additive manufacturing. By considering the effects of lattice behavior during topology optimization, the performance to weight ratio of the part can be improved. Further, components can be designed that contain an optimized lattice structure within a topology optimized body based on expected structural loading to produce lightweight designs with high stiffness.

In addition, hollow structural components can be generatively designed, which can result in a significant reduction in component mass while still meeting or exceeding specified structural loading requirements. This can result in lower material usage in manufacturing of such components, improved efficiency, ease of transportation, and reduced costs for manufacture and transport of physical structures. Generating such hollow structures can result in better strength-to-weight ratios, as compared with similar solid components, especially under bending loads. Topology optimization for a component can be performed for a part, while concurrently maintaining a hollow interior within the volume of the component. Note that, when by taking the hollow structural aspect of a component being designed into account during the topology optimization process, rather than doing solid topology optimization with a high safety factor and/or volume target so the designed component can later be manually hollowed out using standard geometry operations, mass can be reduced for a given design, while maintaining or improving structural performance, without substantial risk that the structural response changes significantly after the topology optimization.

In addition, both the shape and topology of the outer surface of the object and the shape and topology of the inner surface of the object (the surface defining the hollow interior) can be optimized. When optimizing the topology of the outer surface, the inner surface can be created at the point of activating/deactivating elements after shape changes, which means that only a skin-like layer of elements needs to be kept active. Further, remeshing the outer surface is not required at every iteration, which can reduce the needed processing resources and can increase the reliability of the method. Moreover, the described approach to hollow topology optimization can enable generative design processes to expand their ability to synthesize shapes, which can enable more design problems to be addressed using generative design.

Finally, hollow topology optimization can be combined with lattice-based topology optimization to obtain the benefits of both approaches to generative design. A macrostructure topology generation process can be informed by structural characteristics of a designed object that will have both a hollow region and a lattice. This can result in even better generative designs that are very lightweight and have very high stiffness, with improved topologies and shapes for generative designs that achieve the physical structural requirements for an object to be manufactured from the generative design. In addition to stiffness, improved topologies and shapes for generative designs can be achieved, such as efficient heat dissipation, higher/lower natural modes of vibration, depending on the design objectives used.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
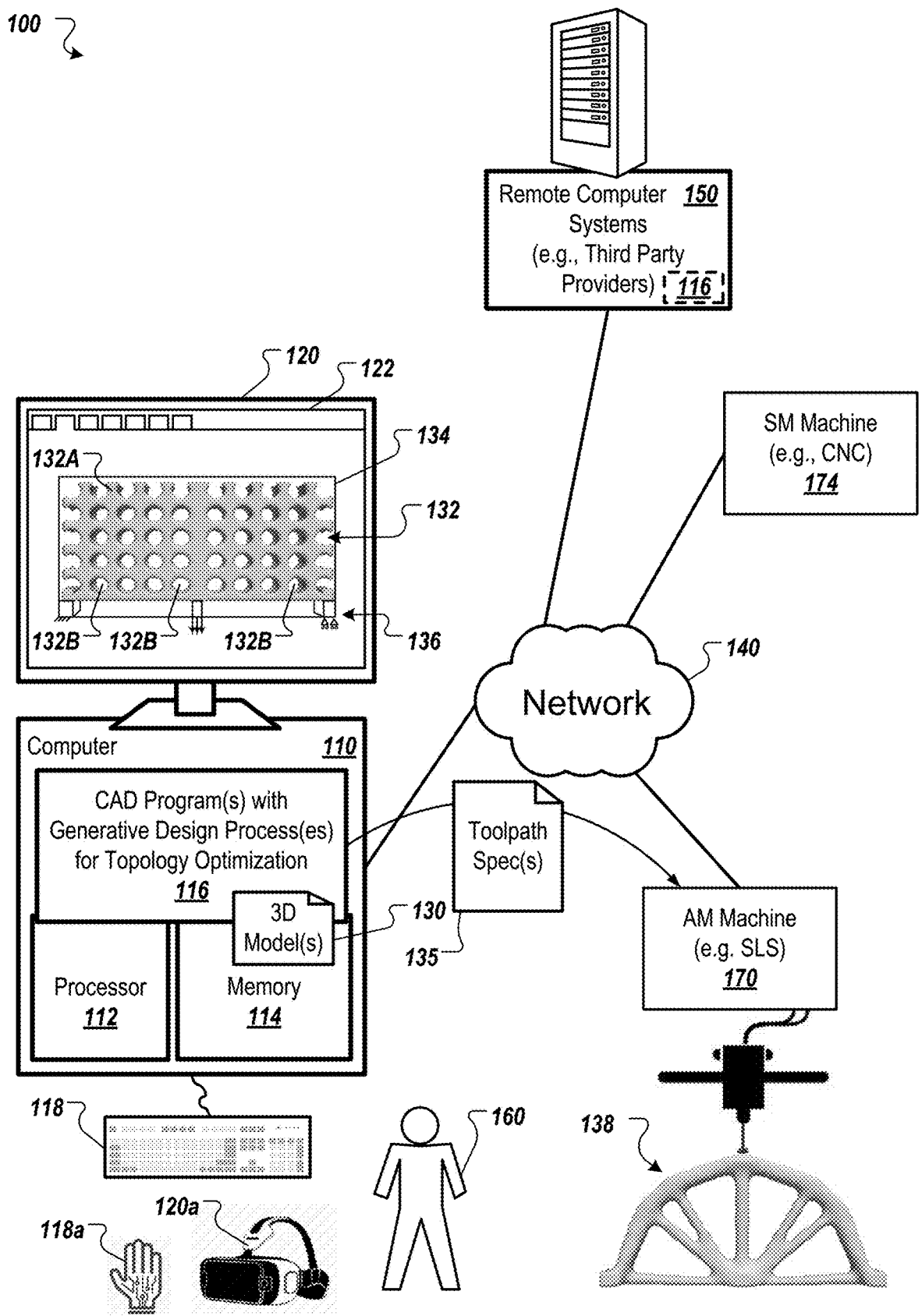
FIG. 1A shows an example of a system usable to design and manufacture physical structures.

FIG. 1A shows an example of a system 100 usable to design and manufacture physical structures. A computer 110 includes a processor 112 and a memory 114, and the computer 110 can be connected to a network 140, which can be a private network, a public network, a virtual private network, etc. The processor 112 can be one or more hardware processors, which can each include multiple processor cores. The memory 114 can include both volatile and non-volatile memory, such as Random Access Memory (RAM) and Flash RAM. The computer 110 can include various types of computer storage media and devices, which can include the memory 114, to store instructions of programs that run on the processor 112, including Computer Aided Design (CAD) program(s) 116, which implement three-dimensional (3D) modeling functions and includes one or more generative design processes for topology optimization (e.g., using at least one level-set method as described) with physical simulation. The physical simulation performed by the systems and techniques described in this document can simulate one or more physical properties and can use one or more types of simulation. For example, finite element analysis (FEA), including linear static FEA, finite difference method(s), and material point method(s) can be used. Further, the simulation of physical properties can include Computational Fluid Dynamics (CFD), Acoustics/Noise Control, thermal conduction, computational injection molding, electric or electro-magnetic flux, and/or material solidification (which is useful for phase changes in molding processes) simulations. Moreover, the CAD program(s) 116 can potentially implement hole generation techniques to support manufacturing and/or manufacturing control functions.

As used herein, CAD refers to any suitable program used to design physical structures that meet design requirements, regardless of whether or not the program is capable of interfacing with and/or controlling manufacturing equipment. Thus, CAD program(s) 116 can include Computer Aided Engineering (CAE) program(s), Computer Aided Manufacturing (CAM) program(s), etc. The program(s) 116 can run locally on computer 110, remotely on a computer of one or more remote computer systems 150 (e.g., one or more third party providers' one or more server systems accessible by the computer 110 via the network 140) or both locally and remotely. Thus, a CAD program 116 can be two or more programs that operate cooperatively on two or more separate computer processors in that a program 116 operating locally at computer 110 can offload processing operations (e.g., generative design and/or physical simulation operations) "to the cloud" by having one or more programs 116 on one or more computers 150 perform the offloaded processing operations.

The CAD program(s) 116 present a user interface (UI) 122 on a display device 120 of the computer 110, which can be operated using one or more input devices 118 of the computer 110 (e.g., keyboard and mouse). Note that while shown as separate devices in FIG. 1A, the display device 120 and/or input devices 118 can also be integrated with each other and/or with the computer 110, such as in a tablet computer (e.g., a touch screen can be an input/output device 118, 120). Moreover, the computer 110 can include or be part of a virtual reality (VR) or augmented reality (AR) system. For example, the input/output devices 118, 120 can include a VR/AR input glove 118a and/or a VR/AR headset 120a. In any case, a user 160 interacts with the CAD program(s) 116 to create and modify 3D model(s), which can be stored in 3D model document(s) 130.

In the example shown, an initial 3D model 132 is a seed model for input to a generative design process. In this example, the user 160 has defined a mechanical problem for a generative design process to operate on to produce a new 3D model from a starting 3D model 132. In this case, the defined problem is the Michell type arch problem, where the user 160 has specified a domain 134 and loading cases 136. However, this is but one of many possible examples.

In some implementations, the user 160 (or other person or program) can specify a design space for an object to be manufactured, a setup (e.g., load(s) and material(s)) for physical simulation (e.g., FEA, CFD, Acoustics/Noise Control, thermal conduction, computational injection molding simulations, electric or electro-magnetic flux, material solidification, etc.) of the object, at least one design objective (e.g., minimize material usage) for the object, and at least one design constraint (e.g., a volume constraint) for the object. In some implementations, the inputs for use in physical simulation and generative design processes can include one or more regions of a current 3D model in which to generate new 3D geometry, loading case(s) defining one or more loads in one or more different directions to be borne by a physical structure being designed, one or more materials (e.g., one or more isotropic solid materials identified as a baseline material model for the design space), one or more seed model types to use as input to a generative design process, one or more generative design processes to use, and/or one or more lattice topologies to use in one or more regions of the design space. Inputs to the generative design and physical simulation processes can include non-design spaces, different types of components (e.g., rods, bearings, shells), one or more target manufacturing processes and associated parameters, obstacle geometries that should be avoided, preserve geometries that should be included in the final design, and parameters related to various aspects, such as resolution of the design, type of synthesis, etc.

Moreover, the CAD program(s) 116 provide user interface elements in the UI 122 to enable the user 160 to specify the various types of inputs noted above, and all (or various subsets) of these inputs can be used in the generative design and physical simulation processes described in this document. Further, the user 160 can be enabled by the UI 122 of the CAD program(s) 116 to design a part using traditional 3D modelling functions (to build precise geometric descriptions of the 3D design model) and then use generative design and simulation processes in a design space specified within one or more portions of the 3D design model. Thus, as will be appreciated, many possible types of physical structures can be designed using the systems and techniques described in this document, the UI 122 can be used to create a full mechanical problem definition for a part to be manufactured, and the generative design and physical simulation processes can accelerate new product development by enabling increased performance without time consuming physical testing.

Further, as described herein, the CAD program(s) 116 implement at least one generative design process, which enables the CAD program(s) 116 to generate one or more portions of the 3D model(s) automatically (or the entirety of a 3D model) based on design objective(s) and constraint(s), where the geometric design is iteratively optimized based on simulation feedback. Note that, as used herein, "optimization" (or "optimum") does not mean that the best of all possible designs is achieved in all cases, but rather, that a best (or near to best) design is selected from a finite set of possible designs that can be generated within an allotted time, given the available processing resources. The design constraints can be defined by the user 160, or by another party and imported into the CAD program(s) 116. The design constraints can include both structural integrity constraints for individual parts (e.g., a requirement that a part should not fail under the expected structural loading during use of the part) and physical constraints imposed by a larger system (e.g., a requirement that a part be contained within a specified volume so as not to interfere with other part(s) in a system during use).

Various generative design processes can be used, which can optimize the shape and topology of at least a portion of the 3D model. The iterative optimization of the geometric design of the 3D model(s) by the CAD program(s) 116 involves topology optimization, which is a method of lightweighting where the optimum distribution of material is determined by minimizing an objective function subject to design constraints (e.g., structural compliance with volume as a constraint). Topology optimization can be addressed using a variety of numerical methods, which can be broadly classified into two groups: (1) material or microstructure techniques, and (2) geometrical or macrostructure techniques. Microstructure techniques are based on determining the optimum distribution of material density and include the Solid Isotropic Material with Penalization (SIMP) method and the homogenization method. In the SIMP method, intermediate material densities are penalized to favor either having p=0 or p=1, denoting a void or a solid, respectively. Intermediate material densities are treated as composites in the homogenization method.

In contrast, macrostructure techniques treat the material as being homogeneous, and the three dimensional topology of the modeled object being produced is represented as one or more boundaries between one or more solid regions (having the homogenous material therein) and one or more void regions (having no material therein) within the design space (also referred to as the domain or a sub-space of the domain for topology optimization). The shape(s) of the one or more boundaries are optimized during the generative design process, while the topology is changed in the domain as a result of the shape optimization in combination with adding/removing and shrinking/growing/merging the void region(s). Thus, the types of final optimized topologies that can result from a generative design process using a macrostructure technique can depend significantly on the number and sizes of voids within the seed geometry for the process.

Note that, while only one seed model 132 is shown in FIG. 1A (where this model 132 includes a complex solid region 132A surrounding many holes 132B of the void region) it should be appreciated that the generative design processes described in this document can employ two or more seed geometries/models for any given generative design process iteration, so as to improve the final result of topology and shape optimization. Further, during the shape and topology optimization process, one or more voids can be introduced into the solid domain and/or one or more solids can be introduced into the void domain, so as to improve the final result of the topology and shape optimization. Thus, the CAD program(s) 116 can include various types of available seed geometries and mid-process geometry introductions, along with a user interface element allowing the user 160 to design their own seed geometries and mid-process geometry introductions. Likewise, the user 160 can run two or more generative design process iterations (saving the results from each) until a preferred generative design geometry is produced.

Once the user 160 is satisfied with a generatively designed 3D model, the 3D model can be stored as a 3D model document 130 and/or used to generate another representation of the model (e.g., an .STL file for additive manufacturing). This can be done upon request by the user 160, or in light of the user's request for another action, such as sending the 3D model 132 to an additive manufacturing (AM) machine 170, or other manufacturing machinery, which can be directly connected to the computer 110, or connected via a network 140, as shown. This can involve a post-process carried out on the local computer 110 or a cloud service to export the 3D model 132 to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the CAD program(s) 116 can provide a document 135 (having toolpath specifications of an appropriate format) to the AM machine 170 to create a complete structure 138, which includes the optimized topology and shape (in this example, an arch design generated for the Michell type arch problem). The AM machine 170 can employ one or more additive manufacturing techniques, such as granular techniques (e.g., Powder Bed Fusion (PBF), Selective Laser Sintering (SLS) and Direct Metal Laser Sintering (DMLS)), extrusion techniques (e.g., Fused Deposition Modelling (FDM), which can include metals deposition AM). In addition, the user 160 can save or transmit the 3D model for later use. For example, the CAD program(s) 116 can store the document 130 that includes the generated 3D model.

In some implementations, subtractive manufacturing (SM) machine(s) 174 (e.g., a Computer Numerical Control (CNC) milling machine, such as a multi-axis, multi-tool milling machine) can also be used in the manufacturing process. Such SM machine(s) 174 can be used to prepare initial workpieces on which AM machine(s) 170 will operate. In some implementations, a partially complete structure 138 is generated by the AM machine(s) 170 and/or using casting methods (e.g., investment casting (IC) using ceramic shell or sand casting (SC) using sand cores), and this partially complete structure 138 then has one or more portions removed (e.g., finishing) by the CNC machine 174 in order to form the completed structure. Moreover, in some implementations, the CAD program(s) 116 can provide a corresponding document 135 (having toolpath specifications of an appropriate format, e.g., a CNC numerical control (NC) program) to the SM machine 174 for use in manufacturing the part using various cutting tools, etc.

In various implementations, the CAD program(s) 116 of the system 100 can implement one or more generative design processes as described in this document. Generative design processes seek an optimal geometric shape, topology, or both. For example, generative design processes seek an optimal geometric shape among alternative designs by minimizing a performance-related objective function subject to constraints:

$$\text{minimize } J(s,u(s)) s \in \mathbb{R}^{n_s} \quad (1)$$

$$\text{such that } g_i(s,u(s))=0 \ i=1,\ldots,n_g \quad (2)$$

where s is a vector of design variables related to a geometric shape of the domain, and u is a vector of state variables (e.g., displacement) that depend on s. Additional constraints (e.g., equilibrium) are denoted by a set $g_i$. For simplicity, equality constraints are assumed here. Mathematical programming methods used to minimize (1) can be gradient-based or non-gradient-based. Gradient-based methods (versus non-gradient-based methods) generally use more information associated with design sensitivity, for example:

$$\frac{dJ}{ds}(s, u(s)) = \frac{\partial J}{\partial s} + \frac{\partial J}{\partial u}\frac{du}{ds} \quad (3)$$

which is a derivative of the performance-related objective function with respect to the design variables. In lattice-based methods, s represents a lattice thickness. In level-set based topology optimization methods, s represents a boundary of a solid region.

Figure 1B:
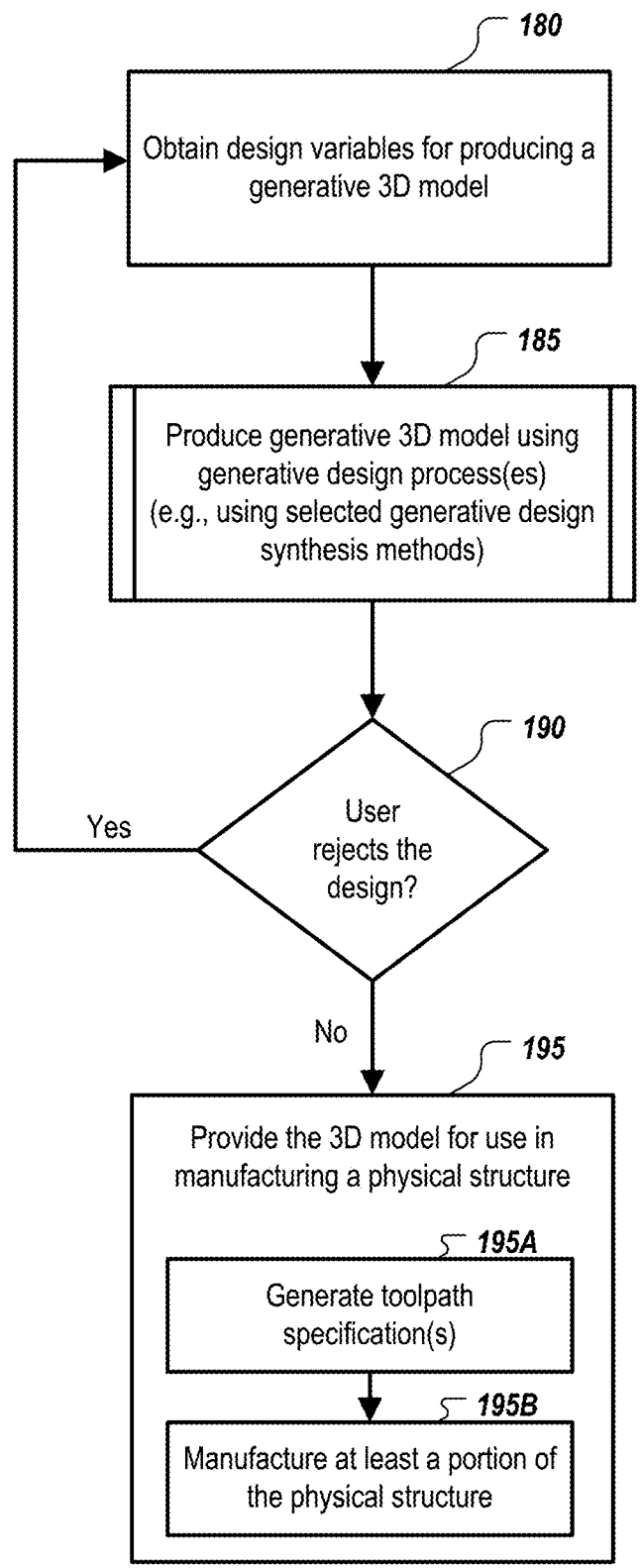
FIG. 1B shows an example of a process of designing and manufacturing physical structures.

FIG. 1B shows an example of a process of designing and manufacturing physical structures. Design variables are obtained 180, e.g., by CAD program(s) 116, for use in producing a generative 3D model. Different generative design processes can be formulated by using different combinations of design variables, which can include lattices, density fields, and level-sets. In some implementations, the design variables can include various types of inputs, e.g., received through UI 122, such as selection among different generative design synthesis methods made available by CAD program(s) in the system 100. In some implementations, the available generative design synthesis methods include (1) a level-set-based topology optimization that provides a basic level-set method for topology optimization, (2) a lattice and skin optimization that provides a thickness optimization of lattice and skin, (3) a hybrid topology optimization that provides a topology optimization with lattice infill, (4) an inside-out hybrid topology optimization in which the lattice infill is present in a negative space between the topology-optimized design and the original design space, (5) a hollow topology optimization that provides a method for topology optimization with internal hollow regions, and/or (6) a hybrid-hollow topology optimization that provides a method for topology optimization with lattice infill and internal hollow regions.

Additional, design variables are possible, such as (1) a design space for generative design geometry production, e.g., a boundary representation (B-Rep) 3D model designed or loaded into CAD program(s) 116 that serves as a sub-space of an optimization domain of a described generative design process, and/or (2) a set of input solids that specify boundary conditions for generative design geometry production, e.g., B-Reps selected using UI 122 to specify sub-space(s) that are preserved for use as connection point(s) with other component(s) in a larger 3D model or separate 3D model(s). Different combinations of design variables can be used, e.g., by CAD program(s) 116 in response to input from the user 160. For example, a user 160 may select different generative design synthesis methods to use within respective different design spaces within a single 3D model.

Other design variable can include a setup for physical simulation, e.g., densities of elements in an FEA model or a homogenized lattice material representation for a selected lattice topology to be used with an optimized 3D topology of the part being generatively designed. The design variables can include various design objectives and constraints, such as described in this document. Furthermore, functions can be provided, e.g., by CAD program(s) 116, that assist the user in specifying design variables. For example, a lattice recommender can provide predictions for suitable lattice settings for a given problem using a single solid simulation. In some implementations, the lattice recommender described in PCT Publication No. WO 2017/186786 A1, filed 26 Apr. 2017, and U.S. application Ser. No. 16/096,623, filed Oct. 25, 2018, both titled "METHOD AND SYSTEM FOR GENERATING LATTICE RECOMMENDATIONS IN COMPUTER AIDED DESIGN APPLICATIONS", both of which are hereby incorporated by reference, is used.

With the generative design variables specified, one or more 3D model(s) are produced 185, e.g., by CAD program(s) 116, using one or more generative design processes (e.g., using one or more selected generative design synthesis methods). In some implementations, the one or more generative design processes can use described level-set methods, where s, from equations 1, 2 & 3, represents a boundary of a solid region that is implicitly represented using one or more level-sets, which are signed distance values computed on a Cartesian background grid. In a level-set-based topology optimization method, the outer shape of a structure is represented by a one-dimensional high-level level set function, and a change in shape and configuration is replaced by a change in the level set function value, so as to obtain an optimum structure. The level set function refers to a function that indicates whether each part of the design domain where the initial structure is set corresponds to a material domain (material phase) that forms the structure and is occupied by a material, a void domain (void phase) where a void is formed, or a boundary between these two domains, wherein a predetermined value between a value representing the material domain and a value representing the void domain represents the boundary between the material domain and the void domain.

Figure 2A:
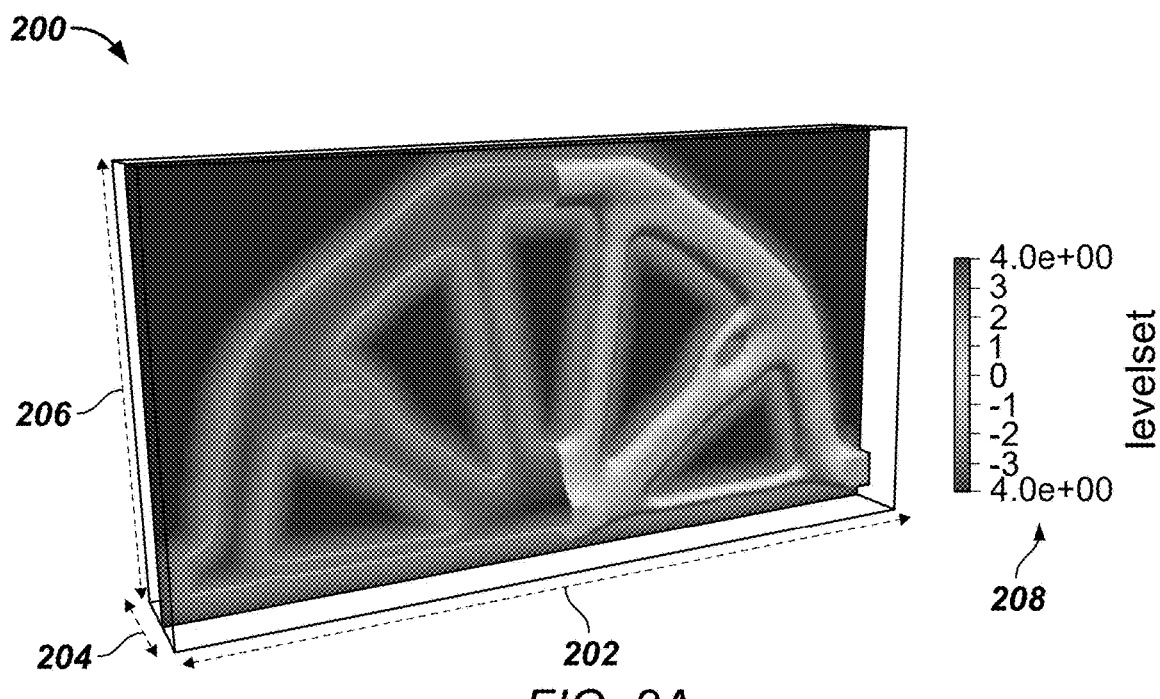
FIG. 2A shows a graphical representation of an example of a narrow-band level-set.
Figure 2B:
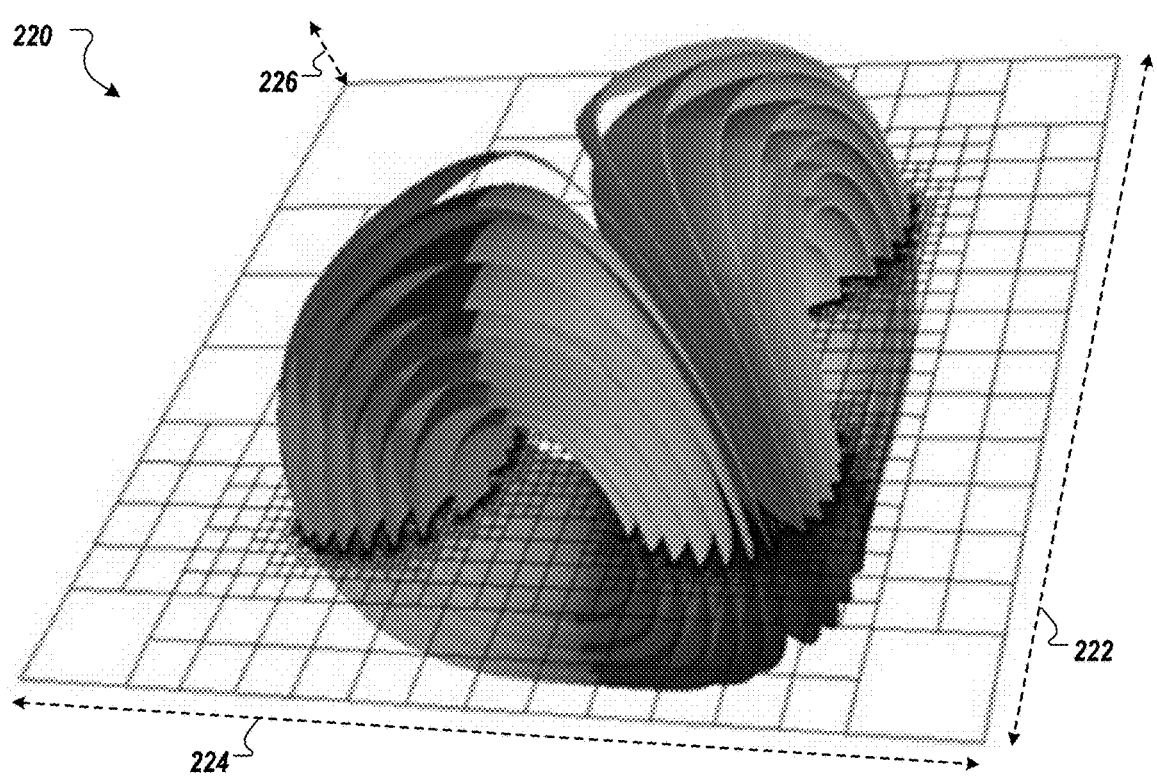
FIG. 2B shows a graphical representation of an example of an octree data structure.

FIG. 2A shows a graphical representation of an example of a narrow-band level-set 200, where the level-set value is constant outside the narrow band. The level-set 200 is plotted on a Cartesian background grid relative to x, y, and z axes 202, 204, 206, respectively. The scale 208 shows the different levels of the level-set corresponding to the signed distance values computed on the Cartesian background grid, including the 0-isosurface of the level-set representation, which corresponds to the current structural model. The level-set representation can provide the able to constantly and clearly represent the outline of an optimum structure, and during the process of the structural optimization based on the level-set method, one or more void(s) can be introduced into the material domain based on topological derivatives of an objective function, allowing a change in topology (a change in configuration) such as the introduction of a hole in the material domain. Further, in some implementations, one or more octree data structures are used for resolving geometry accurately, such as an example of an octree data structure 220 shown in a graphical representation in FIG. 2B. The octree data structure 220 is plotted on a Cartesian background grid relative to x, y, and z axes 222, 224, 226, respectively.

As noted above, in some implementations, the available generative design synthesis methods include a level-set-based topology optimization. Level-set based topology optimization involves optimizing the shape of a design domain using a shape derivative, which is the derivative of a constrained minimization problems with respect to the shape. The shape changes are applied on a level-set, which allows topology changes during shape modifications. The outcome of this type of generative design process is the partitioning of the design space into solid and void regions, resulting in an optimized shape, often with topology changes. For this type of level-set-based topology optimization, as well as the variations on this type of level-set-based topology optimization described in this document, one or more of the following approaches can be used.

Linear Elastic Topology Optimization

Consider the linear elastic boundary value problem for a solid body with the domain $\Omega$ $$-\nabla \cdot D\epsilon(u) = f \text{ in } \Omega \quad (4)$$

$$u = 0 \text{ on } \Gamma_D \quad (5)$$

$$D\epsilon(u)n = \bar{t} \text{ on } \Gamma_N \quad (6)$$

where $\epsilon(u)$ is the linear strain tensor, D is the fourth order constitutive tensor, u is the displacement vector, f is the external load vector and $\bar{t}$ is the prescribed traction on the Neumann boundary $\Gamma_N$ with the outward normal n. For simplicity, homogeneous Dirichlet boundary conditions can be assumed on $\Gamma_D$. The constrained topology optimization problem can then be $$\text{minimize } J(\Omega, u) \quad (7)$$

$$\text{subject to } -\nabla \cdot D\epsilon(u) = f \text{ in } \Omega \quad (8)$$

$$u = 0 \text{ on } \Gamma_N \quad (9)$$

$$D\epsilon(u)n = t \text{ on } \Gamma_N \quad (10)$$

where compliance minimization can be used as the objective function $$J(\Omega, u) = \int_\Omega f \cdot u \, d\Omega + \int_{\Gamma_N} \bar{t} \cdot u \, d\Gamma = \frac{1}{2} \int_\Omega D \in (u) : \in (u) \, d\Omega \quad (11)$$

Figure 2C:
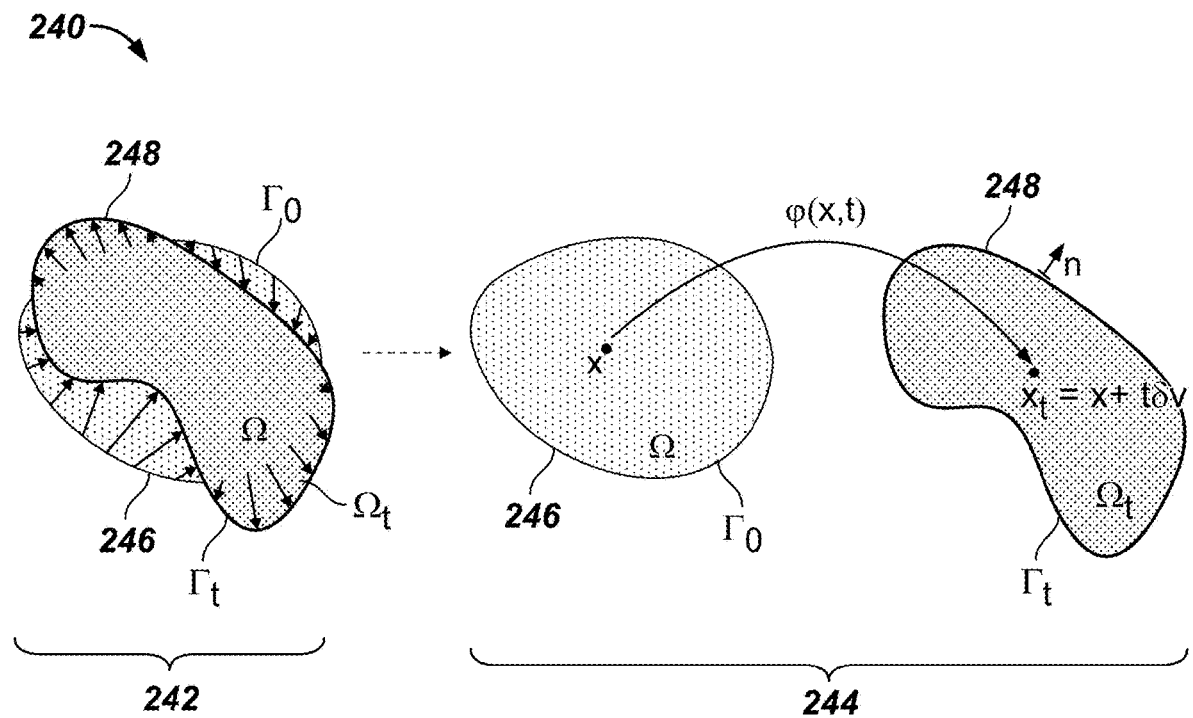
FIG. 2C shows a graphical representation of an example of geometry mapping between an initial design configuration and a current design configuration.

FIG. 2C shows a graphical representation of an example of geometry mapping 240 between an initial design configuration and a current design configuration. The solution space in topology optimization can be defined by different perturbations of the geometric shape within the design space. In this context, a linear mapping 242 which maps a given domain 246 $\Omega$ into a perturbed domain 248 $\Omega t$ can be defined. With this mapping, a material point with the coordinate $x \in \Omega$ can be mapped 244 onto $$x_t = x + t\delta v, \, t \geq 0 \quad (12)$$

where $\delta v$ is a prescribed constant vector field, and t is a scalar parameter (see FIG. 2C). Note that solving equations using gradient based mathematical programming methods involves using the directional derivative of the objective function in the direction of the velocity field $\delta v$ $$\frac{dJ}{d\Omega}(\Omega, u(x))\delta v = \lim_{t \to 0} \frac{J(\Omega_t, u(x_t)) - J(\Omega, u(x))}{t} \quad (13)$$

More than one approach can be used to obtain the directional derivative of the objective function for use in gradient based optimization methods. Approaches that are suitable for use with gradient based optimization methods include direct differentiation, semi-analytical derivatives, adjoint method, and finite difference.

Adjoint Method

Evaluating the shape derivative (Equation 13) can require the directional derivative of the state variable u in the direction of the velocity vector $\delta v$. This is can be seen by using the chain rule $$\frac{dJ}{d\Omega}\delta v = \frac{\partial J}{\partial \Omega}\delta v + \frac{\partial J}{\partial u}\frac{\partial u}{\partial \Omega}\delta v \quad (14)$$

But in some implementations, an adjoint method can be used which involves the formation of a Lagrangian $L(\Omega, u, \lambda)$ which depends on domain shape $\Omega$, displacement field u, and Lagrange parameters $\lambda$ $$\int(\Omega, u, \lambda) = J(\Omega, u) + \lambda[\int_\Omega f + \nabla \cdot D \in (u) d\Omega - \int_{\Gamma_D} u d\Gamma + \int_{\Gamma_N} \bar{t} - D \in (u) n d\Gamma] \quad (15)$$

The stationary condition for the Lagrangian, i.e., $\delta L(\Omega, u, \lambda) = 0$, can yield a complete set of shape optimization equations. For example, the adjoint problem for compliance minimization (Equation 11) can be given by considering the variation of the Lagrangian with respect to the displacements u. After introducing the cost function (Equation 11) and reformulating the domain term with the divergence theorem $$\int_\Omega f \cdot \delta u d\Omega + \int_{\Gamma_N} \bar{t} \cdot \delta u d\Gamma - \int_\Omega \delta u \cdot (\nabla \cdot \sigma(\lambda)) d\Omega - \int_{\Gamma_D} \lambda \cdot (D : \nabla(\delta u)) n d\Gamma + \int_{\Gamma_N} \delta u \cdot \sigma(\lambda) n d\Gamma = 0 \quad (16)$$

the corresponding boundary value problem, referred to as the adjoint problem, can become $$-\nabla \cdot \sigma(\lambda) = -f \text{ in } \Omega \quad (17)$$

$$\lambda = 0 \text{ in } \Gamma_D \quad (18)$$

$$\sigma(\lambda) \cdot n = \bar{t} \text{ in } \Gamma_N \quad (19)$$

This can lead to determining that $\lambda = -u$ is the solution of the adjoint problem. This means that the adjoint problem (Equations 17-19) does not need to be solved explicitly for the compliance minimization problem (Equation 11). Such problems are called self-adjoint, where the solution of the direct problem also yields the adjoint solution. However, this is not often the case and different adjoint problems may have to be solved depending on the nature of the direct problem and the objective function. An advantage of the use of the Lagrangian as is includes the identity $$\frac{dJ}{d\Omega}(\Omega, u(x))\delta v = \frac{\partial L}{\partial \Omega}(\Omega, u(x), \lambda)\delta v \quad (20)$$

This equation can enable the shape derivative (Equation 13) to be expressed as a boundary integral of the following form $$DJ(x, u(x))[\delta v] = \int_\Omega f(u, \lambda)(\nabla \cdot \delta v) d\Omega \qquad (21)$$

$$= \int_\Gamma f(u, \lambda)(\delta v \cdot n) d\Gamma$$

Without loss of generality, it can be assumed that some boundary variations are not relevant in practical shape optimization. In solid mechanics, the boundary variations can usually be of the form $$\delta v = 0 \text{ on } \Gamma_D \qquad (22)$$

$\delta v = 0$ on $\Gamma_N$ with $\sigma n = \bar{t}$, $\delta v \neq 0$ on $\Gamma_N$ with $\sigma n = 0$.

This means that only parts of the boundary $\tau_N$ with no traction are free to move during the shape optimization. In this context, the variation of the Lagrangian (Equation 15) in the direction OP with structural compliance (Equation 11) as the cost function can become $$\frac{\partial L}{\partial \Omega} \delta v = \int_{\Gamma_N} (2u \cdot f - \nabla u : \sigma(u))(\delta v \cdot n) d\Gamma \qquad (23)$$

Without restricting $\delta v$ as stated in Equation 22, the variation of the Lagrangian can contain several more terms. During iterative optimization of the shape, the shape derivative (Equation 23) can be used as gradient information. In order to achieve maximum decrease in the objective function, the boundary perturbation can be chosen as follows $$\delta v = -(2u \cdot f - D \in (u) : \in (u)). \qquad (24)$$

This boundary perturbation can be applied along the direction of the normal $\delta \hat{v} = vn$, where v is the shape change velocity and is given by $$v = \frac{dJ}{d\Omega}(\Omega, u(x))\delta v = \int_\Gamma (2u \cdot f - D \in (u) : \in (u))(\delta v \cdot n) d\Gamma \qquad (25)$$

Volume Control

Topology optimization using only a compliance minimization objective (Equation 11) can result in the optimum topology covering the full design space. Thus, some form of volume constraint is often required. Moreover, in some implementations, control over volume changes during topology optimization can be important for several reasons: 1) to enforce volume constraints; 2) to provide user control of topology optimization progress, e.g., more volume changes during initial iterations and fewer volume changes during later iterations; and 3) to ensure that arbitrary constraints not having shape derivatives are satisfied.

Note that the presence of shape derivatives for constraints can require modifying the shape change velocity in Equation 25. A modified objective function can be considered where the volume is penalized by a penalty parameter $\mu$ in $$J(\Omega, u) = \frac{1}{2} \int_\Gamma (D \in (u) : \in (u) d\Omega + \mu V(\Omega)) d\Gamma \qquad (26)$$

The corresponding shape derivative (Equation 25) can then be given by $$\frac{dJ}{d\Omega}(\Omega, u(x))\delta v = \int_\Gamma (2u \cdot f - D \in (u) + \mu)(\delta v \cdot n) d\Gamma \qquad (27)$$

where $\mu$ is constant along the boundary. The velocity term in the shape derivative (Equation 25) can now have an additional term as follows:

$$v = -(2u \cdot f - D \in (u) : \in (u) + \mu) \qquad (28)$$

Augmented Lagrangian Method

In some implementations, an Augmented Lagrangian method is used. Some approaches (see Volume Control above) can have limitations such as creating difficulty in meeting prescribed volume targets. Essentially, the final volume of the design can depend on the value of $\mu$ prescribed in Equation 26. In such cases, meeting prescribed design constraint targets can be achieved by using the Augmented Lagrangian method. Consider the following Lagrangian for compliance minimization with a final volume target of $V_f(\Omega)$ $$L(\Omega, u) = \qquad (29)$$

$$\frac{1}{2} \int_\Omega D \in (u) : \in (u) d\Omega + \mu(V(\Omega) - V_f(\Omega)) + \frac{\lambda}{2}(V(\Omega) - V_f(\Omega))^2$$

The shape derivative can then be given by $$\frac{dJ}{d\Omega}(\Omega, u(x))\delta v = \qquad (30)$$

$$\int_\Gamma \left(2u \cdot f - D \in (u) : \in (u) + \mu + \frac{\lambda}{2}(V(\Omega) - V_f(\Omega))\right)(\delta v \cdot n) d\Gamma$$

where the penalty parameters $\lambda$, $\mu$ can be updated in an increasing sequence such that they converge to the optimal Lagrange multipliers. In some implementations, one or more heuristic methods are used for updating penalty parameters.

Body-Fitted Solvers

Figure 2D:
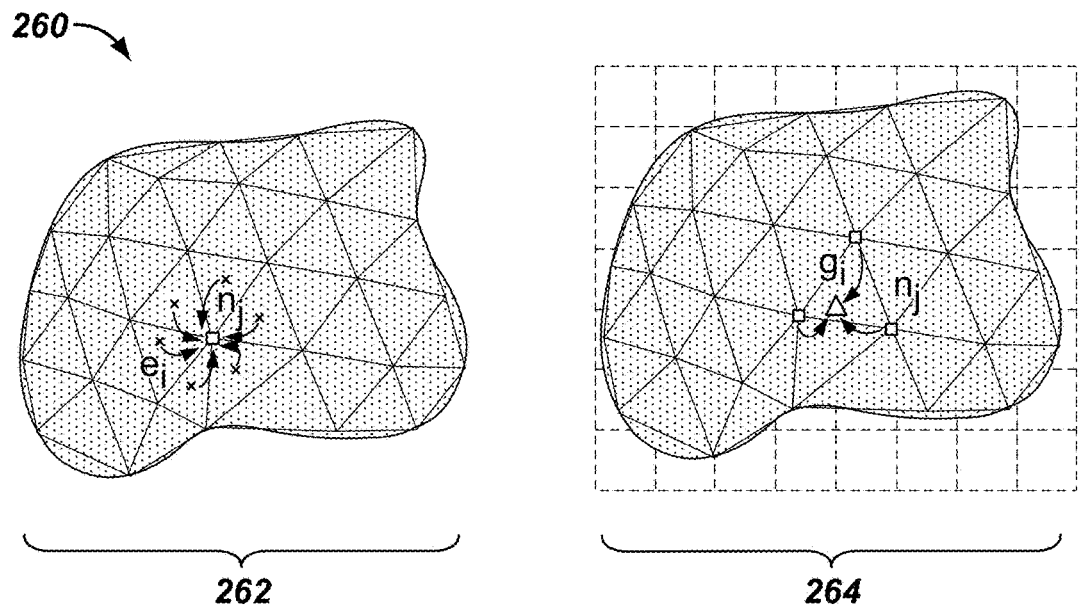
FIG. 2D shows a graphical representation of an example of a data mapping from solid mesh to level-set grid.

In some implementations, one or more body-fitted mesh based solvers are used. Using such body-fitted mesh based solvers with the level-set method involves mapping data from the solid mesh to a Cartesian grid (note that the inverse mapping is trivial due to the structured nature of the Cartesian grid). This involves two mappings as shown in FIG. 2D, which shows a graphical representation of an example of a data mapping 260 from solid mesh 262 to level-set grid 264.

Data in solid mesh elements (e.g., strain energy, Von Mises stress) can first be mapped to solid mesh nodes. This mapping can be achieved by data averaging. For example, by averaging solid mesh element $e_i$ data in the solid mesh 262 at solid node $n_j$. Further, data in the solid mesh nodes can be mapped to voxel grid points using linear shape functions. Data at solid mesh nodes $n_j$ can be linearly interpolated to level-set grid point $g_i$ in the level-set grid 264. Having such a mapping can allow the level-set method to be used with complex FEA models solved with body-fitted solvers.

As noted, the above approaches can be used with various types of level-set-based topology optimizations, which are described further below in connection with FIGS. 3A-6D. Returning to FIG. 1B, all of these level-set methods of generative design, as well as the other generative design processes described in this document, can be implemented, e.g., in CAD program(s) 116, to provide both (1) substantial user control over the generative design process, as well as post-processing of the generative design output to form a final, acceptable 3D model of an object, and (2) control functions for providing the generatively designed 3D model for use in manufacturing a physical structure corresponding to the object. Thus, the results of generative design processing can be presented to the user, e.g., in UI 122 on display device 120, along with an option 190 to accept or reject the design.

If the design is rejected, the process of FIG. 1B can return to obtain 180, e.g., by CAD program(s) 116, new design variables for use in producing a new generative 3D model. Once a design in not rejected 190, the process of FIG. 1B can provide 195, e.g., by CAD program(s) 116, the 3D model for use in manufacturing a physical structure corresponding to the object using one or more computer-controlled manufacturing systems, e.g., AM machine 170, SM machine 174, and/or other manufacturing machines. The providing 195 can involve sending or saving the 3D model to a permanent storage device for use in manufacturing the physical structure corresponding to the object using the one or more computer-controlled manufacturing systems. In some implementations, the providing 195 involves generating 195A, e.g., by CAD program(s) 116, toolpath specifications for the computer-controlled manufacturing system(s) using the 3D model, and manufacturing 195B, e.g., by CAD program(s) 116, at least a portion of the physical structure corresponding to the object with the computer-controlled manufacturing system(s) using the toolpath specifications generated for the additive manufacturing machine.

Note that the 3D model that is provided 195 can be the 3D model produced 185 by a generative design synthesis method or a post-processed version of the generative design output. For example, in some implementations, a 3D mesh model produced by a generative design synthesis method can be converted into a watertight B-Rep 3D model before being provided 195. In some implementations, a generative design output can be post-processed using the systems and techniques described in U.S. Patent Application No. 62/758,053, filed Nov. 9, 2018, and titled "CONVERSION OF GENERATIVE DESIGN GEOMETRY TO EDITABLE AND WATERTIGHT BOUNDARY REPRESENTATION IN COMPUTER AIDED DESIGN". Further, in some implementations, the post-processed generative design output can be edited using the systems and techniques described in U.S. application Ser. No. 16/186,136, filed on Nov. 9, 2018, and titled, "FACILITATED EDITING OF GENERATIVE DESIGN GEOMETRY IN COMPUTER AIDED DESIGN USER INTERFACE". Moreover, the generative design processes described below in connection with FIGS. 3A-7B can also be implemented to use the post-processing, editing, and/or provisioning 195 systems and techniques described above. Finally, while described in the context of a CAD program providing multiple options for generative design, each of the generative design processes described in this document can be implemented as a standalone generative design process in a CAD program. Thus, not all of the generative design processes described below in connection with FIGS. 3A-7B need be implemented together in any given implementation.

Figure 3A:
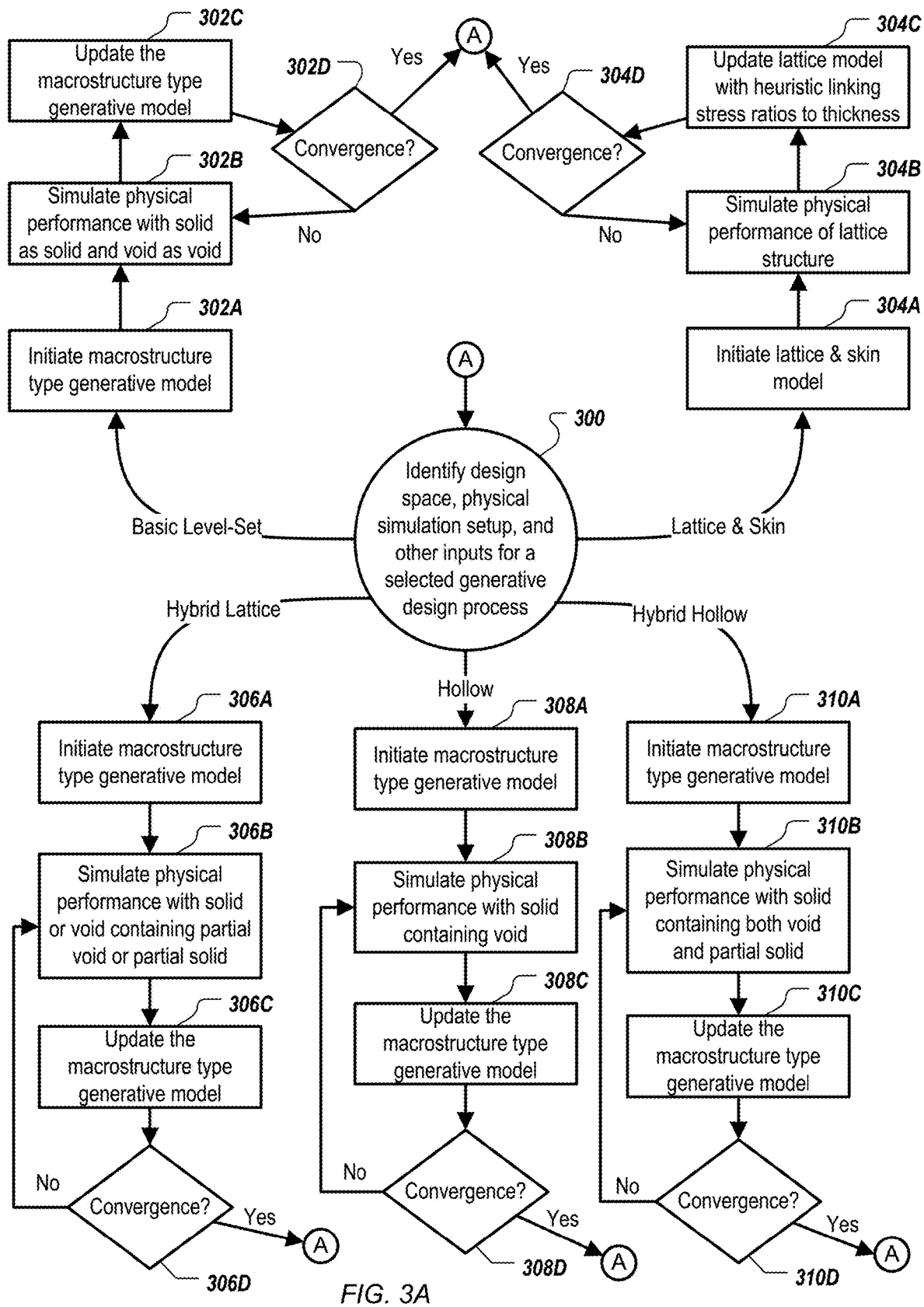
FIG. 3A shows an example of a process that generates one or more portions of a 3D model of an object to be manufactured, where the process includes various available topology optimizations using one or more generative design processes.

FIG. 3A shows an example of a process (e.g., as performed by the CAD program(s) 116 of FIG. 1A) that generates one or more portions of a 3D model of an object to be manufactured, where the process includes various available topology optimizations using one or more generative design processes. A design space, a setup for physical simulation, and other inputs for a selected generative design process are identified 300. This can involve receiving user input, e.g., via UI 122 on display device 120, importing information from another program or a third party source, and/or one or more of these inputs can be predefined in a given implementation.

The setup for physical simulation can include one or more physical properties to be simulated and one or more types of simulation to be performed, as discussed above, as well as potentially surrogate modelling or other methods of approximation. In some implementations, the type of physical simulation is predefined, either for all uses of the program or given a particular context in the program from which the generative design process has been launched. Further, the setup for physical simulation includes at least one set of loading conditions and/or other physical environment information associated with the type of physical simulation to be performed.

The design space can be an initial 3D model or one or more portions of an initial 3D model to be used as a starting geometry. In some cases, the design space can be determined as the bounding box of all initial geometry used to specify loading or other physical environment information associated with the type of physical simulation to be performed. In some cases, the design space can be unbounded. In some implementations, the portion of the design space to be used as starting geometry can be automatically set by a genetic algorithm or other process. For example, bubble like holes (e.g., holes 132B) can be put in the domain and a genetic algorithm can be used to vary the bubble size and spacing. Moreover, the other inputs can depend on the type of physical simulation to be performed and/or the type of generative design process to be used. For example, when a lattice will be used in the generative design process, the other inputs can include, lattice topology, volume fraction, unit size, and thickness.

When the generative process to be used employs a basic level-set method for topology optimization, the level-set is initiated 302A for the design space. Note that a level-set method is an example of a macrostructure generative modeling technique, where the generative model represents the object being designed as one or more boundaries between one or more solid regions (having the homogenous material therein) and one or more void regions (having no material therein) within the design space. In this case, after initiation, the physical simulation of the modelled object is performed 302B, with each solid region being treated as a homogenous solid material, and each void region being treated as having no material therein.

Results from the simulation are used to update 302C the level-set, and a check 302D is made for convergence. The simulation, update and check process then iterates until convergence. A detailed example of this type of macrostructure topology optimization process is now described. For simplicity of presentation, the compliance minimization problem is used with a penalized volume (Equation 26). Moreover, for all the detailed examples below, it is presumed that FEA is used for physical simulation for ease of presentation, but the other physical simulation types noted above can also be used.

The starting shape can simply be the design space or the intersection of design space with a suitable seed geometry. The initial level-set $\psi_0$ can be created by converting the starting shape to a signed distance field (SDF). The conversion can be done using an implementation of an OpenVDB toolkit. Other methods are also possible. Next, the shape can be iteratively optimized until the objective function has converged. The FEA model used for simulation includes solid elements throughout the solid region(s) of the generative design space being optimized. In each iteration, the constitutive model D of each element e in the FEA model can be updated by changing the modulus of elasticity according to the relative location of the element with respect to the current level-set. For example, elements outside the level-set (called void elements) are given very low stiffness $D_v$, while the constitutive model of those inside are set to that of the original solid material $D_s$. This can be achieved by checking the average level-set of the element nodes:

$$\psi(e) = \frac{1}{n_e} \sum_j^{n_e} \psi(n_j) \quad (31)$$

where $n_j$ denotes the coordinates of element nodes. Once the FEA model is up-to-date with the current geometry represented by the level-set, the boundary value problem (Equations 4-6) can be solved in order to compute an advection velocity. Shape changes can be applied by advecting the level-set using, for example, the Hamilton-Jacobi equation:

$$\frac{\partial \psi}{\partial t} - v|\nabla \psi| = 0 \quad (32)$$

where v is the shape derivative (Equation 28). Note that one or more heuristic shape update methods can be used, and one or more methods to move the $0^{th}$ iso-contour of a level-set can be used given a movement direction specified by the shape derivative. A linear mapping between the FEA nodes and the level-set grid points (see Body-fitted Solvers above) can allow the FEA results, e.g., $D\epsilon(u):\epsilon(u)$, to be transferred to the level-set where the advection velocity v is computed.

Figure 3B:
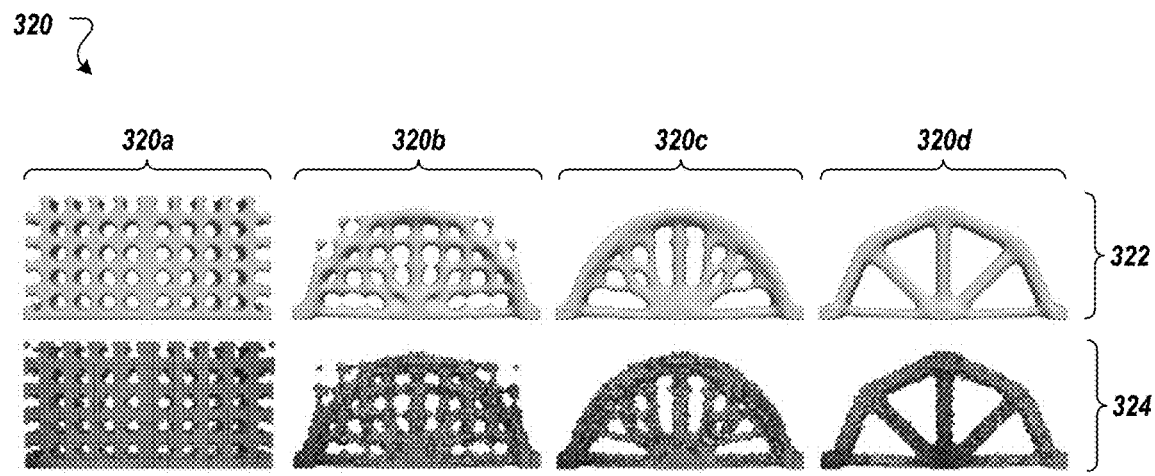
FIG. 3B shows a graphical representation of an example of snapshots from a topology optimization iteration history.

Once the objective function has converged, the surface of the final level-set can be extracted using a contouring method which extracts the $0^{th}$ iso-contour of $\psi$. FIG. 3B shows a graphical representation of an example of snapshots 320 from a topology optimization iteration history. For each of snapshots 320a, 320b, 320c, 320d, a level-set 322 and a corresponding FEA model 324 are shown in FIG. 3B. An example of the algorithm is as follows:

Algorithm 1 - Level-set Based Topology Optimization

Input: $(\Omega, D_v, D_s, \mu)$
Output: $(\Omega_s)$
// initiate level-set $\psi$ from design space
1: $\psi_0 = f_{SDF}(\Omega)$
// iterate until convergence tolerance c is met
2: i = 0
3: while i = 0 or $|J_i - J_{i-1}| > c$ do
// set constitutive model of FEA elements as void $D_v$ or solid $D_s$
4:
$$K_e = \begin{cases} B^T D_s B & \text{if } \psi_i(e) \leq 0 \\ B^T D_v B & \text{if } \psi_i(e) > 0 \end{cases}$$
// formulate and solve FEA problem
5:
$$K = \sum_e^n K_e$$
6: $u - K^{-1}f$
// compute advection velocity Algorithm 1 - Level-set Based Topology Optimization 7:
$$v = \frac{1}{2} D \in (u) : \in (u) + \mu$$
// solve Hamilton- Jacobi and obtain new level-set $\psi_{i+1}$ 8: $\frac{\partial \psi_i}{\partial t} - v|\nabla \psi_i| = 0$ 9: $\psi_{i+1} \leftarrow \psi_i$
// compute objective 10:
$$J_{i+1} = \frac{1}{2} \int_\Omega D \in (u) : \in (u) d\Omega$$
// increment iteration 11: i ← i + 1
12: end while // obtain final level-set as solid region
13:
$$\Omega_s \leftarrow \int_{SDF}^T (\psi_{i+1})$$

Note that generalizing this algorithm for arbitrary objectives and constraints can require modifications, such as the following. In line 6, any adjoint problems (see Adjoint Method above) needed for computing shape derivatives of each objective and constraint should be addressed. In line 7, the augmented Lagrangian method (see Augmented Lagrangian Method above) should be used for combining the different shape derivatives to yield a single advection velocity. For further details regarding implementing these modifications to generative design processes generally, see Augmented Lagrangian Algorithm for Constrained Shape Optimization below.

Returning to FIG. 3A, when the generative process to be used is a lattice and skin optimization, the lattice and skin model is initiated 304A for the design space, where the design space is partitioned into a lattice surrounded by a skin. Note that the lattice is a set of beams of solid material arranged a 3D configuration (topology) and the skin is a thin shell of solid material wrapped around the material of the lattice. After initiation, the physical simulation of the modelled object is performed 304B, and results from the simulation are used to update 304C the lattice model portion of the model using a heuristic that links stress ratios to thickness of the beams in the lattice. This simulation 304B and update 304C process is iteratively performed until convergence 304D. A detailed example of this lattice and skin optimization is now described.

Figure 3C:
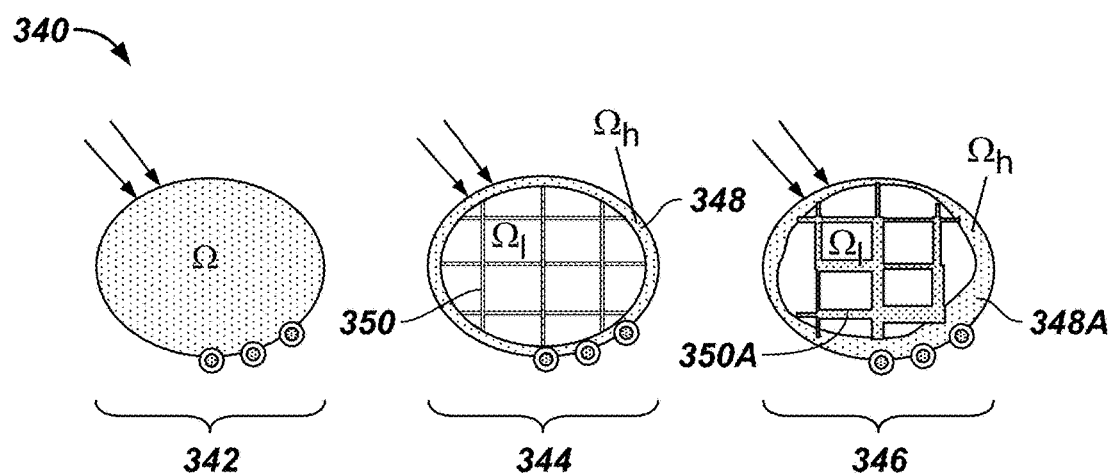
FIG. 3C shows a graphical representation of an example of a process for thickness optimization of lattice and skin.

FIG. 3C shows a graphical representation of an example of a process 340 for thickness optimization of lattice and skin. Lattice and skin optimization can be a two-step process, where a uniform thickness lattice and skin is created in the first step followed by optimization of lattice and skin thickness driven by fully-stressed design principles. For example, an initial solid domain $\Omega$ 342 can be partitioned 344 (by the computer automatically or in response to user input) into a skin $(\Omega_h)$ region 348 and lattice $(\Omega_l)$ region 350, which are then subject to thickness optimizations 346, e.g., skin thickness optimization 348A and/or lattice thickness optimization 350A. Note that one or more suitable manners of creating and optimizing a lattice can be used in some implementations.

Lattice and Skin Creation

Figure 3D:
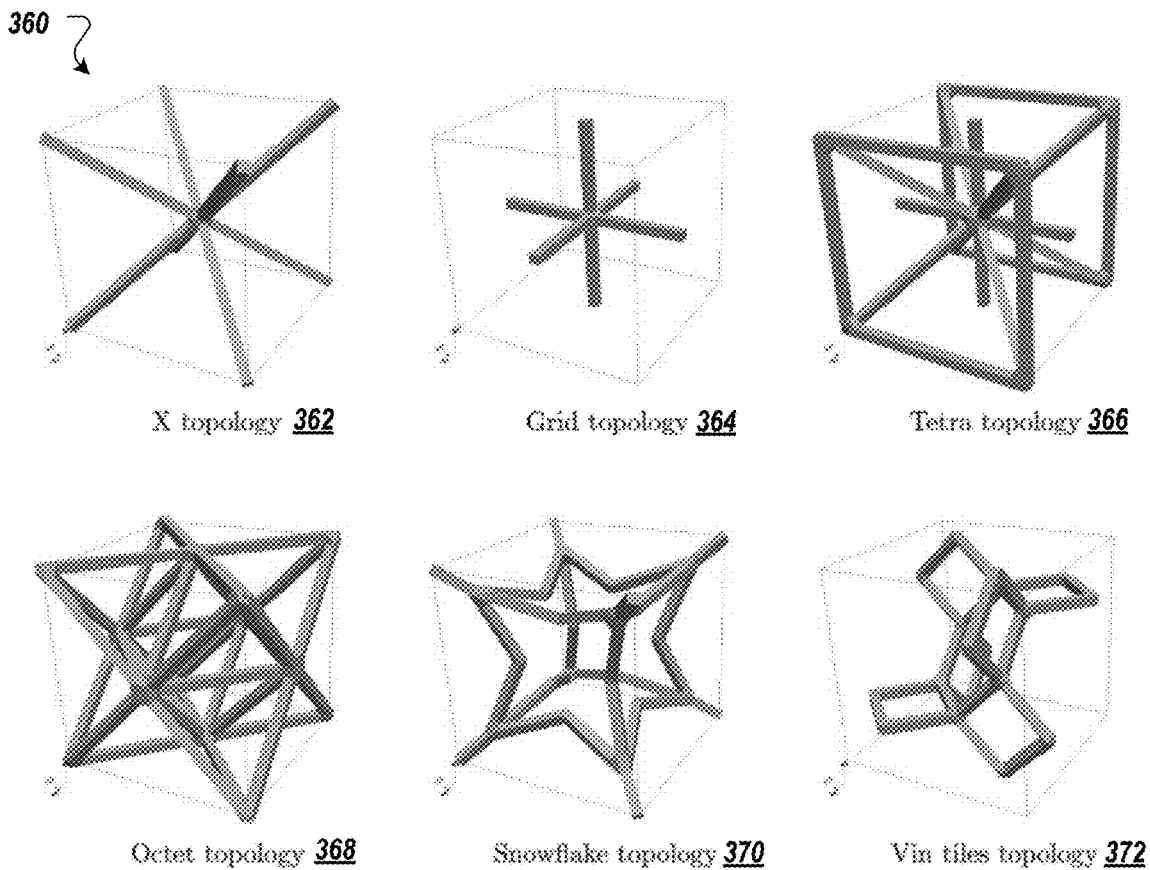
FIG. 3D shows graphical representations of examples of different lattice topologies.

FIG. 3D shows graphical representations of examples of different lattice topologies 360. For example, the different lattice topologies 360 are shown as unit cells (e.g., cubes of dimensions 1×1×1). The different lattice topologies 360 include an X topology 362, a grid topology 364, a tetra topology 366, an octet topology 368, a snowflake topology 370, and a vin tiles topology 372. Other lattice topologies are also possible. Lattice design creation can start by partitioning the original design space to obtain a volumetric subset for lattice creation $\Omega_l \subset \Omega$. Next, the design can be filled with cubes of dimension $u=\{u_x, u_y, u_z\}$, referred to as a unit cell hereafter. The lattice domain can then be tiled with unit cells which are filled with lattice. Lattice from any cubes that intersect the boundary of $\Omega_l$ can be trimmed to ensure that the lattice does not protrude beyond the lattice region.

A precomputed library of lattice unit cells can exist for creating different lattice microstructures T inside a unit cell. The output lattice can depend on the following parameters: 1) lattice topology T: representing different lattice microstructures; 2) unit size vector $u=\{u_x, u_y, u_z\}$: defining the size of the lattice cell; 3) lattice beam thickness $t \in \{t_{min} \leq t \leq t_{max}\}$: thickness of each lattice beam; and 4) offset vector $f=\{f_x, f_y, f_x\}$: unit cells are tiled with an offset from the origin of the lattice domain using this vector.

Figure 3E:
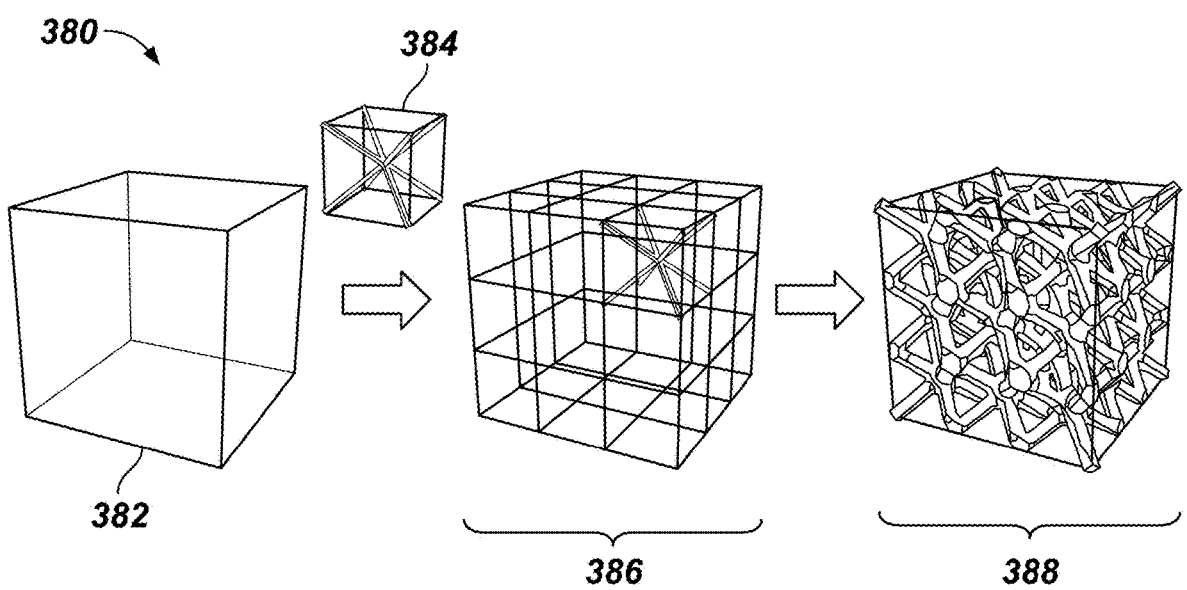
FIG. 3E shows a graphical representation of an example of a process for lattice production using unit cells.

FIG. 3E shows a graphical representation of an example of a process 380 for lattice production using unit cells. The process 380 includes transitions from a design space 382 and unit cell 384 to a design space filled with unit cells 386, and then a transition to a final lattice 388 with optimized beam thickness.

Inputs to skin creation can include one or more user-selected subsets of the design domain surface, hereafter referred to as skin regions $\Gamma_h \subset \Gamma$. Objectives of skin creation can include converting skin regions into a volumetric surface with a given thickness. In each skin region, normals can be computed for each vertex $v_i \in \Gamma_h$ by averaging the polygon normals. Each polygon can then be cloned, and the corner vertices can be moved along the vertex normal according to the specified skin thickness.

Lattice and Skin Optimization

In some implementations, a linear elastic size optimization approach is taken. The lattice and skin can be composed of $n_b$, $n_h$ numbers of beam and shell elements respectively, where $$\Omega_l = \bigcup_i^{n_b} B_i \quad (33)$$

$$\Omega_h = \bigcup_i^{n_h} S_i \quad (34)$$

where $B_i$, $S_i$ denote a beam and shell element of variable thickness respectively. The variable thickness can be realized by having a different thickness value at each vertex. An objective of this generative design process can be to optimize the thickness $t_i$ at each vertex $v_i \in \Omega_l \cup \Omega_h$, for example minimize $J(\Omega_l, \Omega_s, u)$ (35)

subject to $Ku=f$ (36)

$t_{min} \leq t_i \leq t_{max}$ (37)

In a fully-stressed design, the objective function can be a weighted sum of volume and stress $$J(\Omega_l, \Omega_s, u) = \sum_e^n (\sigma_i - \sigma_t) V_i \quad (38)$$

A heuristic approach to the lattice optimization process (e.g., Algorithm 2 below) can be used to optimize the constrained thickness optimization problem of Equations 35-37.

Geometry initialization involves creation of the lattice and skin (see Lattice and Skin Creation above). The lattice can be created inside the lattice design space (this can be a subset of the full domain) using a lattice topology T, unit size u, offset vector f, and the minimum bound $t_{min}$ of the lattice thickness variables. Skin can be created by extruding a subset of polygons $\Gamma_h$ on the domain surface $\Gamma$ such that a skin of thickness equal to the minimum bound $t_{min}$ is created. Before starting the optimization loop, thickness variables can be initiated at the minimum bound as reflected during the lattice and skin creation. Note that each lattice can have two thickness variables corresponding to thicknesses at each end of each beam. Similarly, each polygon on the skin can have the same number of thickness variables as the number of vertices in the polygon. At lattice joints and at skin polygon junctions, the thickness variables can be shared.

The FEA model used for simulation can represent lattice and skin, using beam and shell elements respectively. The FEA model can consist of beam, shell and solid elements, and the geometry model can use the beam and shell thickness values to create lattice and skin, with solid regions remaining unchanged. During each iteration of the optimization process, the stiffness of all beam and shell elements can be updated according to the current value of the corresponding thickness design variables. Once the FEA model is solved, the stress ratio at each lattice beam end and shell polygon vertex can be computed. This stress ratio information can be used to update the thickness for the next iteration, e.g., using a heuristic rule or another approach.

---

Algorithm 2 - Lattice and Skin Thickness Optimization:

Input: $(T, u, f, t_{min}, t_{max}, \Gamma_h, \Omega, \sigma_t)$
Output: $(\Omega_l, \Omega_h, t_i \forall v_i \in \Omega_l \cup \Omega_h)$
// create lattice and skin using mm thickness
1. $\Omega_l (T, u, f, t_{min}) \subset \Omega$
2. $\Omega_h (t_{min}, \Gamma_h) \subset \Omega$
// initiate thickness at all elements in lattice and skin to that of mm thickness
3. $t = t_{min} \forall v_i \in \Omega_l \cup \Omega_h$
// iterate until convergence tolerance c is met
4. $i = 0$
5. while $i = 0$ or $|J_i - J_{i-1}| > c$ do
// compute element stiffness using thickness of vertices in that element
6. $K_e = B(t)^T DB(t) \quad t = \{t_j | \forall v_j \in e\}$
// formulate and solve FEA problem 7. $$K = \sum_e^n K_e$$

8. $u = K^{-1} f$
// compute stress ratio at each vertex

9. $$r_\sigma = \frac{\sigma}{\sigma_t}$$

// compute thickness increment according to stress ratio
10. $\tilde{t} \leftarrow f(r_{\sigma_1}, r_{\sigma_2}, \ldots, r_{\sigma_l}); l = \#loadcases$
// update thickness without violating bounds
11. $t_{i+1}(e) \leftarrow \max(t_{min}, \min(t_i + \tilde{t}, t_{max}))$
// compute objective 12. $$J_{i+1} = \sum_e^n (\sigma_i - \sigma_t) v_i$$

// increment iteration
13. $i \leftarrow i + 1$
14. end while

Note that f in line 10 above is a function of stress ratio from different loading cases. For example, the Fully Stressed Design (FSD) methods designed in Patnaik, et al., "Optimality of a Fully Stressed Design", NASA/TM-1998-207411 can be used. Note that other suitable approaches for translating stress ratios (or other simulation data) into thickness adjustments can be used.

Returning to FIG. 3A, when the generative process to be used employs a lattice hybrid level-set method for topology optimization, the level-set is initiated 306A for the design space. As a level-set method is an example of a macrostructure generative modeling technique, the generative model (e.g., the level-set) represents the object being designed as one or more boundaries between one or more solid regions (having the homogenous material therein) and one or more void regions (having no material therein) within the design space. However, in the case of hybrid topology optimization, as described in this document, the physical simulation of the modelled object is performed 306B with at least a portion of the solid region being treated as having at least one void in it (e.g., what the macrostructure generative modeling technique treats as a solid, the physical simulation treats as partially containing a void in the form of a lattice) or at least a portion of the void region being treated as having at least one solid in it (e.g., what the macrostructure generative modeling technique treats as a void, the physical simulation treats as partially containing a solid material in the form of a lattice).

Results from the simulation are used to update 306C the level-set, and a check 306D is made for convergence. The simulation, update and check process then iterates until convergence. A detailed example of this type of macrostructure hybrid topology optimization process is now described, where topology optimization and latticing can be used together to produce a final design which contains solid or void, and lattice. But rather than manually creating such a design by replacing solid or void regions (of a generated topology) with lattice, which can lead to sub-optimal designs, the effects of lattice behavior can be taken into consideration during topology optimization, which can result in improved design for the structure, such as a stronger or more durable part, less material usage, or a combination thereof, such as an improved strength to weight ratio.

To account for lattice behavior during topology optimization, a homogenized lattice material representation can be created for the lattice. The homogenized lattice material representation expresses stiffness of a lattice, which is composed of beams and void regions, as a function of lattice topology and volume fraction for the lattice (and potentially other lattice settings) with a uniform thickness of the beams in the lattice. For example, each of the available lattice topologies, e.g., lattice topologies 360, can have representative volume elements (RVE) produced for it. One or more methods for creating representative volume elements (RVEs) for lattices can be used, including that which is described in PCT Publication No. WO 2017/186786 A1, filed 26 Apr. 2017, and U.S. application Ser. No. 16/096,623, filed Oct. 25, 2018, both titled "METHOD AND SYSTEM FOR GENERATING LATTICE RECOMMENDATIONS IN COMPUTER AIDED DESIGN APPLICATIONS".

The RVE concept can assume that a specific shape/pattern of the microstructure is repeated in the lattice. Therefore, instead of modeling the entire lattice structure, the repeated portion of shape/pattern (the RVE) can be modeled with appropriate periodic boundary conditions. Once the behavior of RVE is calculated, the repeated portion can be homogenized and represented as an anisotropic material. Therefore, the lattice microstructures can be represented as a continuous material with equivalent properties. These equivalent properties can be obtained by a suitable micromechanical modelling process, e.g., the use of a homogenization method to create representative volume elements for different lattice topologies. A widely-used lattice in homogenization is the Octet lattice and its analytically computed RVE. A database of numerically computed lattice RVE properties can be built for use in the hybrid topology optimization. Thus, the hybrid topology optimization can combine latticing with level-set based topology optimization using homogenized lattice RVEs.

Homogenization

Multiple lattice topology types (see e.g., FIG. 3D) can be used for lattice creation. Each topology type can have a unique structural behavior and can result in different optimal designs when used for optimization of structural components. Additionally, structural behavior can vary with base material, lattice orientation, unit size, and thickness. Therefore, different levels of integrating topology optimization with lattice structures can exist in various implementations.

In order to be integrated into a topology optimization method, the lattice stiffness can be expressed as a function of material density (volume fraction) and lattice topology type. The lattice volume fraction $x_l$ can be related to the unit size u ($u=u_x=u_y=u_z$) and thickness t using a characteristic length $c_T$ which depends on the lattice topology type as $$x_l = \frac{\pi c_T t^2}{4u^2} \tag{39}$$

A linear elastic constitutive model can be used to represent the behavior of a homogenized lattice as $$\in = \hat{D}\sigma \tag{40}$$

where σ and ∈, respectively, contain the components of the Cauchy stress tensor and the corresponding strain tensor given by $$\sigma^T = \{\sigma_{xx}, \sigma_{yy}, \sigma_{zz}, \sigma_{xy}, \sigma_{xz}, \sigma_{yz}\} \tag{41}$$

$$\in^T = \{\in_{xx}, \in_{yy}, \in_{zz}, \gamma_{xy}, \gamma_{xz}, \gamma_{yz}\} \tag{42}$$

Note that for an isotropic linear elastic material, the constitutive matrix can be given by $$\hat{D} = \begin{bmatrix} a & b & b & 0 & 0 & 0 \\ b & a & b & 0 & 0 & 0 \\ b & b & a & 0 & 0 & 0 \\ 0 & 0 & 0 & c & 0 & 0 \\ 0 & 0 & 0 & 0 & c & 0 \\ 0 & 0 & 0 & 0 & 0 & c \end{bmatrix} \tag{43}$$

$$a = \frac{1}{E}, b = \frac{-v}{E}, c = \frac{E}{2(1+v)} \tag{44}$$

with E, v denoting the Young's modulus and Poisson's ratio, respectively.

Further, the stress and strain in Equation 40 are not the stress and strain in the lattice beams but that of the homogenized RVE. Therefore, the stress and strain information in the lattice beams should be converted to that of the homogenized RVE. First, the stress can be applied on the boundary of the RVE as a surface traction. For example, $\sigma_{11}=1$ on the boundary can be achieved by applying a uniform surface traction $t=u^2$. On the other hand, the strain can be obtained by averaging on the boundary.

In addition, since the RVE represents a potentially infinitely repeating shape/pattern, periodic boundary conditions should be applied. Lastly, due to lattice layouts and orientation, the RVE shows anisotropic material properties. In the present application, the lattice can be considered as an anisotropic material with no planes of symmetry with the constitutive matrix given by $$\hat{D} = d_{ij}, \ i,j \in \{1,2,\ldots,6\} \quad (45)$$

With reference to Equation 40, each column in the $\hat{D}$ matrix includes the strain components obtained by applying a unit stress component on the boundary of the RVE of the required lattice. Essentially, the entries of the $i^{th}$ column in the $\hat{D}$ matrix can be given by the components of the vector E obtained by setting the $i^{th}$ stress component to 1. For example, the second column of the $\hat{D}$ matrix can be obtained by applying $\sigma_{22}=1$ as $$\begin{bmatrix} \epsilon_{xx} \\ \epsilon_{yy} \\ \epsilon_{zz} \\ \epsilon_{xy} \\ \epsilon_{xz} \\ \epsilon_{yz} \end{bmatrix} = \begin{bmatrix} d_{11} & d_{12} & d_{13} & d_{14} & d_{15} & d_{16} \\ d_{21} & d_{22} & d_{23} & d_{24} & d_{25} & d_{26} \\ d_{31} & d_{32} & d_{33} & d_{34} & d_{35} & d_{36} \\ d_{41} & d_{42} & d_{43} & d_{44} & d_{45} & d_{46} \\ d_{51} & d_{52} & d_{53} & d_{54} & d_{55} & d_{56} \\ d_{61} & d_{62} & d_{63} & d_{64} & d_{65} & d_{66} \end{bmatrix} \begin{bmatrix} 0 \\ 1 \\ 0 \\ 0 \\ 0 \\ 0 \end{bmatrix} \quad (46)$$

$$\epsilon = [d_{12} d_{22} d_{32} d_{42} d_{52} d_{62}]^T \quad (47)$$

Variation with Lattice Volume Fraction

Since the lattice volume fraction can be changed during topology optimization, it can be advantageous to define a functional relationship between the constitutive matrix $\hat{D}$ and the volume fraction. The relationship between $d_{ij}$ and lattice volume fraction $x_l$ can be expressed using a fourth-order polynomial as $$d_{ij} = \xi(x_l)^T b_{ij} \quad (48)$$

where $\xi(x_l) = \{x_l^4 \ x_l^3 \ x_l^2 \ x_l\}^T$ is the vector of monomial bases, and $b_{ij} = \{a_{ij} \ b_{ij} \ c_{ij} \ d_{ij} \ e_{ij}\}$ is a vector of unknown coefficients.

The unknown polynomial coefficients can be estimated by numerically computing $\hat{D}$ for several discrete values of $x_l \in D$, for example, with $D=\{0.1, 0.15, 0.2, \ldots, 0.75\}$. As expected, the constitutive properties can be a monotonic function of volume fraction. Therefore, the fourth-order polynomial approximation in Equation 48 can be a reasonable choice. Note that high values of $x_l$ are not computed owing to the dependence on Poisson's ratio. Instead, this can be taken into account by using the $\hat{D}$ of the fully solid material corresponding to $x_l=1$. For further details regarding the variation of $\hat{D}$ matrix entries with lattice volume fraction for different lattice topologies, see PCT Publication No. WO 2017/186786 A1, filed 26 Apr. 2017, and U.S. application Ser. No. 16/096,623, filed Oct. 25, 2018, both titled "METHOD AND SYSTEM FOR GENERATING LATTICE RECOMMENDATIONS IN COMPUTER AIDED DESIGN APPLICATIONS".

Predicting RVE for Arbitrary Lattice Properties

Generating the complete lattice RVE database involves computing and storing $d_{ij}$ entries of D matrices for several discrete $x_l \in D$. Conventional regression (e.g., least-squares method) can then be used during the numerical $\hat{D}$ matrix computations in Equation 48. Note that some reference $x_l^0$, $E^0$, and $v^0$ values can be used during the numerical $\hat{D}$ matrix computations. The procedure for computing the constitutive matrix $\hat{D}$ for the RVE with arbitrary $\tilde{x}_l$, $\tilde{E}$, and $\tilde{v}$ using this database can be as follows.

First, n discrete data points in D around the requested $x_l$ value can be selected. Since there are five unknown coefficients, it can be advantageous to use at least 10 data points in order to prevent over-fitting.

$$\{x_1, x_2, \ldots, x_n\} \in D \quad (49)$$

$$x_1 < x_2 < \ldots < x_n \quad (50)$$

$$x_1 \leq \tilde{x}_l \leq x_n \quad (51)$$

At each data point, the vector of bases in Equation 48 can be evaluated. By stacking the row vectors of bases, the following n×4 a moment can be generated:

$$X = \begin{bmatrix} (x_1)^4 & (x_1)^3 & (x_1)^2 & x_1 & 1 \\ (x_2)^4 & (x_2)^3 & (x_2)^2 & x_2 & 1 \\ \vdots & \vdots & \vdots & \vdots & \vdots \\ (x_n)^4 & (x_n)^3 & (x_n)^2 & x_n & 1 \end{bmatrix} \quad (52)$$

Also, the values of $d_{ij}$ at all data points can be collected to build the vector of responses $y_{ij} = \{d_{ij}(x_1), d_{ij}(x_2), \ldots, d_{ij}(x_n),\}^T$.

Second, if the selected data points include $x_l=1$, then $d_{ij}(\tilde{E}, \tilde{v})$ can be computed at $x_l=1$ using Equations 43-44. Third, precomputed discrete $d_{ij}$ values can be corrected to account for actual elastic modulus:

$$d_{ij}(\tilde{E}, \tilde{v}) = 1/\tilde{E} \frac{d_{ij}(E^0, v^0)}{1/E^0} \quad (53)$$

Fourth, the polynomial coefficients in Equation 48 can be determined using linear regression.

$$b_{ij} = [X^T X]^{-1} \{X^T y_{ij}\} \quad (54)$$

Fifth, once the unknown coefficients are calculated from Equation 54, the individual components of the constitutive matrix of the lattice RVE for given $\tilde{x}_l$, $\tilde{E}$, $\tilde{v}$ can be computed using Equation 48 as $$d_{ij}(x_l) = \xi(x_l)^T b_{ij} \quad (55)$$

Design Workflow

Figure 4A:
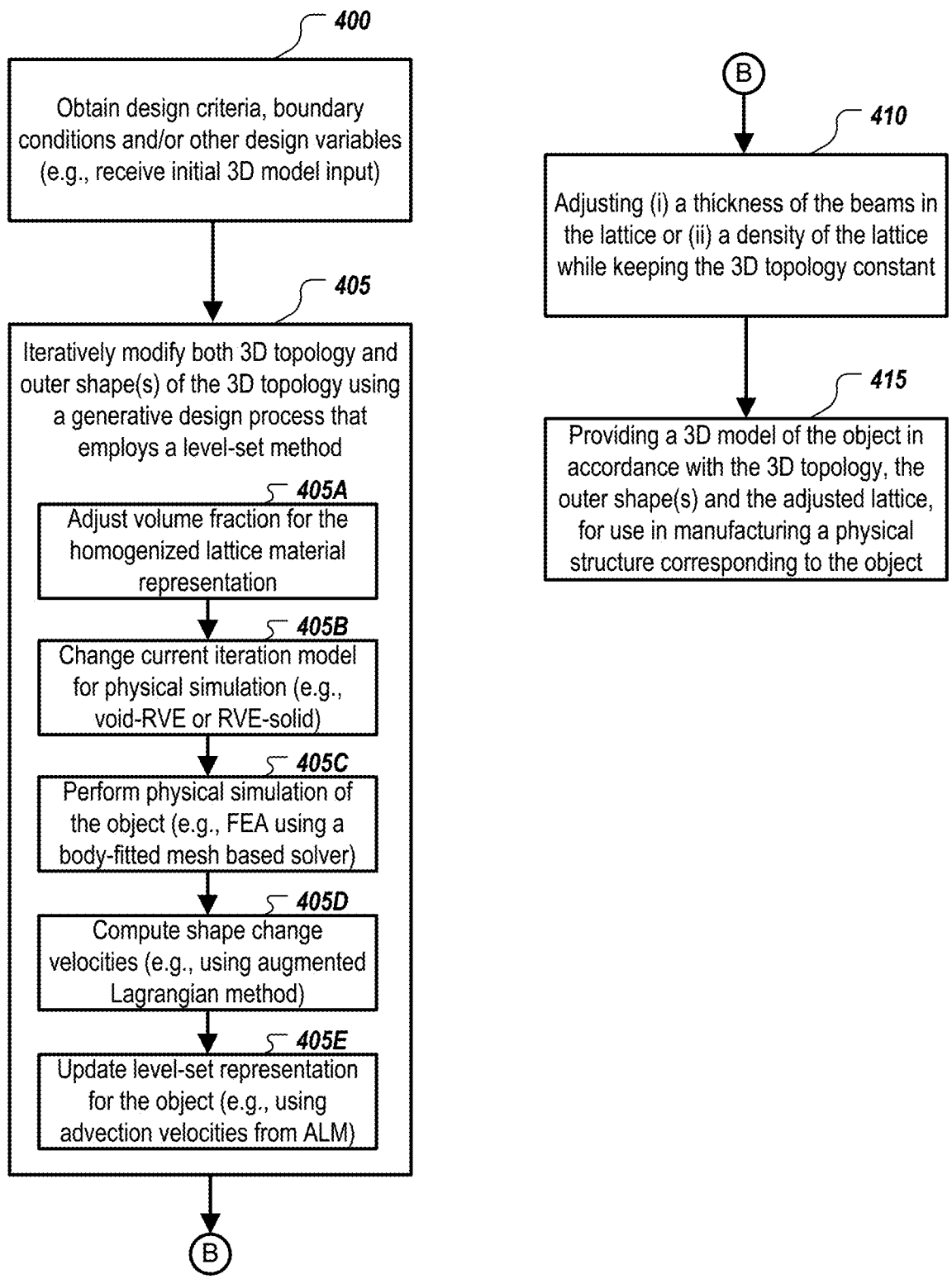
FIG. 4A shows an example of a process that optimizes a topology of lattice infill for one or more portions of a 3D model of an object being generatively designed for manufacture.
Figure 4B:
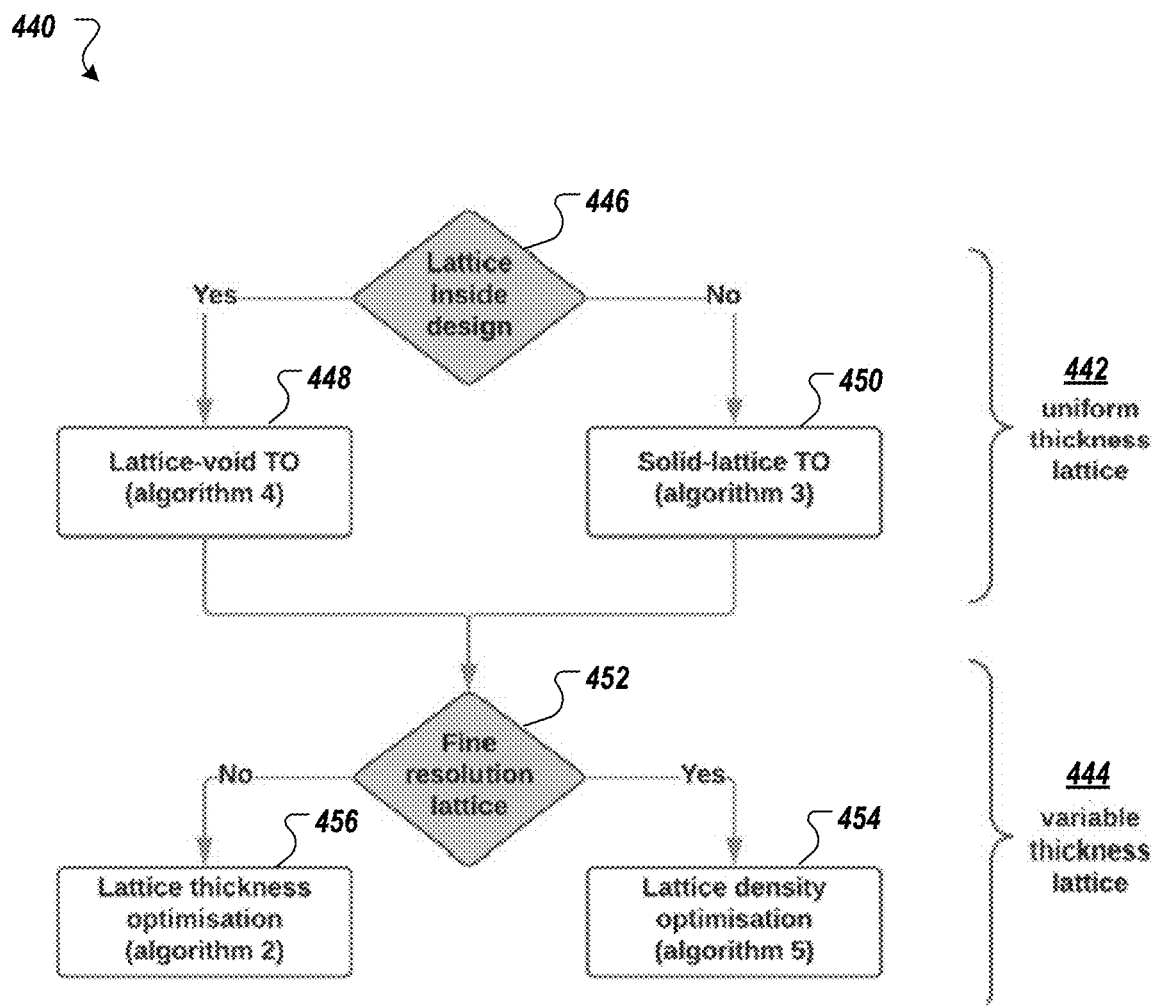
FIG. 4B shows an example of a process for a design workflow for hybrid topology optimization.

FIG. 4B shows an example of a process 440 for a design workflow for hybrid topology optimization, e.g., as performed by the CAD program(s) 116 of FIG. 1A. In the process 440, the topology can be optimized while keeping the lattice thickness constant. The topology is optimized 442 for a uniform thickness lattice. Two types of designs are possible from the process 440 due to two possible options 448 and 450. At 446, a check can be made as to whether to have lattice inside the optimized topology design (as opposed to outside the optimized topology design). A first option involves partitioning the design space into solid and lattice regions, in which case Algorithm 3 can be used to perform solid-lattice topology optimization 450, such as shown in FIGS. 4C and 4D.

Figure 4C:
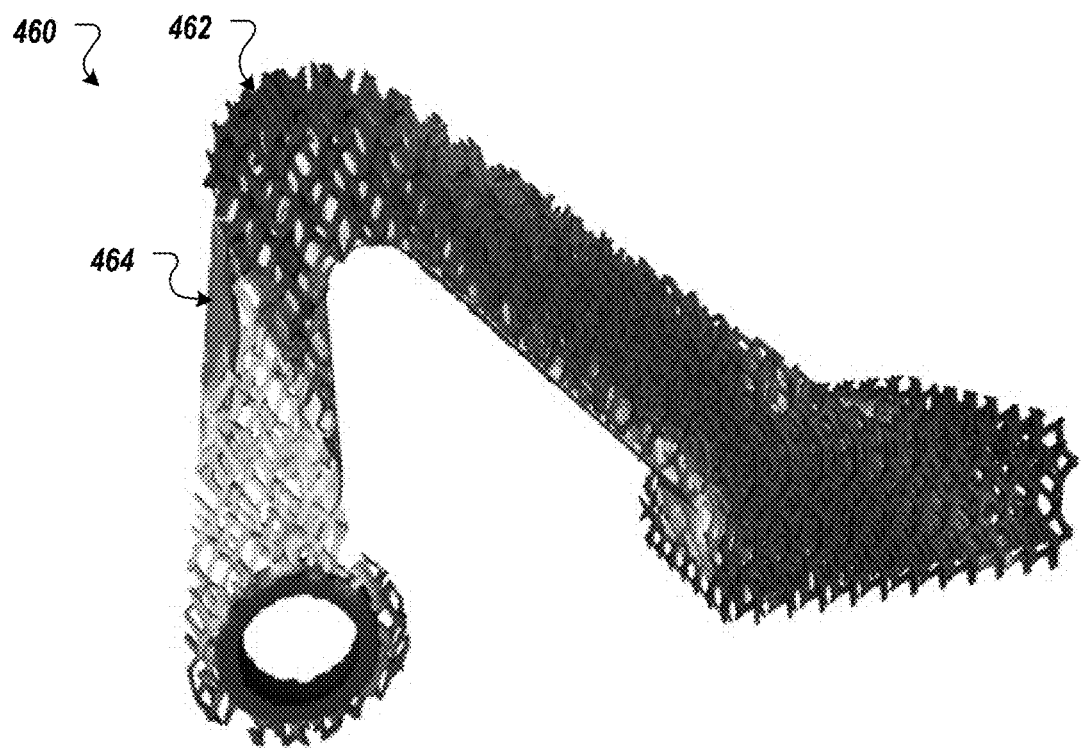
FIG. 4C shows a graphical representation of an example of a 3D view of output from a solid-lattice hybrid topology optimization.
Figure 4D:
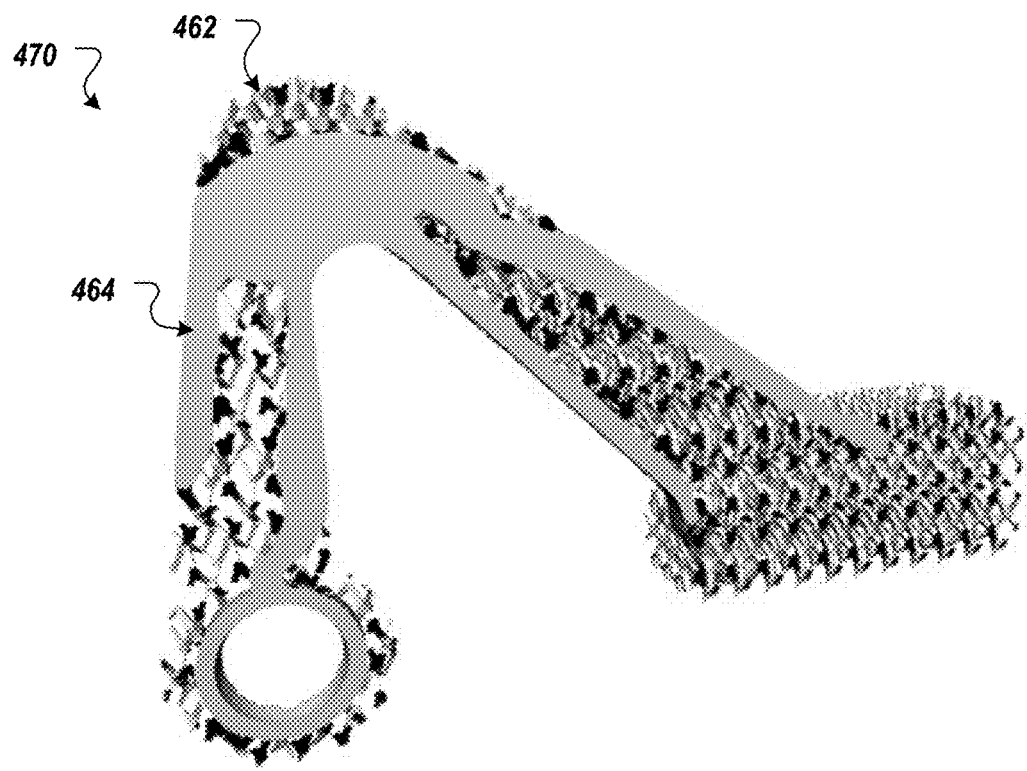
FIG. 4D shows a graphical representation of an example of a sliced view of output from the solid-lattice hybrid topology optimization of FIG. 4C.

FIG. 4C shows a graphical representation of an example of a 3D view 460 of output from a solid-lattice hybrid topology optimization. FIG. 4D shows a graphical representation of an example of a sliced view 470 of output from the solid-lattice hybrid topology optimization of FIG. 4C. As shown, the lattice 462 is on the outside of a topology optimized surface around a solid region 464. This is an example of inside-out hybrid topology optimization in which the lattice infill is present in a negative space between the topology-optimized design and the original design space.

Figure 4E:
FIG. 4E shows a graphical representation of an example of a 3D view of output from a lattice-void hybrid topology optimization.
Figure 4F:
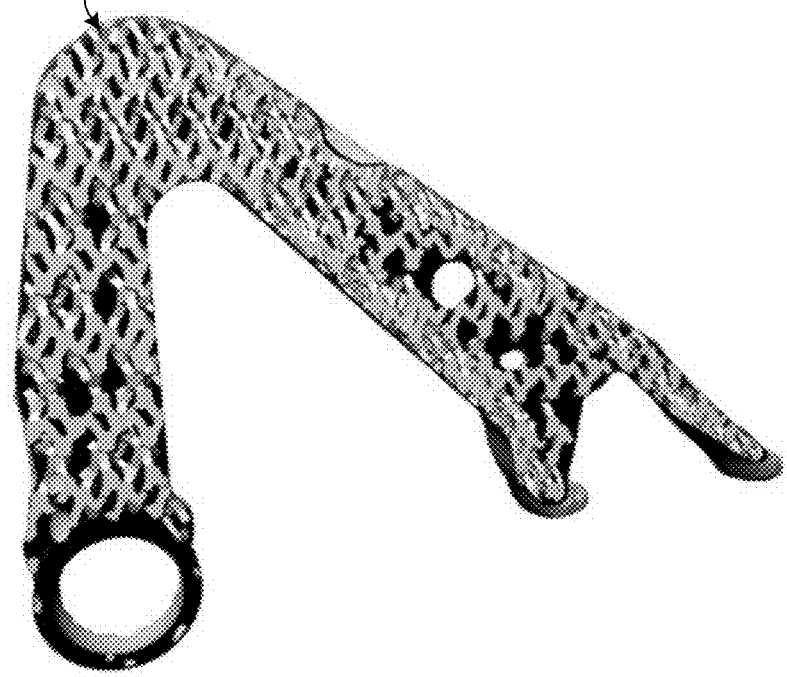
FIG. 4F shows a graphical representation of an example of a sliced view of output from the lattice-void hybrid topology optimization of FIG. 4E.

A second option involves partitioning the design space into lattice and void regions, in which case Algorithm 4 can be used to perform lattice-void topology optimization 448, such as shown in FIGS. 4E and 4F. FIG. 4E shows a graphical representation of an example of a 3D view 480 of output from a lattice-void hybrid topology optimization. FIG. 4F shows a graphical representation of an example of a sliced view 490 of output from the lattice-void hybrid topology optimization of FIG. 4E. As shown, the lattice 482 is on the inside of a topology optimized surface 484. This is an example of hybrid topology optimization that provides a topology optimization with lattice infill.

Note that some implementations include either the first or the second option, and some implementations include both options and allow the user to select the type of hybrid lattice topology optimization to be performed for any given design space based on aesthetic, structural integrity, or other reasons. Further, some implementations also include a choice for how to optimize 444 variable thickness(es) of the beams in the lattice, after a topology of the structure is optimized 442 with the thickness of the lattice kept constant. In some implementations, the type of lattice thickness optimization performed depends on the type of topology optimization that was previously performed (e.g., different types of thickness optimization(s) can be performed in view of potential inaccuracies in the homogenization process, e.g., for coarse resolution lattices).

For example, a check can be made at 452 for the resolution of lattice used during the topology optimization 442, and if a fine resolution lattice was used, then option 454 (e.g., lattice density optimization using Algorithm 5) can be used; otherwise, option 456 (e.g., lattice thickness optimization using Algorithm 2) can be used. Note that the resolution of lattice that constitutes a "fine resolution lattice" can be determined by experiment in a given implementation and/or a heuristic rule (e.g., a lattice unit cell volume/total volume <0.02 means the lattice is fine) can be used.

A detailed example of how to perform hybrid topology optimization using a level-set method is now described. For simplicity of the algorithm, the compliance minimization problem with a penalized volume (Equation 26) can be used.

Topology Optimization Stage

An example solid-lattice design process is listed in Algorithm 3 in which a starting shape and a level-set are identical to that of Algorithm 1. Unlike lattice and skin optimization (Algorithm 2), the starting lattice thickness (and the corresponding volume fraction) can be set to a high value close to the maximum allowable. The corresponding lattice constitutive model can be obtained using the methods outlined above (see Homogenization). The FEA model used for simulation includes solid elements throughout the solid region(s) of the generative design space being optimized. Next, the shape can be iteratively optimized until the objective function has converged. In each iteration, the constitutive model D of each element e in the FEA model can be updated as in the basic topology optimization method, but elements outside the level-set are given the lattice constitutive model $D_l$, while the constitutive model of those inside are set to that of the original solid material $D_s$. The remaining steps are identical to that of Algorithm 1 until the extraction of the final level-set surface, which defines the final solid region.

---

Algorithm 3 - Solid-Lattice Hybrid Topology Optimization

Input: (T, u $t_{min}$, $t_{max}$, $\Omega$, $D_s$, $\mu$)
Output: ($\Omega_l$, $\Omega_s$)
// initiate level-set ip from design space
1. $\psi_0 = f_{SDF}(\Omega)$
// set initial lattice thickness
2. $t_0 = t_{min} + .75(t_{max} - t_{min})$
// compute initial lattice volume fraction and obtain lattice constitutive model $D_l$ 3. $$x_l = \frac{\pi c_T t_0^2}{4u^2}$$

4. $D_l \leftarrow f_{RVE}(T, u, x_l)$
// iterate until convergence tolerance c is met 5. i = 0
6. while i = 0 or $|J_i - J_{i-1}| > c$ do 7. $$K_e = \begin{cases} B^T D_s B & \text{if } \psi_i(e) \leq 0 \\ B^T D_l B & \text{if } \psi_i(e) > 0 \end{cases}$$
// formulate and solve FEA problem 8. $$K = \sum_e^n K_e$$

9. $u = K^{-1}f$
// compute advection velocity

10. $$v = \frac{1}{2} D \in (u) : \in (u) + \mu$$
// solve Hamilton-Jacobi and obtain new level-set $\psi_{i+1}$ 11. $$\frac{\partial \psi_i}{\partial t} - v|\nabla \psi_i| = 0$$

12. $\psi_{i+1} \leftarrow \psi_i$
// compute objective

13. $$J_{i+1} = \frac{1}{2} \int_\Omega D \in (u) : \in (u) d\Omega.$$
// increment iteration 14. i ← i + 1
15. end while
// obtain final level-set as solid region
16. $\Omega_s \leftarrow f_{SDF}^T(\psi_{i+1})$
// obtain final lattice region
17. $\Omega_l \leftarrow \Omega \setminus \Omega_l$

---

The lattice region can be determined as a difference between the original design space and the solid region. In some implementations, the OpenVDB method can be used to extract the final level-set. Note that extraction of the final level-set in a form that is useable for the next stage can be performed using meshes, B-Rep or level-set space.

The lattice-void design process (Algorithm 4) is different from the solid-lattice process (Algorithm 3) in two steps. For example, in step 7, the element update rule is changed to set the lattice constitutive model $D_l$ for elements inside the level-set. Further, elements outside the level-set (void elements) are given a very low stiffness $D_v$.

---

Algorithm 4 - Lattice-Void Hybrid Topology Optimization

Input: (T, u, $t_{min}^l$, $t_{max}^l$, $\Omega$, $D_v$, $\mu$)
Output: ($\Omega_l$)
// initiate level-set $\psi$ from design space
1. $\psi_0 = f_{SDF}(\Omega)$ -continued Algorithm 4 - Lattice-Void Hybrid Topology Optimization // set initial lattice thickness to 75% of max thickness
2. $t_0 = t_{min}^l + .75 (t_{max}^l - t_{min}^l)$
// compute initial lattice volume fraction and
obtain lattice constitutive model $D_l$ 3. $$x_l = \frac{\pi c_T t_0^2}{4u^2}$$

4. $D_l \leftarrow f_{RVE}(T, u, x_l)$
// iterate until convergence tolerance c is met
5. i = 0
6. while i = 0 or $|J_i - J_{i-1}| > c$ do
// set constitutive model of FEA elements as lattice $D_l$ or void $D_v$ 7. $$K_e = \begin{cases} B^T D_l B & \text{if } \psi(e) \leq 0 \\ B^T D_v B & \text{if } \psi_i(e) > 0 \end{cases}$$

// formulate and solve FEA problem

8. $$K = \sum_e^n K_e$$

9. $u = K^{-1}f$
// compute advection velocity

10. $$v = \frac{1}{2} D \in (u) : \in (u) + \mu$$

// solve Hamilton-Jacobi and obtain new level-set $\psi_{i+1}$

11. $$\frac{\partial \psi_i}{\partial t} - v|\nabla \psi_i| = 0$$

12. $\psi_{i+1} \leftarrow \psi_i$
// compute advection velocity

13. $$J_{i+1} = \frac{1}{2} \int_\Omega D \in (u) : \in (u) d\Omega$$

14. $i \leftarrow i + 1$
15. end while
// obtain final level-set as lattice region
16. $\Omega_l \leftarrow f_{STD}^T (\Omega_{i+1})$ Finally, in step 16, the 0th iso-contour surface of the final level-set can define the lattice region. In some implementations, the OpenVDB method can be used to extract the final level-set. Note that extraction of the final level-set in a form that is useable for the next stage can be performed using meshes, B-Rep or level-set space.

Thickness Optimization Stage

Once the optimized topology of the lattice regions is obtained using either Algorithm 3 or 4, the lattice thickness optimization can take place using the lattice and skin thickness optimization process (see Lattice and Skin Optimization above). This can require changing the FEA model where the solid elements with lattice RVEs are replaced by beam elements before the thickness is optimized. Alternatively, the thickness optimization can be done using solid elements with equivalent lattice properties (RVEs) as outlined in Algorithm 5. Note that this method can be more relevant when a fine resolution lattice is in use. Such a lattice can result in a large number of beam elements in the FEA model when using the thickness optimization process (see Lattice and Skin Optimization above).

In Algorithm 5, the thickness design variable can be represented by volume fraction at each solid element in the lattice region. The thickness values are initiated to the minimum thickness $t_{min}$ at the start of the algorithm. The FEA model used for simulation can represent a lattice as a solid element with equivalent lattice properties (RVEs). During each iteration of the optimization process, the RVE of each solid elements can be recomputed according to the current value of the corresponding thickness design variable. This can be done by first converting the thickness into a volume fraction using Equation 39. The RVE can then be recomputed (see Homogenization above). Once the FEA model is solved, the stress ratio at each solid element can be computed. The stress ratio can be used to update the thickness for the next iteration using the same fully stressed design method from Algorithm 2.

At the end of optimization, the actual lattice geometry can be created in the lattice region with the thickness values at each beam mapped from the solid mesh used for simulation. The same linear mapping between the FEA nodes and the level-set grid points (see Body-Fitted Solvers above) can be used to this end.

Algorithm 5 - Lattice Density Optimization

Input: (T, u, $t_{min}$, $t_{max}$, $\Omega_l$, $\sigma_t$)
Output: $(t(e) \forall e \in \Omega_l$
// initiate lattice thickness at all elements in lattice region to
that of mm thickness
1. $t(e) = t_{min} \forall e \in \Omega_l$
// iterate until convergence tolerance c is met
2. i = 0
3. while i = 0 or $|J_i - J_{i-1}| > c$ do
// compute volume fraction and update lattice
constitutive model 4. $$x_l(e) = \frac{\pi c_T t(e)^2}{4u^2}$$

5. $D_l(e) \leftarrow f_{RVE}(T, u, x_l(e))$
// formulate and solve FEA problem

6. $K = \int_\Omega B_T D_l(e) B$
7. $u = K^{-1}f$
// compute stress ratio at each vertex 8. $$r_\sigma = \frac{\sigma(e)}{\sigma_t}$$

// compute thickness increment according to stress ratio
// (for example, $\alpha = .5$, $\beta = 0.1$, $\gamma = 0.5$)

9. $$\tilde{t} = \begin{cases} (1-\alpha)t_i & \text{if } r_\sigma \leq \beta \\ r_\sigma^\gamma t_i & \text{if } r_\sigma > \beta \end{cases}$$

// update thickness without violating bounds
10. $t_{i+1}(e) \leftarrow \max(t_{min}, \min(t_i + \tilde{t}, t_{max}))$
// compute objective 11. $$J_{i+1} = \frac{1}{2} \int_\Omega D \in (u) : \in (u) d\Omega$$

// increment iteration

12. $i \leftarrow i + 1$
13. end while
// create lattice after mapping thickness at solid
elements to level-set grid
14. $\Omega_l(T, u, f, t) \in \Omega$ Note that while the detailed example above uses a level-set representation and level-set method, other macrostructure-type topology optimization systems and techniques can be used.

Topology Generation with Lattices for CAD Applications

FIG. 4A shows an example of a process (e.g., as performed by the CAD program(s) 116 of FIG. 1A) that optimizes a topology of lattice infill for one or more portions of a 3D model of an object being generatively designed for manufacture. Design criteria, boundary conditions and/or other design variables are obtained 400, e.g., by the CAD program(s) 116. This can involve receiving user input, e.g., via UI 122 on display device 120, importing information from another program or a third party source, and/or one or more of these inputs can be predefined in a given implementation.

The boundary conditions can be a mechanical problem definition and input solid(s) that are preserved for use as connection point(s) with other component(s) in a larger 3D model or separate 3D model(s). In some implementations, the obtaining 400 includes receiving input 400, e.g., via UI 122 on display device 120, indicating an initial 3D model defining at least a portion of the design space for topology optimization of the object. In some implementations, the user is enabled, e.g., via UI 122 on display device 120, to select multiple parts from an assembly shown in the UI, and the user is enabled to indicate loading points and keep away regions for the design. The software, e.g., CAD program(s) 116, can then use the inverse of these as the design space. Other inputs can also be received 400, such as a selected lattice topology.

The design criteria can include one or more design objectives and one or more design constraints. Design objectives can include those that minimize one or more cost functions and/or that maximize one or more utility functions for the object to be manufactured. In some implementations, design objectives include one or more of the following: (1) minimizing material usage (e.g., waste material), (2) minimizing weight, (3) minimizing manufacturing time, (4) maximizing tool life, (5) maximizing ability to remove support material, (6) targeting a set natural frequency (e.g., higher/lower natural modes of vibration to achieve vibration damping), and (7) positioning and packing of parts within the structure (e.g., electronic components for circuit actuation, including reserving space for cabling between components in an assembly, limiting cabling length, and/or components for structural health monitoring, as well as assembly considerations to ensure each component can be added/removed independently or with a limited number of steps). Design constraints can include those that address manufacturing requirements and/or that address use requirements. In some implementations, design constraints include one or more of the following: (1) manufacturing constraints that restrict geometries to those that can be manufactured (e.g., minimum self-supporting angle for AM processes in which separate support material will not be used, subject to build direction when appropriate, or mechanical access constraints for AM or SM processes, such as 3-axis, 5-axis and/or 2.5-axis CNC constraints), (2) thermo-mechanical constraints, (3) material fraction or variation constraints, (4) structural integrity, (5) stiffness, (6) compliance, (7) stress criteria (e.g., Von Mises or Tsai-Wu stress for manufacturing or use), (8) physical constraints (non-interference with larger system of parts), and (9) damage constraints (e.g., brittle elastic fraction resistance). In some implementations, the design criteria include minimizing compliance with volume, stress, displacement, buckling safety factor, and/or natural frequency constraints, but the method(s) can be generalized to other design objectives and constraints, including minimizing volume, deviation (e.g., least square deviation) from a target (compliant mechanism), and/or design dependent loads (pressure loads).

In some implementations, a design space for an object to be manufactured, a setup for physical simulation of the object, at least one design objective for the object, and at least one design constraint for the object are obtained 400, e.g., by the CAD program(s) 116 of FIG. 1A. The physical simulation performed by the systems and techniques described in this document can simulate one or more physical properties and can use one or more types of simulation. For example, FEA, including linear static FEA, finite difference method(s), and material point method(s) can be used. Further, the simulation of physical properties can include, among other possibilities, simulating buckling, natural frequency, thermal, electric or electro-magnetic flux, and material solidification properties. Note that the setup for physical simulation(s) will be different for different physical simulation(s).

Both a three dimensional topology of a generative model for the object and one or more outer shapes of the three dimensional topology are iteratively modified 405, e.g., by the CAD program(s) 116, using a generative design process that employs a level-set method of topology optimization and a level-set representation of the generative model in the design space. For example, this can include using gradient based algorithms to optimize the 3D topology and shape of the object model. In some implementations, the iterative modification 405 involves using the systems and techniques described above in connection with FIGS. 3A (Hybrid Lattice) and 4B-4F.

In a hybrid lattice approach to topology optimization, a homogenized lattice material representation is used, where the homogenized lattice material representation expresses stiffness of a lattice, which is composed of beams and void regions, as a function of lattice topology and volume fraction for the lattice, as described above, e.g., using RVEs corresponding to different lattice topologies. Note that volume fraction is a function of cell size and beam thickness, and additional lattice settings can be used, as noted above. Various approaches to producing RVEs can be used. In general, the homogenized lattice material representation can express structural behavior of a given lattice as an anisotropic solid material being a continuous material with properties approximately equivalent to the given lattice. Various homogenization methods can be used, such as numerical homogenization and analytical homogenization, and/or experimental data can be used to define the homogenized lattice material representation.

In some implementations, the iterative modification 405 includes adjusting 405A a volume fraction for a homogenized lattice material representation in accordance with a constitutive matrix for the homogenized lattice material representation of lattice topology. In some implementations, beam thickness is changed while keeping the unit size constant. In some implementations, the unit size is changed, but this can result in a lattice with mixed unit sizes, which can pose challenges during manufacturing. In some implementations, a uniform lattice is used during initial topology optimization.

In any case, a current iteration of the model being iteratively modified is changed 405B for physical simulation. This can involve, changing 405B a constitutive model for the physical simulation in accordance with a current iteration of the level-set representation and the homogenized lattice material representation with a uniform thickness of the beams in the lattice. In some implementations, changing 405B the constitutive model for the physical simulation includes (i) using void simulation elements outside the one or more outer shapes of the three dimensional topology and (ii) using the homogenized lattice material representation for simulation elements inside the one or more outer shapes of the three dimensional topology, in accordance with the current iteration of the level-set representation, such as described above in connection with Algorithm 4. For example, a void element can have a constitutive model where the Young's modulus is reduced to about 0.001 of the regular solid material Young's modulus (see equations 43 & 44), and lattice elements can use a constitutive model of a lattice as explained above under section headings Homogenization, Variation With Lattice Volume Fraction, and Predicting RVE for Arbitrary Lattice Properties.

In some implementations, changing 405B the constitutive model for the physical simulation includes (i) using the homogenized lattice material representation for simulation elements outside the one or more outer shapes of the three dimensional topology, but inside the boundary of the design space, and (ii) using solid simulation elements inside the one or more outer shapes of the three dimensional topology, in accordance with the current iteration of the level-set representation. Note that in FEA, each element has a stiffness matrix which contributes to the global stiffness matrix. The solution (stress, displacement, etc.) can be obtained after inverting this stiffness matrix. A solid element stiffness matrix can use the linear elastic material model, and a lattice element can use the lattice RVE constitutive model in formulating the element stiffness matrix. Further, the boundary of the design space can be defined by an initial three dimensional model (e.g., as specified by a user).

Physical simulation of the object is performed 405C using the changed constitutive model to produce a physical assessment with respect to the at least one design objective and the at least one design constraint. As noted above, various types of physical simulations can be used, and thus various types of physical assessments can be produced. In some implementations, performing 405C the physical simulation involves performing finite element analysis simulation using a body-fitted mesh based solver, and the constitutive model is changed 405B by mapping geometric field data and finite element simulation data between voxel grid points of the level-set representation of the generative model and elements of a solid mesh model used by the finite element analysis simulation. In some implementations, a solid mesh based simulation can be non-body fitted, e.g., solved using voxel solvers.

Shape change velocities are computed 405D for the level-set representation in the current iteration in accordance with the physical assessment. Note that this is a place where the effects of different objectives and constraints come into play. In some implementations, computing 405D the shape change velocities involves using the augmented Lagrangian method described herein to compute advection velocities, such as when multiple shape derivatives are present. Then, the level-set representation for the object is updated 405E using the shape change velocities, e.g., with the level-set method, before the next iteration. For example, the updating 405E can use the advection velocities from the augmented Lagrangian method (ALM).

After the modifying 405 completes changes to both the three dimensional topology and the one or more outer shapes of the three dimensional topology, a thickness of the beams in the lattice or a density of the lattice is adjusted 410, e.g., by the CAD program(s) 116, in accordance with the physical simulation, the at least one design objective and the at least one design constraint, while keeping the three dimensional topology constant. For example, see the thickness optimization in step 10 of Algorithm 2 and Algorithm 5, and also see step 4 of Algorithm 5 where thickness is converted to equivalent density. Note that the lattice thickness optimization can be performed using density.

After the adjustments are made to the lattice for the optimized 3D topology, a three dimensional model of the object can be provided 415 in accordance with the three dimensional topology, the one or more outer shapes of the three dimensional topology and the adjusted lattice, for use in manufacturing a physical structure corresponding to the object using one or more computer-controlled manufacturing systems. This can involve providing 195 as described above in connection with FIG. 1B. Thus, providing 415 can include generating instructions (e.g., toolpath specifications) for additive manufacturing machine(s), subtractive manufacturing machine(s), or other machines, systems or devices. Note that the processes described are not required to be used with any particular manufacturing systems or techniques.

Returning to FIG. 3A, when the generative process to be used employs a hollow level-set method for topology optimization, the level-set is initiated 308A for the design space. Note that a level-set method is an example of a macrostructure generative modeling technique, where the generative model represents the object being designed as one or more boundaries between one or more solid regions (having the homogenous material therein) and one or more void regions (having no material therein) within the design space. However, in the case of hollow topology optimization, as described in this document, the physical simulation of the modelled object is performed 308B with at least portion of the solid region being treated as having a void in it (i.e., what the macrostructure generative modeling technique treats as a solid, the physical simulation treats as containing a hollow region).

Results from the simulation are used to update 308C the level-set, and a check 308D is made for convergence. The simulation, update and check process then iterates until convergence. The hollow topology optimization method can be motivated by the observation that common non-solid structural elements, such as I-beams, sandwich panels, and tubes can achieve mass reduction by situating material away from the neutral axis.

When compared to a solid structural element, material near the neutral axis can be removed and/or redistributed further out to be lighter and/or stiffer. Non-solid structural elements can typically achieve better strength-to-weight ratios than their solid counterparts, especially under bending. But rather than using a naive approach of running a basic topology optimization with a high safety factor and/or volume target, and then manually converting to a hollow structure using standard geometry operations, a hollow topology optimization process can take into consideration the effects of a hollow interior during topology optimization, which can result in improved design for the structure, such as a stronger or more durable part, less material usage, or a combination thereof, such as an improved strength to weight ratio.

This can provide benefits over holding skin thickness of a hollow structure constant or optimizing the skin thickness using just a fully-stressed design algorithm (e.g., Algorithm 2) to produce a variable skin thickness, in that the topology optimization stage of the hollow topology optimization process described can complement or benefit from the hollowing process and thickness optimization. This can improve the structural response of the finished design, as compared to adding cavities into a generative geometry after the solid topology optimization is performed on the basis of an entirely solid geometry, which can cause the structural response to change significantly and/or loss of any optimality properties enjoyed by the solid geometry during optimization of the topology. Further, note that the hollow topology optimization described need not restrict topology changes to the shell surface. The interior topology of the hollow can be optimized in addition to the exterior topology of the solid material.

Figure 5A:
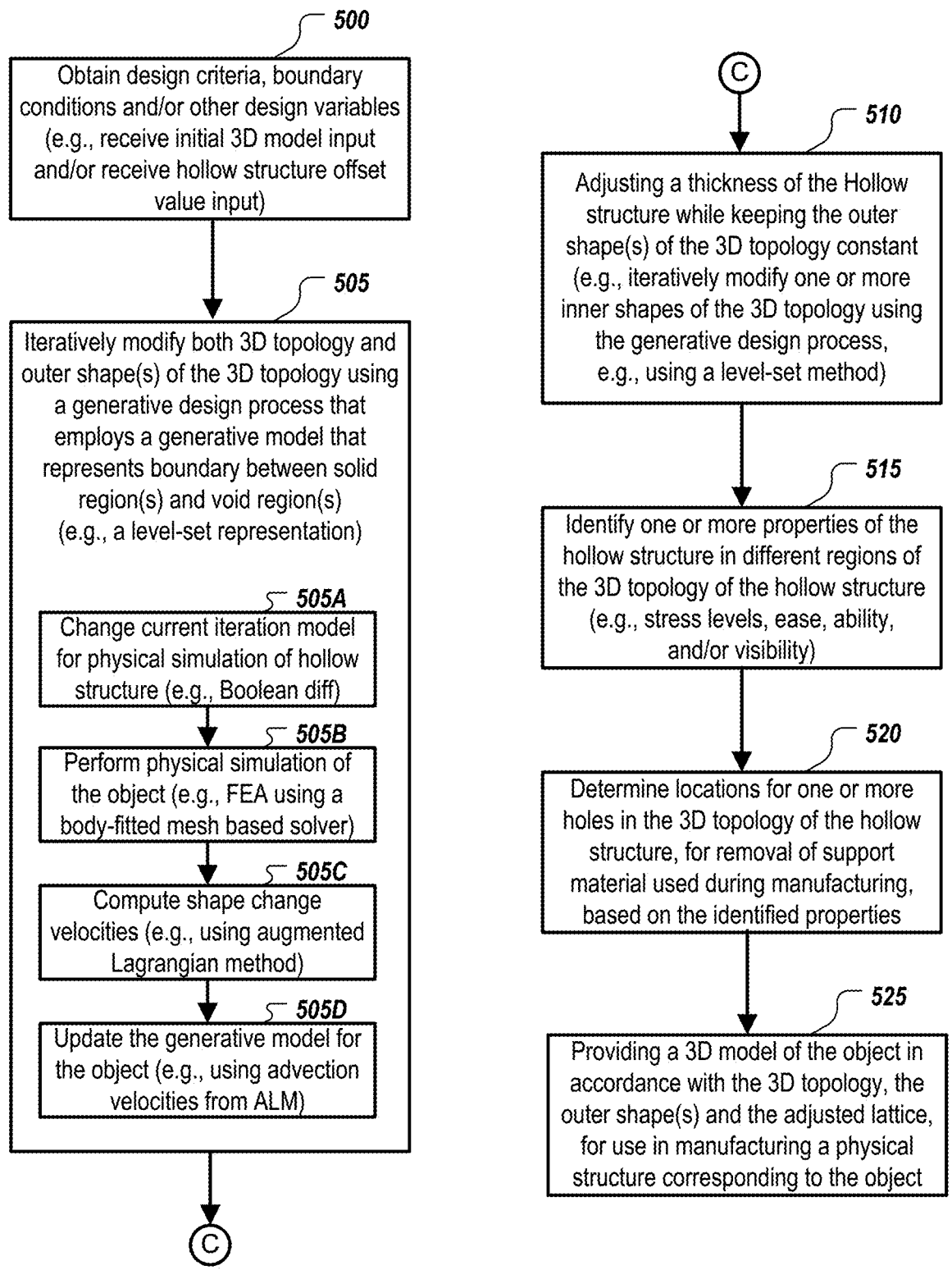
FIG. 5A shows an example of a process that optimizes a topology of one or more hollow portions of a 3D model of an object being generatively designed for manufacture.

A detailed example of this type of macrostructure topology optimization process is now described, where topology optimization and hollow structure physical simulation can be used together to produce a final design which contains solid material around one or more hollow cavities. A level-set-based topology optimization method can be modified to produce hollow designs, such as shown in FIGS. 5C and 5D. FIG. 5C shows a graphical representation of an example of a hollow design 560 containing internal cavities. FIG. 5D shows a graphical representation of an example of a sliced view 562 of the hollow design 560, thus revealing the internal cavities 564. Hollow topology optimization can be performed using a level-set method as described below. For simplicity of the algorithm, the compliance minimization problem with a penalized volume (Equation 26) can be used.

Design Workflow

Figure 5B:
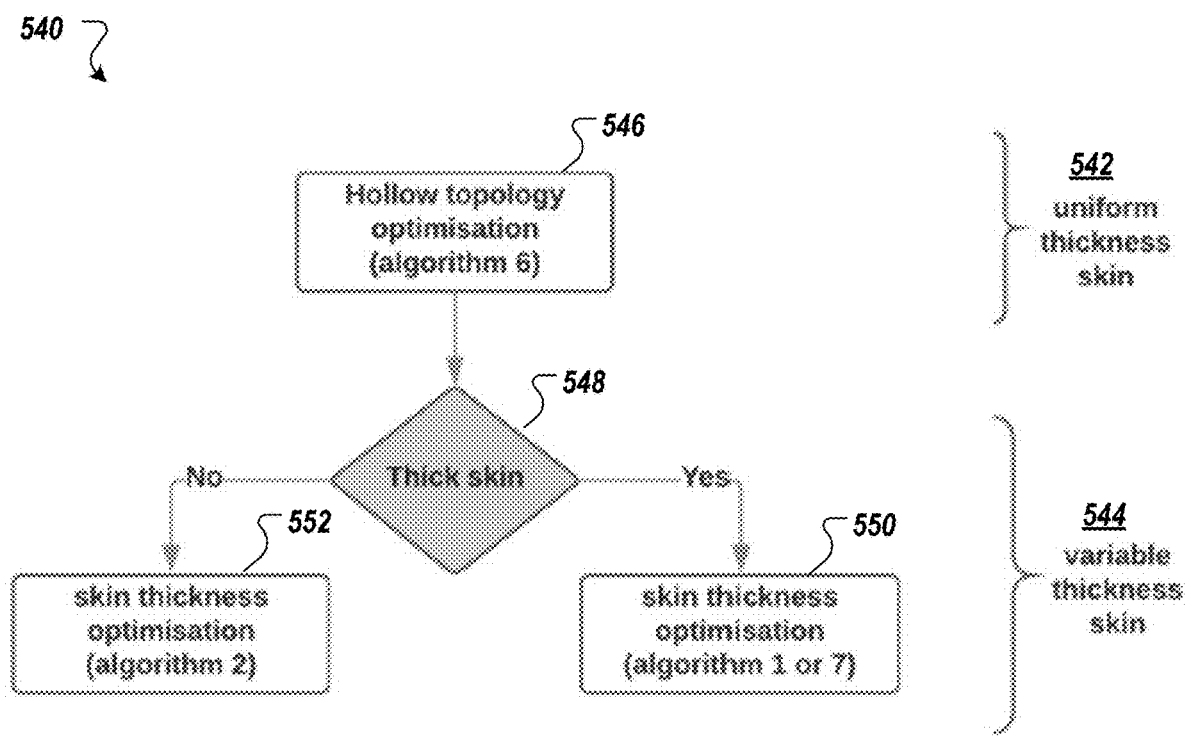
FIG. 5B shows an example of a process for a design workflow for hollow topology optimization.
Figure 5C:
FIG. 5C shows a graphical representation of an example of a hollow design containing internal cavities.
Figure 5D:
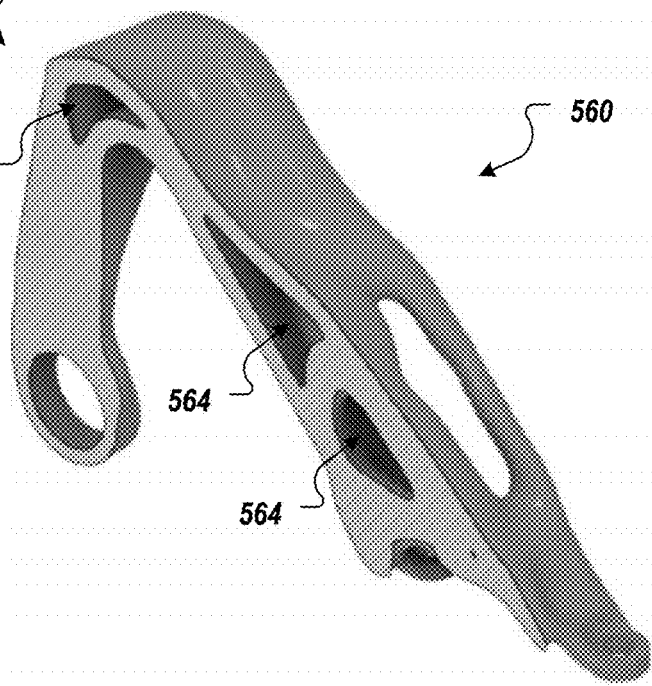
FIG. 5D shows a graphical representation of an example of a sliced view of the hollow design from FIG. 5C.

FIG. 5B shows an example of a process 540 for a design workflow for hollow topology optimization, e.g., as performed by the CAD program(s) 116 of FIG. 1A. The process 540 is similar to process 440 (see Hybrid Topology Optimization above) in that process 540 is has two main steps. The design workflow can be used for topology optimization while keeping the hollow skin thickness $t_h$ constant in the first step. At step 542, a uniform thickness skin is created. For example, at step 546, hollow topology optimization (for example, using Algorithm 6) can occur. At step 544, thickness optimization occurs. At 548, a check is made as to whether thick skin is to be used. If so, then at 550, the basic topology optimization Algorithm 1 (with minor modifications) or a skin thickness optimization Algorithm 7 can be used. Otherwise, at 552, the lattice and skin thickness optimization Algorithm 2 can be used. The choice at 548 can depend on a decision whether to use shell elements in lattice and skin thickness optimization (Algorithm 2) which can be inaccurate for thick skins (because of large hollow thickness $t_h$ values). For thick shells, either Algorithm 7, or a slightly modified Algorithm 1, can be used. Note that the thickness of a shell that constitutes a "thick shell" can be determined based on an aspect ratio of the shell elements, such that when the aspect ratio (maximum surface length/thickness) exceeds a predetermined value (e.g., as determined by experiment in a given implementation and/or a heuristic rule) the shell is thin, and otherwise the shell is thick.

Figure 5E:
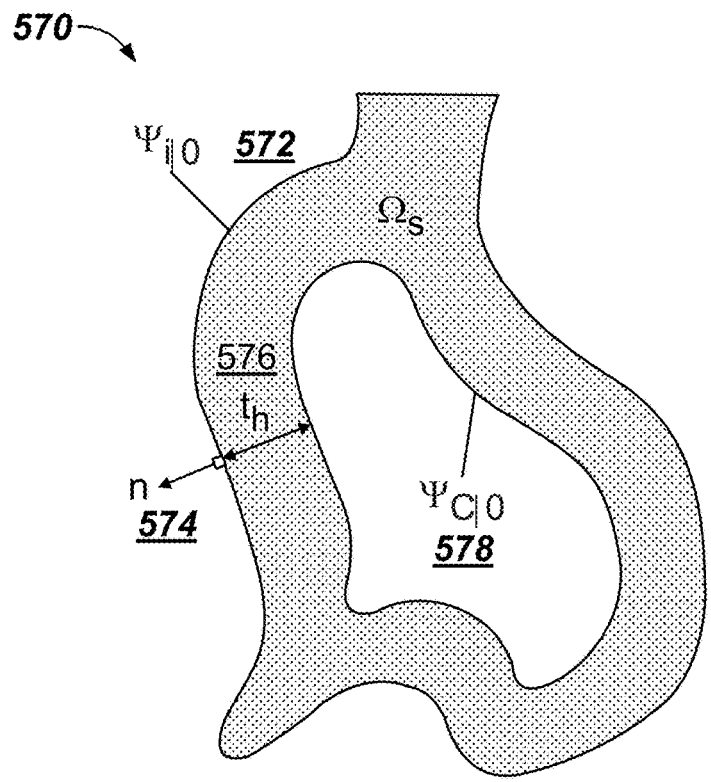
FIG. 5E shows a graphical representation of an example of a hollow level-set.
Figure 5F:
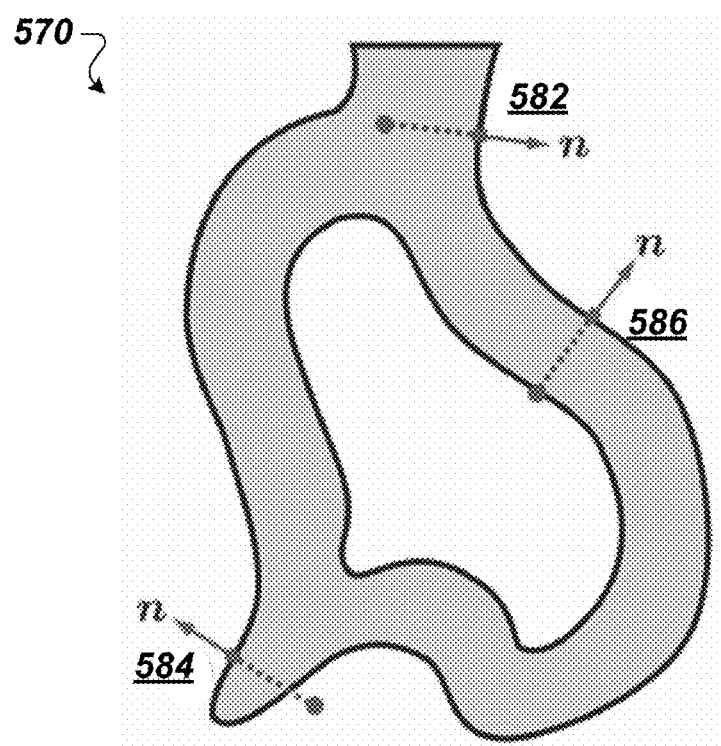
FIG. 5F shows a graphical representation of transition from hollow to basic topology optimization (TO) for the hollow level-set.

FIG. 5E shows a graphical representation of an example of a hollow level-set 570. A 0 iso-contour 572 of the outer level-set $\psi_{i|0}$ is offset along a negative direction of a normal n 574 by an amount $t_h$ 576 to create the inner level-set. A 0th iso-contour 578 of the latter is indicated as $\psi_{c|0}$. FIG. 5F shows a graphical representation of transition from hollow to basic topology optimization (TO) for the hollow level-set 570. Locations 582 and 584 are not hollow ($I_c$=0). However, location 586 is hollow ($I_c$=1). Note that FIGS. 5E & 5F help to explain one of the terms in the hollow shape derivative, as described.

Thus, the hollow design can be achieved by offsetting the $0^{th}$ iso-contour of the design level-set along the negative normal direction to create a hollow skin. The offset amount $t_h$ is referred to as the hollow thickness and can be kept constant during the topology optimization stage. This hollow thickness $t_h$ can be specified by the user, e.g., through UI 122, at the start of the hollow topology optimization. The offset process can result in two level-sets. The outer level-set defines the external surface of the design, and the inner level-set defines the surface of the internal cavity. The hollow skin thickness optimization stage using Algorithm 2 or 7 can require creation of the skin. Therefore, the final design from the uniform thickness hollow topology optimization (Algorithm 6) may need to be partitioned into solid and skin regions. The first step is to define the skin surface region using the hollow indicator function $I_c$ from the final iteration of the topology optimization stage as follows $$\Gamma_h := \{x \in \Gamma | I_c(x) = 1\} \quad (56)$$

Next, the skin $\Gamma_h$ ($t_h$, $\Gamma_h$) can be created using the same thickness $t_h$ used during hollow topology optimization. The skin creation process (see Lattice and Skin Creation above) can be used to this end. The solid region can now be given as the difference between the solid region at the end of hollow topology optimization and the newly created skin.

Topology Optimization Stage

The design process used during the topology optimization stage is listed in Algorithm 6 in which the starting shape and level-set are identical to that of Algorithm 1. The FEA model used for simulation includes solid elements in the non-hollow portion of the solid region(s) of the generative design space being optimized. In each iteration, the hollow design can be created (see Design Workflow above). Next, the constitutive model D of each element e in the FEA model can be updated as in the basic topology optimization method, but the difference between the outer and inner level-set, i.e. $\psi_d = \Psi_i \backslash \psi_c$, e.g., as computed using a Boolean difference operation, is used when updating the constitutive model of each element.

The shape derivative in step 10 uses some additional terms to account for hollow regions. The exact expression for the advection velocity is given by $$v_c(x) = v(x) - I_c v(x - t_h n)(1 + t_h K_1(x) + t_h^2 K_2(x)) \quad (57)$$

where v(x) is the advection velocity (Equation 28) from basic topology optimization and $K_1$, $K_2$ denote the Gauss and mean curvature at sampling point x, respectively. The operator $I_c = \{0,1\}$ can allow for a smooth transition between non-hollow (using the advection velocity from basic topology optimization) and hollow topology optimization. See FIG. 5F for an example indicating hollow and non-hollow regions. Further details regarding shape derivative computations that can be used are described below under the reference to "shape derivatives for thick-shell representation".

Note that in Algorithm 6, the topology optimization only advects the outer level-set $\psi_i$ in step 11, the inner level-set $\psi^c$ can typically be created at the point of updating and solving the FEA model during optimization iterations. This can ensure that only a skin-like layer of solid elements contributes to the stiffness of the design. The remaining steps can be identical to that of Algorithm 1 until the extraction of the final solid region.

---

Algorithm 6 - Hollow Topology Optimization

Input: ($\Omega$, $D_v$, $D_s$, $\mu$, $t_h$)
Output: ($\Omega_s$)
// initiate level-set ip from design space
1. $\psi_0 = f_{SDF}(\Omega)$
// iterate until convergence tolerance c is met
2. i = 0
3. while i = 0 or $|J_i - J_{i-1}| > c$ do
  // offset design level-set to create hollow level-set Algorithm 6 - Hollow Topology Optimization 4. $\psi_c := \{\psi_c(x) = \psi_i(x) - t_h\}$
5. $\psi_d = \psi_i \backslash \psi_c$
   // set constitute model of FEA elements as void $D_v$ or solid $D_s$ 6. $K_e = \begin{cases} B^T D_s B & \text{if } \psi_d(e) \leq 0 \\ B^T D_v B & \text{if } \psi_d(e) > 0 \end{cases}$
   // formulate and solve FEA problem 7. $K = \sum_e^n K_e$ 8. $u = K^{-1} f$
   // compute hollow shape derivative and advection velocity 9. $v = \frac{1}{2} D \in (u) : \in (u) + \mu$ 10. $v_c(x) = v(x) - I_c v(x-t_h n)(1 + t_h K_1(x) + t_h^2 K_2(x))$
    // solve Hamilton-Jacobi and obtain new level-set $\psi_{i+1}$ 11. $\frac{\partial \psi_i}{\partial t} - v_c |\nabla \psi_i| = 0$ 12. $\psi_{i+1} \leftarrow \psi_i$
    // compute objective 13. $J_{i+1} = \frac{1}{2} \int_\Omega D \in (u) : \in (u) d\Omega$
    // increment iteration 14. $i \leftarrow i + 1$
15. end while
    // obtain final hollow level-set
16. $\psi_c := \{\psi_c(x) = \psi_i(x) - t_h\}$
    // obtain final solid region 17. $\Omega_s \leftarrow = \int_{SDF}^T (\psi_{i+1} \backslash \psi_c)$ The extraction of the final solid region can be defined by the $0^{th}$ iso-contour of the Boolean difference between the outer and inner level-sets. In some implementations, the Open-VDB method can be used to extract the final level-set. Note that extraction of the final level-set in a form that is useable for the next stage can be performed using meshes, B-Rep or level-set space.

Skin Thickness Optimization Stage

The second stage 544 of hollow topology optimization can include optimizing the thickness of hollow regions using either Algorithms 2, 1, or 7. Note that Algorithms 1 and 7 can be more relevant when a thick skin is in use, as both these algorithms can represent the skin regions using solid elements in the FEA model. The skin can be represented as shell elements in the FEA model when using Algorithm 2. The numerical accuracy of Algorithm 2 can deteriorate when representing thick shells.

When using the basic level-set Algorithm 1, the inner level-set $\psi^c$ from the final iteration representing the cavity can be subject to topology optimization while keeping the outer shape constant. Note that the FEA element update rule in step 4 may need to be changed as follows (given the inner level-set is of a negative sign inside the cavity and a positive sign in the domain)

$$K_e = \begin{cases} B^T D_s B & \text{if } \psi_c(e) \geq 0 \\ B^T D_s B & \text{if } \psi_c(e) < 0 \end{cases} \quad (58)$$

Other steps in Algorithm 1 can remain unchanged. This process can effectively optimize the shape of the cavity that defines the hollow design, which can result in more than one cavity within the generated design.

Using the lattice and skin thickness optimization process described previously (see Lattice and Skin Optimization above) can require changing the FEA model where the solid elements are replaced by shell elements before the thickness is optimized. In some implementations, the thickness optimization is done using solid elements as outlined in Algorithm 7. The latter is the skin equivalent of the lattice density optimization (Algorithm 5). The design variables can include the thickness values of each polygon vertex in the skin region which are initiated to the minimum thickness $t_{min}$ at the start of the algorithm. During each iteration of the optimization process, a level-set can be created from the current skin domain and can be used to update the constitutive model of solid elements in the FEA model. Once the FEA model is solved, the stress values at each skin polygon can be obtained using the same mapping created to transfer data from the FEA model to a level-set grid (see Body-Fitter Solvers above). The remaining steps can be identical to lattice and skin optimization (Algorithm 2) except for the need to update the skin domain at the end of each iteration.

Algorithm 7 - Skin Thickness Optimization

Input: $D_v$, $D_s$, $t_{min}$, $t_{max}$, $\Omega_h$, $\sigma_t$
Output: $(t(e) \forall e \in \Omega_l$
thickness
// initiate skin thickness at all elements in skin region to that of mm
1. $t(e) = t_{min} \forall e \in \Omega_h$
   // iterate until convergence tolerance c is met
2. $i = 0$
3. while $i = 0$ or $|J_i - J_{i-1}| > c$ do
   // create level-set from skin 4. $\psi_h = f_{SDF}(\Omega_h)$
   // set constitutive model of FEA elements as void $D_v$ or solid $D_s$ 5. $K_e = \begin{cases} B^T D_s B & \text{if } \psi_h(e) \leq 0 \\ B^T D_v B & \text{if } \psi_h(e) > 0 \end{cases}$
   // formulate and solve FEA problem 6. $K = \int_\Omega K_e$
7. $u = K^{-1} f$
   // compute stress ratio at each vertex 8. $r_\sigma = \frac{\sigma(e)}{\sigma_t}$
   // compute thickness increment according to stress ratio
   // using, for example, $\alpha = 0.5$, $\beta = 0.1$, $\gamma = 0.33$ 9. $\tilde{t} = \begin{cases} (1-\alpha)t_i & \text{if } r_\sigma \leq \beta \\ r_\sigma^\gamma t_i & \text{if } r_\sigma > \beta \end{cases}$
   // update thickness without violating bounds 10. $t_{i+1}(e) \leftarrow \max(t_{min}, \min(t_i + \tilde{t}, t_{max}))$
    // compute objective 11. $J_{i+1} = \frac{1}{2} \int_\Omega D \in (u) : \in (u) d\Omega$

| Algorithm 7 - Skin Thickness Optimization |
| --- |
| // update skin using current thickness values |
| 12. $\Omega_h \leftarrow \Omega_h (t, \Gamma_h)$ |
| // increment iteration |
| 13. $i \leftarrow i + 1$ |
| 14. end while |
| // create lattice after mapping thickness at solid elements to level-set grid |
| 15. $\Omega_l (T, u, f, t_{min}) \in \Omega$ |

Note that while the detailed example above uses a level-set representation and level-set method, other macrostructure-type topology optimization systems and techniques can be used.

Hollow Topology Generation for CAD Applications

FIG. 5A shows an example of a process (e.g., as performed by the CAD program(s) 116 of FIG. 1A) that optimizes a topology of one or more hollow portions of a 3D model of an object being generatively designed for manufacture. Design criteria, boundary conditions and/or other design variables are obtained 500, e.g., by the CAD program(s) 116. This can involve receiving user input, e.g., via UI 122 on display device 120, importing information from another program or a third party source, and/or one or more of these inputs can be predefined in a given implementation.

The boundary conditions can be a mechanical problem definition and input solid(s) that are preserved for use as connection point(s) with other component(s) in a larger 3D model or separate 3D model(s). In some implementations, the obtaining 500 includes receiving input 500, e.g., via UI 122 on display device 120, indicating an initial 3D model defining at least a portion of the design space for topology optimization of the object. In some implementations, the user is enabled, e.g., via UI 122 on display device 120, to select multiple parts from an assembly shown in the UI, and the user is enabled to indicate loading points and keep away regions for the design. The software, e.g., CAD program(s) 116, can then use the inverse of these as the design space. Other inputs can also be received 500, such as a hollow structure offset value input (e.g., a constant offset selected by a user of the CAD program(s) 116 used to define the hollow structure during topology optimization).

The design criteria can include one or more design objectives and one or more design constraints. Design objectives can include those that minimize one or more cost functions and/or that maximize one or more utility functions for the object to be manufactured. In some implementations, design objectives include one or more of the following: (1) minimizing material usage (e.g., waste material), (2) minimizing weight, (3) minimizing manufacturing time, (4) maximizing tool life, (5) maximizing ability to remove support material, (6) targeting a set natural frequency (e.g., higher/lower natural modes of vibration to achieve vibration damping), and (7) positioning and packing of parts within the structure (e.g., electronic components for circuit actuation, including reserving space for cabling between components in an assembly, limiting cabling length, and/or components for structural health monitoring, as well as assembly considerations to ensure each component can be added/removed independently or with a limited number of steps). Design constraints can include those that address manufacturing requirements and/or that address use requirements. In some implementations, design constraints include one or more of the following: (1) manufacturing constraints that restrict geometries to those that can be manufactured (e.g., minimum self-supporting angle for AM processes in which separate support material will not be used, subject to build direction when appropriate, or mechanical access constraints for AM or SM processes, such as 3-axis, 5-axis and/or 2.5-axis CNC constraints), (2) thermo-mechanical constraints, (3) material fraction or variation constraints, (4) structural integrity, (5) stiffness, (6) compliance, (7) stress criteria (e.g., Von Mises or Tsai-Wu stress for manufacturing or use), (8) physical constraints (non-interference with larger system of parts), and (9) damage constraints (e.g., brittle elastic fraction resistance). In some implementations, the design criteria include minimizing compliance with volume, stress, displacement, buckling safety factor, and/or natural frequency constraints, but the method(s) can be generalized to other design objectives and constraints, including minimizing volume, deviation (e.g., least square deviation) from a target (compliant mechanism), and/or design dependent loads (pressure loads).

In some implementations, a design space for an object to be manufactured, a setup for physical simulation of the object, at least one design objective for the object, and at least one design constraint for the object are obtained 500, e.g., by the CAD program(s) 116 of FIG. 1A. The physical simulation performed by the systems and techniques described in this document can simulate one or more physical properties and can use one or more types of simulation. For example, FEA, including linear static FEA, finite difference method(s), and material point method(s) can be used. Further, the simulation of physical properties can include, among other possibilities, simulating buckling, natural frequency, thermal, electric or electro-magnetic flux, and material solidification properties. Note that the setup for physical simulation(s) will be different for different physical simulation(s).

Both a three dimensional topology of a generative model for the object and one or more outer shapes of the three dimensional topology are iteratively modified 505, e.g., by the CAD program(s) 116, using a generative design process that represents the three dimensional topology of the generative model as one or more boundaries between one or more solid regions and one or more void regions within the design space. For example, this can include using gradient based algorithms to optimize the 3D topology and shape of the object model, or other algorithms, such as evolutionary algorithms and stochastic algorithms. Further, the generative model can be a level-set representation of the one or more outer shapes of the three dimensional topology, and a level-set method of topology optimization can be employed. In some implementations, the iterative modification 505 involves using the systems and techniques described above in connection with FIGS. 3A (Hollow) and 5B-5F.

A current iteration of the model being iteratively modified is changed 505A for physical simulation. This can involve, changing 505A a constitutive model for the physical simulation in accordance with a current iteration of the three dimensional topology and the one or more outer shapes of the three dimensional topology being offset inward to define a hollow structure in the three dimensional topology. For example, a Boolean difference operation can be performed 505A. In some implementations, the offset inward to define the hollow structure is a constant offset selected by a user of the computer aided design program, as noted above, thus setting the initial thickness of the hollow structure. In some implementations, the initial thickness is retrieved from a database of known good values for a given manufacturing process. In general, it is the manufacturing process that drives the minimum wall thickness.

Physical simulation of the object is performed 505B using the changed constitutive model to produce a physical assessment with respect to the at least one design objective and the at least one design constraint. As noted above, various types of physical simulations can be used, and thus various types of physical assessments can be produced. In some implementations, performing 505B the physical simulation involves performing finite element analysis simulation using a body-fitted mesh based solver, and the constitutive model is changed 505A by mapping geometric field data and finite element simulation data between voxel grid points of a level-set representation of the generative model and elements of a solid mesh model used by the finite element analysis simulation. In some implementations, a solid mesh based simulation can be non-body fitted, e.g., solved using voxel solvers.

Shape change velocities are computed 505C for the one or more outer shapes of the three dimensional topology in the current iteration in accordance with the physical assessment. For example, this can involve computing 505C hollow shape derivative and advection velocity in accordance with lines 9 & 10 in Algorithm 6. Note that this is a place where the effects of different objectives and constraints come into play. In some implementations, computing 505C the shape change velocities involves using the augmented Lagrangian method described herein to compute advection velocities, such as when multiple shape derivatives are present.

Then, the generative model for the object is updated 505D using the shape change velocities before the next iteration. For example, the updating 505D can use the advection velocities from the augmented Lagrangian method (ALM). In some implementations, a level-set method is used, such as shown above in lines 11 & 12 in Algorithm 6. In some implementations, non-level-set surface manipulation, such as T-spline, or B-Rep control point movement or nodal movement in meshes, can be used.

After the modifying 505 completes changes to both the three dimensional topology and the one or more outer shapes of the three dimensional topology, a thickness of the hollow structure is adjusted 510, e.g., by the CAD program(s) 116, in accordance with the physical simulation, the at least one design objective and the at least one design constraint, while keeping the one or more outer shapes of the three dimensional topology constant. For example, see Algorithm 2, Algorithm 1 and Algorithm 7, and FIG. 5B.

In some implementations, adjusting 510 the thickness of the hollow structure includes, starting from one or more inner shapes of the hollow structure, iteratively modifying the one or more inner shapes of the three dimensional topology using the generative design process, including changing the constitutive model for the physical simulation in accordance with a current iteration of the three dimensional topology and the one or more inner shapes, such that the thickness of the hollow structure varies across the three dimensional topology after modifying the one or more inner shapes is completed. In some implementations, a level-set method is used for optimizing the outer shape(s) and/or the inner shape(s) of the hollow structure.

Thus, the generative model can be a level-set representation of the one or more inner shapes and the one or more outer shapes of the three dimensional topology, and the generative design process can employ a level-set method of topology optimization to iteratively modify the one or more inner shapes and the one or more outer shapes of the three dimensional topology. In some implementations, other macrostructure representations can be used for generative design, where the generative design process represents the three dimensional topology of the generative model as one or more boundaries between one or more solid regions and one or more void regions within the design space. For example, other options for representing the hollow region outline include other surface modelling techniques. For example, the outer surface can be a mesh, T-spline, or B-Rep surface with a secondary inner surface created at a fixed offset, and the outer surface can be subject to shape optimization using classical shape optimization methods.

Further, in some implementations, (i) stress levels, (ii) ease of formation or removal of supporting material, (iii) ability to support or inhibit material formation during fabrication, and/or (iv) visibility of a hole for aesthetic considerations, can be identified 515 in different regions of the three dimensional topology of the hollow structure. Then, locations for one or more holes in the three dimensional topology of the hollow structure, for formation or removal of support material used during manufacturing, can be determined 520 based on the identified (i) stress levels, (ii) ease of formation or removal of supporting material, (iii) ability to support or inhibit material formation during fabrication, and/or (iv) visibility of the hole for aesthetic considerations, for a subset of the different regions as compared to remaining regions.

After the adjustments are made to the thickness of the hollow structure (and potentially after one or more locations for one or more holes are determined) a three dimensional model of the object can be provided 525 in accordance with the three dimensional topology, the one or more outer shapes of the three dimensional topology and the adjusted thickness of the hollow structure, for use in manufacturing a physical structure corresponding to the object using one or more computer-controlled manufacturing systems. This can involve providing 195 as described above in connection with FIG. 1B. Thus, providing 525 can include generating instructions (e.g., toolpath specifications) for additive manufacturing machine(s), subtractive manufacturing machine(s), or other machines, systems or devices. Note that the processes described are not required to be used with any particular manufacturing systems or techniques.

Returning to FIG. 3A, when the generative process to be used employs a hybrid hollow level-set method for topology optimization, the level-set is initiated 310A for the design space. Note that a level-set method is an example of a macrostructure generative modeling technique, where the generative model represents the object being designed as one or more boundaries between one or more solid regions (having the homogenous material therein) and one or more void regions (having no material therein) within the design space. However, in the case of hybrid hollow topology optimization, as described in this document, the physical simulation of the modelled object is performed 310B with at least portion of the solid region being treated as having both a partial void region and a complete void in it (i.e., what the macrostructure generative modeling technique treats as a solid, the physical simulation treats as partially containing a lattice structure around a hollow region).

Results from the simulation are used to update 310C the level-set, and a check 310D is made for convergence. The simulation, update and check process then iterates until convergence. A detailed example of this type of macrostructure topology optimization process is now described, where latticing is combined with topology optimization and hollow structure physical simulation to produce a final design which contains lattice around one or more hollow cavities. A level-set-based topology optimization method can be modified to use both hollow topology optimization (where the material only exists near the design surface, with on optimized thickness and topology of a skin of material around internal hollow regions) and hybrid topology optimization (where a homogenized lattice representation, such as RVEs, is used during topology optimization to create designs which have lattices). By combining hollow and hybrid topology optimization methods, a 3D model of an object (e.g., a standalone structure or a part or component of a larger structure) can be produced which contains both hollow regions and lattice, the lattice being situated between the one or more hollow cavities at the outer extremes of the object.

Figure 6A:
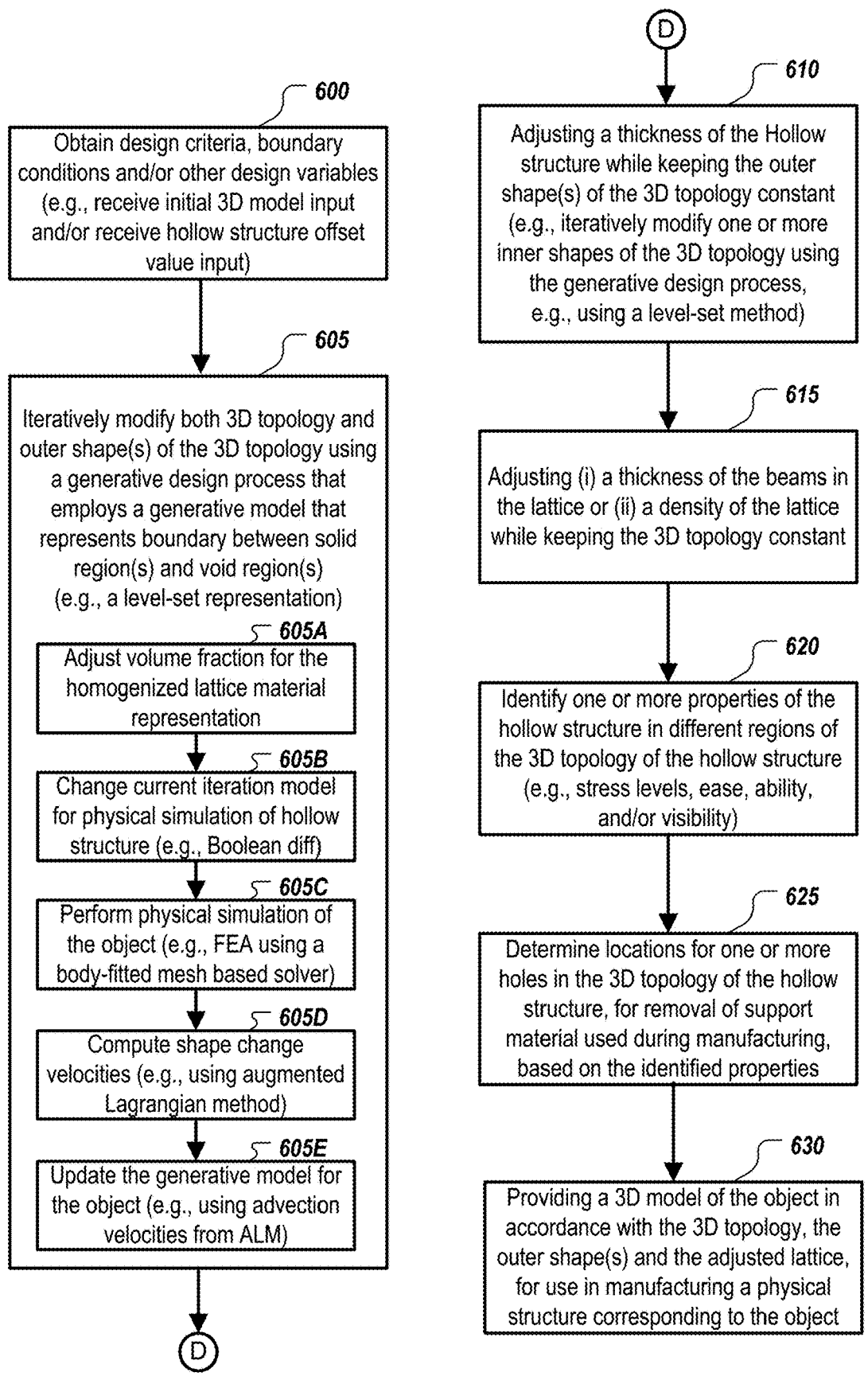
FIG. 6A shows an example of a process that optimizes a topology of lattice infill for a structure surrounding one or more hollow portions of a 3D model of an object being generatively designed for manufacture.
Figure 6B:
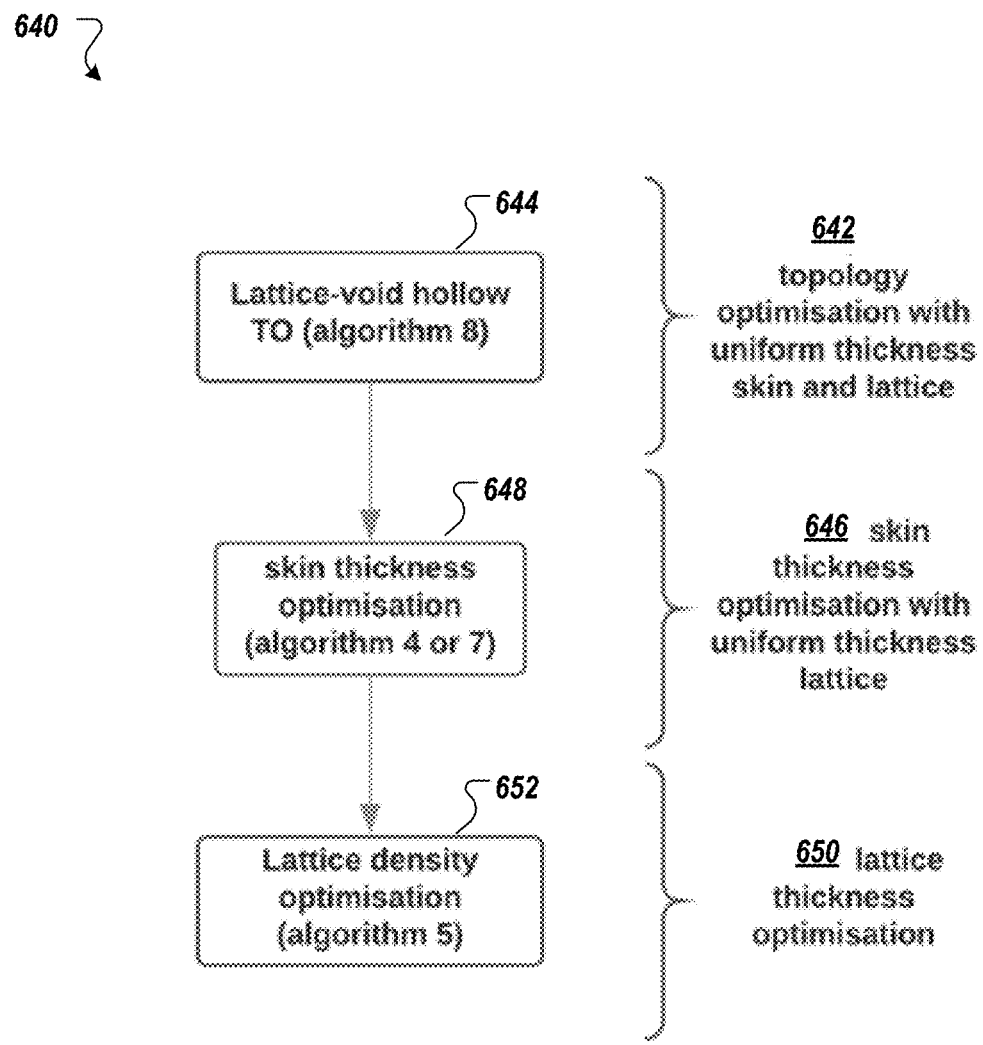
FIG. 6B shows an example of a process for a hybrid-hollow topology optimization workflow.
Figure 6C:
FIG. 6C shows a graphical representation of an example of a hybrid-hollow design containing internal cavity and lattice.
Figure 6D:
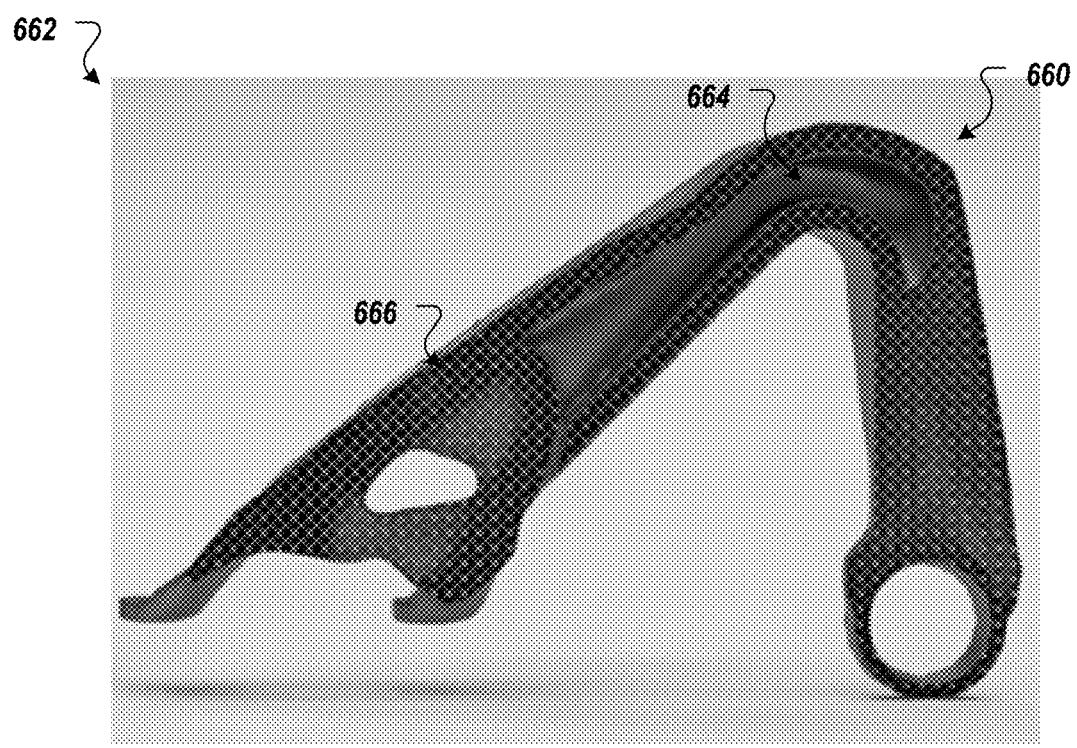
FIG. 6D shows a graphical representation of an example of a sliced view of the hybrid-hollow design of FIG. 6C.

FIG. 6C shows a graphical representation of an example of a hybrid-hollow design 660 containing internal cavity and lattice. FIG. 6D shows a graphical representation of an example of a sliced view 662 of the hybrid-hollow design 660, thus revealing the internal cavity 664 and the internal lattice 666. Hybrid-hollow topology optimization can be performed using a level-set method as described below. For simplicity of the algorithm, the compliance minimization problem with a penalized volume (Equation 26) can be used.

Design Workflow

FIG. 6B shows an example of a process 640 for a hybrid-hollow topology optimization workflow, e.g., as performed by the CAD program(s) 116 of FIG. 1A. The process 640 is a three-step process in which the topology is optimized while keeping the lattice and hollow skin thickness $t_h$ constant in step 642. For example, a lattice-void hollow topology optimization (TO) 644 can be used, such as in Algorithm 8. The hollow skin thickness is optimized during step 646, such as using a skin thickness optimization 648, e.g., using Algorithm 4 or Algorithm 7, followed by a lattice thickness optimization step 650, such as using a lattice density optimization 652, e.g., using Algorithm 5.

Topology Optimization Stage

An example of a level-set-based hybrid-hollow design process is listed in Algorithm 8, where the starting shape and level-set are identical to that of Algorithm 1. The hollow skin thickness can be constant at $t_h$, and the starting lattice thickness (and the corresponding volume fraction) can be set to a high value close to the maximum allowable. The corresponding lattice constitutive model can be obtained using homogenization methods (see Homogenization above). The FEA model used for simulation includes solid elements in the non-hollow portion of the solid region(s) of the generative design space being optimized, where the solid elements in fact correspond to a homogenized representation of the lattice (e.g., lattice RVE elements).

Next, the shape can be iteratively optimized until the objective function has converged. In each iteration, the hollow design can be created as described with reference to FIG. 5B. Next, the constitutive model D of each element e in the FEA model can be updated as in the basic topology optimization method, but the difference between the outer and inner level-set, i.e $\psi_d = \psi_i \backslash \psi_c$, e.g., as computed using a Boolean difference operation, is used when updating the constitutive model of each element. Elements inside this level-set (lattice elements) are given the lattice constitutive model $D_l$ while the constitutive model of those outside can use a very low stiffness $D_v$. The shape derivative used in step 13 can be identical to that of hollow topology optimization as well as the advection step, which only advects the outer level-set. The remaining steps can be identical to that of Algorithm 1 until the extraction of the final level-set surface, which is now defined by the $0^{th}$ iso-contour of the Boolean difference between the outer and inner level-set. This surface can represent the lattice domain. In some implementations, the OpenVDB method can be used to extract the final level-set. Note that extraction of the final level-set in a form that is useable for the next stage can be performed using meshes, B-Rep or level-set space.

---

Algorithm 8 - Hybrid-hollow Topology Optimization

Input: (T, u, $t_{min}$, $t_{max}$, Ω, $D_v$, μ, $t_h$)
Output: ($Ω_l$)
// initiate level-set yi from design space
1. $\psi_0 = fSDF(Ω)$
// set initial lattice thickness
2. $t_0 = t_{min}, +0.75 (t_{max} − t_{min})$
// compute initial lattice volume fraction and obtain lattice constitutive model $D_l$ 3. $$x_l = \frac{\pi c_T t_0^2}{4u^2}$$

4. $D_l \leftarrow \int_{RVE}(T, u, x_l)$
// iterate until convergence tolerance c is met
5. i = 0
6. while i = 0 or $|J_i − J_{i−1}| > c$ do
// offset design level-set to create hollow level-set
7. $\psi_c := \{\psi_c(x) = \psi i(x) − t_h\}$
8. $\psi_d = \psi_i \backslash \psi_c$
// set constitutive model of FEA elements as lattice $D_l$ or void $D_v$ 9. $$K_e = \begin{cases} B^T D_l B & \text{if } \psi_d(e) \leq 0 \\ B^T D_v B & \text{if } \psi_d(e) > 0 \end{cases}$$

// formulate and solve FEA problem

10. $$K = \sum_e^n K_e$$

11. u = $K^{-1}$f
// // compute hollow shape derivative and advection velocity

12. $$v = \frac{1}{2}D \in (u): \in (u)dΩ$$

13. $v_c(x) = v(x) − I_c v (x − t_h n)(1 + t_h K_1(x) + t_h^2 K_2(x))$
// solve Hamilton-Jacobi and obtain new level-set $\psi_{i+1}$ 14. $$\frac{\partial \psi_i}{\partial t} − v|\nabla \psi_i| = 0$$

15. $\psi_{i+1} \leftarrow \psi_i$
// compute objective

16. $$J_{i+1} = \frac{1}{2}\int_Ω D \in (u): \in (u)dΩ$$

// increment iteration 17. i ← i + 1
18. end while
// obtain final hollow level-set
19. $\psi_c := \{\psi(x) = \psi_i(x) = t_h\}$
// obtain final lattice region 20. $$Ω_l \leftarrow = \int_{SDF}^T (\psi_{i+1} \backslash \psi_c)$$

---

Once the optimized topology of the hollow lattice region is obtained using algorithm 8, the hollow skin thickness optimization can take place using modified versions the skin thickness optimization algorithm (Algorithm 7) or the lattice-void hybrid topology optimization algorithm (Algorithm 4).

When using the latter, the inner level-set $\psi_c$ from the final iteration representing the cavity can be subject to topology optimization while keeping the outer shape constant. Note that the FEA element update rule in step 7 may need to be changed as follows given the inner level-set is of a negative sign inside the cavity and a positive sign in the domain $$K_e = \begin{cases} B^T D_l B & \text{if } \psi_c(e) \geq 0 \\ B^T D_v B & \text{if } \psi_c(e) < 0 \end{cases} \quad (59)$$

Other steps in Algorithm 4 can remain unchanged. This process can effectively optimize the shape of the cavity, resulting in a variable thickness hollow skin. Using Algorithm 7 can also require the following modification to the FEA element update rule in step 5, while other steps remain unchanged $$K_e = \begin{cases} B^T D_l B & \text{if } \psi_h(e) \leq 0 \\ B^T D_v B & \text{if } \psi_h(e) > 0 \end{cases} \quad (60)$$

The lattice thickness optimization stage can use an unmodified Algorithm 5. Note that the FEA model includes solid elements that can represent the design space. The presence of lattice can be accounted for by the use of a homogenized lattice representation, such lattice RVEs (see Homogenization above). Furthermore, note that while the detailed example above uses a level-set representation and level-set method, other macrostructure-type topology optimization systems and techniques can be used.

Hollow Topology Generation with Lattices for CAD Applications

FIG. 6A shows an example of a process (e.g., as performed by the CAD program(s) 116 of FIG. 1A) that optimizes a topology of lattice infill for a structure surrounding one or more hollow portions of a 3D model of an object being generatively designed for manufacture. Design criteria, boundary conditions and/or other design variables are obtained 600, e.g., by the CAD program(s) 116. This can involve receiving user input, e.g., via UI 122 on display device 120, importing information from another program or a third party source, and/or one or more of these inputs can be predefined in a given implementation.

The boundary conditions can be a mechanical problem definition and input solid(s) that are preserved for use as connection point(s) with other component(s) in a larger 3D model or separate 3D model(s). In some implementations, the obtaining 600 includes receiving input 600, e.g., via UI 122 on display device 120, indicating an initial 3D model defining at least a portion of the design space for topology optimization of the object. In some implementations, the user is enabled, e.g., via UI 122 on display device 120, to select multiple parts from an assembly shown in the UI, and the user is enabled to indicate loading points and keep away regions for the design. The software, e.g., CAD program(s) 116, can then use the inverse of these as the design space. Other inputs can also be received 600, such as a selected lattice topology and/or a hollow structure offset value input (e.g., a constant offset selected by a user of the CAD program(s) 116 used to define the hollow structure during topology optimization).

The design criteria can include one or more design objectives and one or more design constraints. Design objectives can include those that minimize one or more cost functions and/or that maximize one or more utility functions for the object to be manufactured. In some implementations, design objectives include one or more of the following: (1) minimizing material usage (e.g., waste material), (2) minimizing weight, (3) minimizing manufacturing time, (4) maximizing tool life, (5) maximizing ability to remove support material, (6) targeting a set natural frequency (e.g., higher/lower natural modes of vibration to achieve vibration damping), and (7) positioning and packing of parts within the structure (e.g., electronic components for circuit actuation, including reserving space for cabling between components in an assembly, limiting cabling length, and/or components for structural health monitoring, as well as assembly considerations to ensure each component can be added/removed independently or with a limited number of steps). Design constraints can include those that address manufacturing requirements and/or that address use requirements. In some implementations, design constraints include one or more of the following: (1) manufacturing constraints that restrict geometries to those that can be manufactured (e.g., minimum self-supporting angle for AM processes in which separate support material will not be used, subject to build direction when appropriate, or mechanical access constraints for AM or SM processes, such as 3-axis, 5-axis and/or 2.5-axis CNC constraints), (2) thermo-mechanical constraints, (3) material fraction or variation constraints, (4) structural integrity, (5) stiffness, (6) compliance, (7) stress criteria (e.g., Von Mises or Tsai-Wu stress for manufacturing or use), (8) physical constraints (non-interference with larger system of parts), and (9) damage constraints (e.g., brittle elastic fraction resistance). In some implementations, the design criteria include minimizing compliance with volume, stress, displacement, buckling safety factor, and/or natural frequency constraints, but the method(s) can be generalized to other design objectives and constraints, including minimizing volume, deviation (e.g., least square deviation) from a target (compliant mechanism), and/or design dependent loads (pressure loads).

In some implementations, a design space for an object to be manufactured, a setup for physical simulation of the object, at least one design objective for the object, and at least one design constraint for the object are obtained 600, e.g., by the CAD program(s) 116 of FIG. 1A. The physical simulation performed by the systems and techniques described in this document can simulate one or more physical properties and can use one or more types of simulation. For example, FEA, including linear static FEA, finite difference method(s), and material point method(s) can be used. Further, the simulation of physical properties can include, among other possibilities, simulating buckling, natural frequency, thermal, electric or electro-magnetic flux, and material solidification properties. Note that the setup for physical simulation(s) will be different for different physical simulation(s).

Both a three dimensional topology of a generative model for the object and one or more outer shapes of the three dimensional topology are iteratively modified 605, e.g., by the CAD program(s) 116, using a generative design process that represents the three dimensional topology of the generative model as one or more boundaries between one or more solid regions and one or more void regions within the design space. For example, this can include using gradient based algorithms to optimize the 3D topology and shape of the object model, or other algorithms, such as evolutionary algorithms and stochastic algorithms. Further, the generative model can be a level-set representation of the one or more outer shapes of the three dimensional topology, and a level-set method of topology optimization can be employed. In some implementations, the iterative modification 605 involves using the systems and techniques described above in connection with FIGS. 3A (Hybrid Hollow) and 6B-6D.

In a hybrid hollow approach to topology optimization, a homogenized lattice material representation is used, where the homogenized lattice material representation expresses stiffness of a lattice, which is composed of beams and void regions, as a function of lattice topology and volume fraction for the lattice, as described above, e.g., using RVEs corresponding to different lattice topologies. Note that volume fraction is a function of cell size and beam thickness, and additional lattice settings can be used, as noted above. Various approaches to producing RVEs can be used. In general, the homogenized lattice material representation can express structural behavior of a given lattice as an anisotropic solid material being a continuous material with properties approximately equivalent to the given lattice. Various homogenization methods can be used, such as numerical homogenization and analytical homogenization, and/or experimental data can be used to define the homogenized lattice material representation.

In some implementations, the iterative modification 605 includes adjusting 605A a volume fraction for a homogenized lattice material representation in accordance with a constitutive matrix for the homogenized lattice material representation of lattice topology. In some implementations, beam thickness is changed while keeping the unit size constant. In some implementations, the unit size is changed, but this can result in a lattice with mixed unit sizes, which can pose challenges during manufacturing. In some implementations, a uniform lattice is used during initial topology optimization.

In any case, a current iteration of the model being iteratively modified is changed 605B for physical simulation. This can involve, changing 605B a constitutive model for the physical simulation in accordance with a current iteration of the three dimensional topology and the one or more outer shapes of the three dimensional topology being offset inward to define a hollow structure in the three dimensional topology, and the homogenized lattice material representation with a uniform thickness of the beams in the lattice. For example, a Boolean difference operation can be performed 605B to define the hollow structure, and the homogenized lattice material representation is used within the 3D region of the Boolean difference.

In some implementations, the offset inward to define the hollow structure is a constant offset selected by a user of the computer aided design program, as noted above, thus setting the initial thickness of the hollow structure. In some implementations, the initial thickness is retrieved from a database of known good values for a given manufacturing process. In general, it is the manufacturing process that drives the minimum wall thickness. In any case, the homogenized lattice material representation is used in place of what would otherwise be solid material between the one or more outer shapes of the three dimensional topology and the inward offset thereof. Thus, a structure with interior hollow(s) and lattice surrounding those interior hollow(s), such as shown in FIG. 6D, can be generatively designed.

Physical simulation of the object is performed 605C using the changed constitutive model to produce a physical assessment with respect to the at least one design objective and the at least one design constraint. As noted above, various types of physical simulations can be used, and thus various types of physical assessments can be produced. In some implementations, performing 605C the physical simulation involves performing finite element analysis simulation using a body-fitted mesh based solver, and the constitutive model is changed 605B by mapping geometric field data and finite element simulation data between voxel grid points of a level-set representation of the generative model and elements of a solid mesh model used by the finite element analysis simulation. In some implementations, a solid mesh based simulation can be non-body fitted, e.g., solved using voxel solvers.

Shape change velocities are computed 605D for the one or more outer shapes of the three dimensional topology in the current iteration in accordance with the physical assessment. For example, this can involve computing 605D hollow shape derivative and advection velocity in accordance with lines 12 & 13 in Algorithm 8. Note that this is a place where the effects of different objectives and constraints come into play. In some implementations, computing 605D the shape change velocities involves using the augmented Lagrangian method described herein to compute advection velocities, such as when multiple shape derivatives are present.

Then, the generative model for the object is updated 605E using the shape change velocities before the next iteration. For example, the updating 605E can use the advection velocities from the augmented Lagrangian method (ALM). In some implementations, a level-set method is used, such as shown above in lines 14 & 15 in Algorithm 8. In some implementations, non-level-set surface manipulation, such as T-spline, or B-Rep control point movement or nodal movement in meshes, can be used.

After the modifying 605 completes changes to both the three dimensional topology and the one or more outer shapes of the three dimensional topology, a thickness of the hollow structure is adjusted 610, e.g., by the CAD program(s) 116, in accordance with the physical simulation, the at least one design objective and the at least one design constraint, while keeping the one or more outer shapes of the three dimensional topology constant. For example, see Algorithm 4 and Algorithm 7, and FIG. 6B.

In some implementations, adjusting 610 the thickness of the hollow structure includes, starting from one or more inner shapes of the hollow structure, iteratively modifying the one or more inner shapes of the three dimensional topology using the generative design process, including changing the constitutive model for the physical simulation in accordance with (i) a current iteration of the three dimensional topology and the one or more inner shapes and (ii) the homogenized lattice material representation, such that the thickness of the hollow structure varies across the three dimensional topology after modifying the one or more inner shapes is completed. In some implementations, a level-set method is used for optimizing the outer shape(s) and/or the inner shape(s) of the hollow structure.

Thus, the generative model can be a level-set representation of the one or more inner shapes and the one or more outer shapes of the three dimensional topology, and the generative design process can employ a level-set method of topology optimization to iteratively modify the one or more inner shapes and the one or more outer shapes of the three dimensional topology. In some implementations, other macrostructure representations can be used for generative design, where the generative design process represents the three dimensional topology of the generative model as one or more boundaries between one or more solid regions and one or more void regions within the design space. For example, other options for representing the hollow region outline include other surface modelling techniques. For example, the outer surface can be a mesh, T-spline, or B-Rep surface with a secondary inner surface created at a fixed offset, and the outer surface can be subject to shape optimization using classical shape optimization methods.

After the modifying 605 completes changes to both the three dimensional topology and the one or more outer shapes of the three dimensional topology and after the adjusting 610, a thickness of the beams in the lattice or a density of the lattice is adjusted 615, e.g., by the CAD program(s) 116, in accordance with the physical simulation, the at least one design objective and the at least one design constraint, while keeping both the one or more outer shapes of the three dimensional topology and the adjusted thickness of the hollow structure constant. For example, see the thickness optimization in step 10 of Algorithm 2 and Algorithm 5, and also see step 4 of Algorithm 5 where thickness is converted to equivalent density. Note that the lattice thickness optimization can be performed using density.

Further, in some implementations, (i) stress levels, (ii) ease of formation or removal of supporting material, (iii) ability to support or inhibit material formation during fabrication, and/or (iv) visibility of a hole for aesthetic considerations, can be identified 620 in different regions of the three dimensional topology of the hollow structure. Then, locations for one or more holes in the three dimensional topology of the hollow structure, for formation or removal of support material used during manufacturing, can be determined 625 based on the identified (i) stress levels, (ii) ease of formation or removal of supporting material, (iii) ability to support or inhibit material formation during fabrication, and/or (iv) visibility of the hole for aesthetic considerations, for a subset of the different regions as compared to remaining regions.

After the adjustments are made to the thickness of the hollow structure and the lattice (and potentially after one or more locations for one or more holes are determined) a three dimensional model of the object can be provided 630 in accordance with the three dimensional topology, the one or more outer shapes of the three dimensional topology, the adjusted thickness of the hollow structure and the adjusted lattice, for use in manufacturing a physical structure corresponding to the object using one or more computer-controlled manufacturing systems. This can involve providing 195 as described above in connection with FIG. 1B. Thus, providing 630 can include generating instructions (e.g., toolpath specifications) for additive manufacturing machine(s), subtractive manufacturing machine(s), or other machines, systems or devices. Note that the processes described are not required to be used with any particular manufacturing systems or techniques.

Further details for implementing macrostructure-type topology optimization systems and techniques, for hollow topology optimization and/or hybrid-hollow topology optimization, are now described with regard to shape derivatives for thick-shell representations.

Geometry

Let $\Sigma$ be a smooth, watertight, oriented surface in Euclidean space, with normal vector field $N_\Sigma$ pointing in the direction of "free space" outside of $\Sigma$. A solid object can be created out of $\Sigma$ by "thickening" it in the negative normal direction. That is: a small $h \in \mathbb{R}_+$ can be chosen to define $$\Omega_h := \{x - sN_\Sigma(x): \text{for all } x \in [0,h]\} \quad (61)$$

In plain English, $\Omega_h$ consists of all points sandwiched between $\Sigma$ and an offset of $\Sigma$ by a distance h in the negative normal direction, which is denoted $$\Sigma_h := \{x - hN_\Sigma(x): \text{for all } x \in \Sigma\} \quad (62)$$

The boundary $\partial \Omega_h$ of $\Omega_h$ consists of two disjoint surfaces: $\Sigma$ itself and the offset surface $\Sigma_h$.

Note that what is commonly referred to as the "outward" unit normal vector field of $\partial \Omega_h$ (which points from inside the solid material defined by $\Omega_h$ to outside the solid material) is equal to $N_\Sigma$ on $\Sigma$ but points in the opposite direction to $N_\Sigma$ on $\Sigma_h$. Its exact formula at $y \in \Sigma_h$ is $-N_\Sigma(\text{proj}_\Sigma(y))$ where $\text{proj}_\Sigma$ is the mapping that takes a point y to its closest point on $\Sigma$—so for example, if it is known that $y=x-hN_\Sigma(x)$ and h is sufficiently small, then $\text{proj}_\Sigma(y)=x$.

Deformations of the Geometry $\Sigma$ can be allowed to deform. The deformation can be generated by a surface normal speed function which can be denoted as $\theta^\perp: \Sigma \to \mathbb{R}$. Such a deformation can be achieved in a number of ways: for example, representing $\Sigma$ as the zero level set of a function on the background Euclidean space and using advection with respect to (an extension of) $\theta^\perp$. The methods can be equivalent to first order in the deformation. What matters is the infinitesimal variation of $\Sigma$ itself, which is precisely the surface normal speed function. Any deformation of $\Sigma$ will have a notion of the "magnitude" of the deformation, which is a positive scalar $\varepsilon$. For example, if the deformation is generated by advection, then the magnitude of the deformation corresponds to the advection time. The deformed surface can be denoted by $\Sigma_\varepsilon$.

Once $\Sigma$ deforms, then $\Sigma_h$ deforms as well. It is simply "dragged along" in such a way that the offset distance h is maintained between $\Sigma_\varepsilon$ and the deformed version of $\Sigma_h$. Consequently the deformation of the thickened object $\Omega_h$ is completely determined by the deformation of $\Sigma$. Note that it can be shown that the infinitesimal variation of $\Sigma_h$ at a point $y \in \Sigma_h$ is just $-\theta^\perp(\text{proj}_\tau(y))$ where $\text{proj}_\tau$ is the mapping that takes a point y to its closest point on $\Sigma$.

Optimization by Steepest Descent

An optimal $\Sigma$ can be found for some objective function $\Phi$: Surfaces $\to \mathbb{R}$ using a Steepest Descent method. This is based on the shape Taylor formula which says that the variation of $\Sigma$ by a magnitude $\varepsilon$ with respect to variations generated by some $\theta^\perp: \Sigma \to \mathbb{R}$ as above satisfies $$\Phi(\Sigma_\varepsilon) \approx \Phi(\Sigma) + \varepsilon D\Phi_\Sigma(\theta^\perp) \quad (63)$$

for sufficiently small $\varepsilon$, where $D\Phi_\Sigma(\Phi^\perp)$ symbolizes the shape derivative of $\Phi$ at $\Sigma$.

Using a formula for the shape derivative in terms of $\theta^\perp$, a particular $\theta^\perp$ can be chosen such that the shape derivative term in the shape Taylor formula is guaranteed to be negative. As a result, the objective function will decrease if $\Sigma$ is varied with respect to this chosen $\theta^\perp$, at least for a sufficiently small $\varepsilon$. After $\Sigma$ is updated by performing the variation (e.g., by advection of the level set function representing $\Sigma$), the updated shape represents an improvement with respect to the objective function. For further improvement, the procedure can be iteratively repeated until convergence occurs.

Shape Derivative for a Class of Objective Functions

Consider objective functions of the following form. Let $\Phi_0$: Domains $\to \mathbb{R}$ be some "volumetric" shape function (e.g., one which can be evaluated on a volumetric domain) such as a convex linear combination of the averaged structural compliance with respect to a set of load cases and the total mass. This allows definition of a "surface" shape function by $$\Phi(\Sigma) = \Phi_0(\Omega_h) \quad (64)$$

It can be assumed that it is known how to calculate the shape derivative of $\Phi_0$ at an arbitrary domain $\Omega$ and with respect to an arbitrary variation $\Omega_\in$ of $\Omega$ generated by a boundary normal speed function $V^\perp$: $\partial\Omega \to \mathbb{R}$ with respect to the outward unit normal vector field of $\Omega$. That is, $\Phi_0$ can be standard, meaning that the shape derivative satisfies the Hadamard-Zolésio structure theorem, and providing the formula $$\Phi_0(\Omega_\varepsilon) \approx \Phi_0(\Omega) + \varepsilon D\Phi_{0,\Omega}(\theta^\perp) \text{ where } D\Phi_{0,\Omega}(\theta^\perp) := \int_{\partial\Omega} G_\Omega(x) V^\perp(x) d\sigma(x) \quad (65)$$

for sufficiently small $\varepsilon$. The function $G_\Omega$ of $\Omega$ is known as the shape gradient of $\Phi_0$ at the shape $\Omega$. The precise form of $G_\Omega$ depends on $\Phi_0$ and can be worked out by calculating the derivative $$\frac{d}{d\varepsilon}$$

$\Phi_0(\Omega_\varepsilon)$, e.g., for averaged structural compliance and volume.

The shape derivative of $\Phi$ can be expressed in terms of the shape derivative of $\Phi_0$. This can be done by leveraging the above formula for the shape derivative of $\Phi_0$, applied to $\Omega_h$, almost exactly, and taking into account the nature of the boundary normal speed on the two disjoint surfaces making up $\partial\Omega_h$. That is: $\Sigma$ can have the boundary normal speed $V^\perp := \theta^\perp$, whereas $\Sigma_h$ can have the boundary normal speed $V^\perp := -\theta^\perp \circ \text{proj}_\Sigma$. Then, the first-order change in $\Phi$ under a variation $\Sigma_\varepsilon$ of $\Sigma$ generated by the normal speed function $\theta^\perp$ is given by $$\Phi(\Sigma_\varepsilon) \approx \Phi(\Sigma) + \varepsilon(\int_\Sigma G_{\Omega_h}(x)\theta^\perp(x)d\sigma(x) - \int_{\Sigma_h} G_{\Omega_h}(y)\theta^\perp(\text{proj}_\Sigma(y))d\sigma(y)) \quad (66)$$

Thus, the desired shape derivative formula is $$D\Phi_\Sigma(\theta^\perp) := \int_\Sigma G_{\Omega_h}(x)\theta^\perp(x)d\sigma(x) - \int_{\Sigma_h} G_{\Omega_h}(y)\theta^\perp(\text{proj}_\Sigma(y))d\sigma(y) \quad (67)$$

Note that y can be used as the dummy integration variable on $\Sigma_h$ simply to emphasize that the two integrals are over different spaces and cannot a priori be combined in any simple way.

Extracting a Descent Direction

Recall that the utility of the exact formula for the shape derivative is that it should allow $\theta^\perp$ to be chosen in such a way that the shape derivative becomes negative, resulting in a decrease of the objective function to first order according to the shape Taylor formula. It is, however, not immediately clear how to do this for the shape derivative of $\Phi$ calculated above. This is due to the fact that there are two competing terms (e.g., the integral over $\Sigma$ and the integral over $\Sigma_h$) and it is not clear how these balance out given $\theta^\perp$.

There are two ways to proceed. The first way is to apply the Hilbert space method of extracting a descent direction. The second way is to apply a change of variables to the integral over $\Sigma_h$, allowing it to be expressed as an integral over $\Sigma$. This is simple: recall that any point $y \in \Sigma_h$ can be written in the form $y = x - hN_\Sigma(x)$; for our purpose now, this should be viewed as a mapping from $\Sigma$ to $\Sigma_h$. Call this mapping n: $\Sigma \to \Sigma_h$, with $n(x) := x - hN_\Sigma(x)$. So by the change of variables formula for surface integrals $$\int_{\Sigma_h} G_{\Omega_h}(y)\theta^\perp(\text{proj}_\Sigma(y))d\sigma(y) = \int_{n(\Sigma)} G_{\Omega_h}(y)\theta^\perp(\text{proj}_\Sigma(y))d\sigma(y) \quad (68)$$

$$= \int_\Sigma G_{\Omega_h}(x - hN_\Sigma(x)) \quad (69)$$

$$\theta^\perp(\text{proj}_\Sigma(x - hN_\Sigma(x))) \text{Jac}(x)d\sigma(x)$$

$$= \int_\Sigma G_{\Omega_h}(x - hN_\Sigma(x))\theta^\perp(x) \quad (70)$$

$$\text{Jac}(x)d\sigma(x)$$

where Jac is the Jacobian of n and is based on the fact that $\text{proj}_\Sigma(x - hN_\Sigma(x)) = x$ for all $X \in \Sigma$.

It turns out that the Jacobian of n can be determined. With some help from differential geometry, it can be shown that $\text{Jac}(x) = 1 + hH_\Sigma(x) + h^2 K_\Sigma(X)$ where $H_\Sigma$ is the mean curvature of $\Sigma$ and $K_\Sigma$ is the Gauss curvature of $\Sigma$, providing $$D\Phi_\Sigma(\theta^\perp) = \int_\Sigma (G_{\Omega_h}(x) - G_{\Omega_h}(x - hN_\Sigma(x)))(1 + hH_\Sigma(x) + h^2 K_\Sigma(x)))\theta^\perp(x)d\sigma(x) \quad (71)$$

This manipulation of $D\Phi_\Sigma(\theta^\perp)$ provides a nice formula for the shape gradient of $\Phi$ at $\Sigma$, denoted as $$G_\Sigma(x) := G_{\Omega_h}(x) - G_{\Omega_h}(x - hN_\Sigma(x))(1 + hH_\Sigma(x) + h^2 K_\Sigma(x)). \quad (72)$$

Consequently, the choice of $\theta^\perp = -G_\Sigma$ makes $D\Phi_\Sigma(\theta^\perp)$ negative, as required for our steepest descent procedure updating $\tau$ towards optimality of $\Phi$.

Hole Generation for Hollow Structures

In addition to the above details for use in hollow topology optimization and/or hybrid-hollow topology optimization, the shape derivatives can be used to assist in post-processing of the generatively designed 3D model of the object, such as to address manufacturing considerations. With many manufacturing processes, it remains challenging to fabricate parts with hollow interior structures. Supporting material is often used to enable formation of raw material into the desire shape during manufacturing. For example, powder bed fusion (PBF) metal additive manufacturing (AM) may use metal particles or support structures, investment casting (IC) may use ceramic shells, and sand casting (SC) may use internal sand cores. Supporting material is often required to be present during manufacturing, then subsequently needs to be removed afterwards, as the supporting material would occupy the interior of the part during the manufacturing.

Figure 7A:
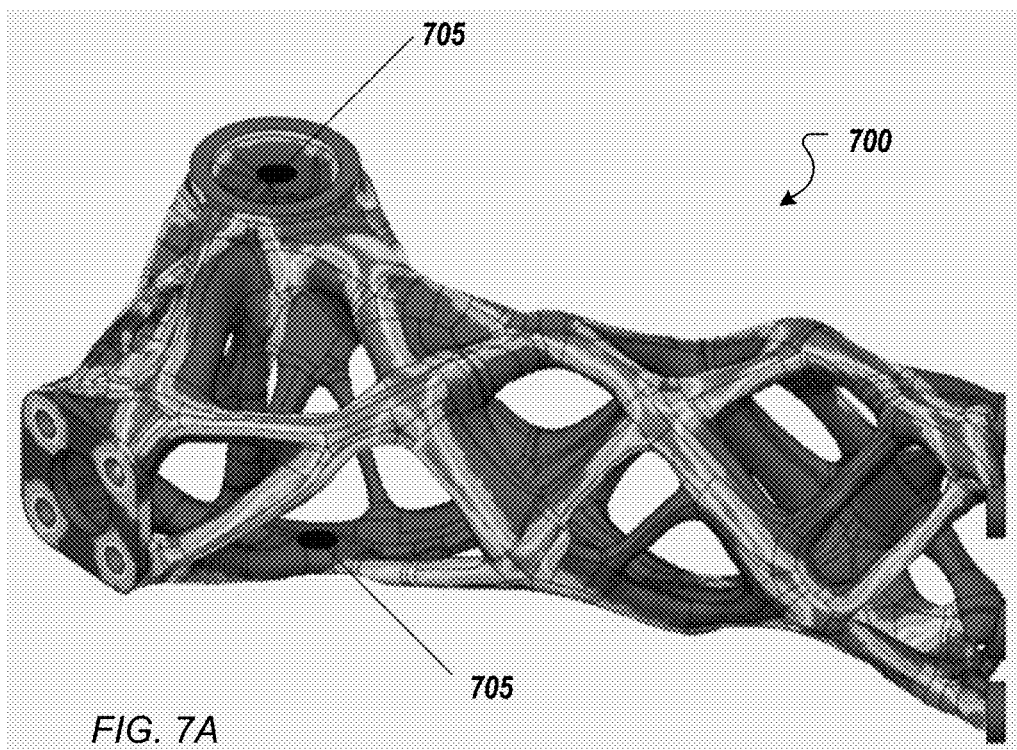
FIG. 7A shows an example of a generatively designed hollow part, where a heat map shows the load paths together with example hole locations in lower stress areas.

To enable the practical formation and removal of support material, holes can be automatically generated to punch through the exterior skin of hollow geometries, where these holes are placed in lower stress areas of the design. FIG. 7A shows an example of a generatively designed hollow part 700, where a heat map shows the load paths together with example hole locations 705 in lower stress areas. The examples of hole placement locations 705 indicate how holes can be situated in lower stress areas of the design, as indicated by the holes being in blue areas of the heat map, which correspond to lower stresses from load paths.

Considerations for hole placement can include, but are not limited to: (1) amount and location of Von Mises (VM) stress; (2) ease of formation or removal of supporting material; (3) ability to support or inhibit material formation during fabrication; and (4) visibility of the hole for aesthetic considerations. For a given hollow geometry, the topology-shape derivative can be used to find an optimum location to place a hole. The shape of this hole can then be optimized using shape optimization. An example objective for the above is compliance minimization. However additional objectives, such as a measure of the ability to remove supporting material out may be used as objectives or multiple objectives may be used.

Figure 7B:
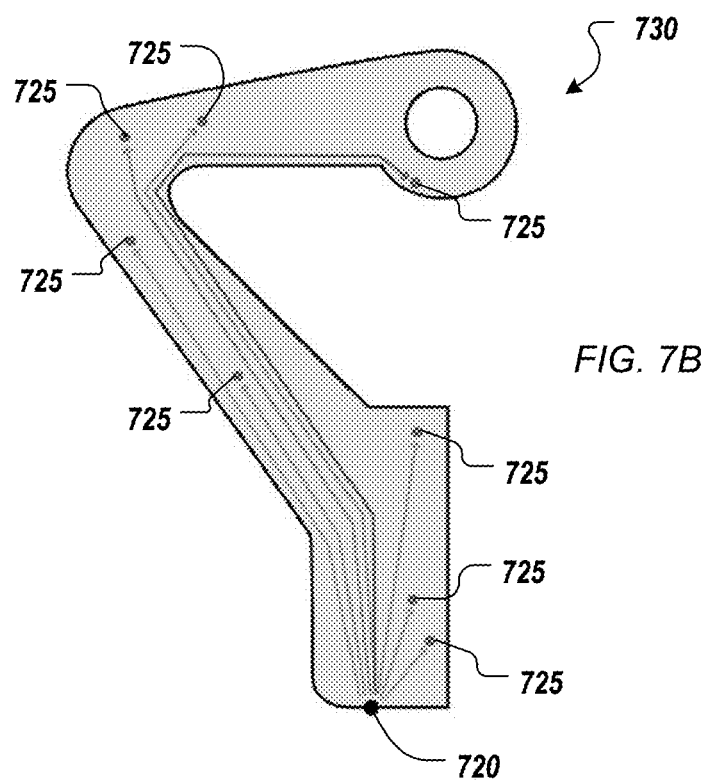
FIG. 7B shows a visualization of distances from a given hole to various points inside a geometry.

For example, the ability to extract material can be measured as follows. Initially, assume each internal cavity is filled with powder. Take any point on the surface (potential hole location). Now compute the shortest distance from a given particle to the hole location. For example, FIG. 7B shows a visualization of distances from a given hole 720 to various points 725 inside a hollow geometry 730. By computing this distance for all particles, and adding them up, the sum is an example measure of how easy it is to get the supporting material out. Computing this for all points on the surface, along with a surface gradient, can be done, and this objective and gradient can be combined with that of compliance minimization.

Thus, holes can be automatically generated in an optimized hollow shell for manufacturability reasons (e.g., additive manufacturing powder removal, supporting sand casting mold cores, etc). These holes can be placed automatically or semi-automatically as described above and have parameters, such as hole size, number of holes, etc. In some implementations, the hole placement process described above is performed by the CAD program(s) 116, and the user controls the hole parameters, e.g., through UI 112, as well as final approval of hole locations.

Augmented Lagrangian Algorithm for Constrained Shape Optimization

Introduction

An algorithm can be developed that solves constrained shape optimization problems where a shape function is to be minimized (e.g., volume or compliance) subject to a mix of equality and inequality constraints. These constraints can use shape functions (e.g., a target volume, an aggregated stress measure, or an aggregated displacement measure). A different algorithm can be used for dealing with non-aggregated (a.k.a. pointwise) constraints, such as the norm of the stress at each point of the shape. Generically, the optimization problems can be of the form $$\min_{\Omega \in Adm} F(\Omega, u_\Omega) \qquad (73)$$

$$s.t.\ G_E(\Omega, u_\Omega) = 0 \qquad (74)$$

$$G_I(\Omega, u_n) = 0 \qquad (75)$$

for $u_\Omega$ satisfying a linear elastic PDE in $\Omega$ where Adm is a set of admissible shapes, F is a scalar-valued shape-differentiable shape function, and $G_E$ and $G_I$ are vector-valued shape-differentiable shape functions that can depend explicitly on the shape, or implicitly on the shape through its elastic response under loads.

The Classical Augmented Lagrangian Algorithm

Equality Constraints

The augmented Lagrangian method in the classical setting of optimizing a scalar function of a vector variable can apply most simply to equality-constrained optimization problems of the form $$\min_{x \in \mathbb{R}^n} f(x) \qquad (76)$$

$$s.t.\ g_i(x) = 0 \text{ for } i = 1, \ldots, k$$

The augmented Lagrangian method is an enhancement of a so-called penalty method. The penalty method considers a penalized objective function $$L_c(x) := f(x) + \frac{c}{2} \sum_i [g_i(x)]^2$$

and a sequence $c := c_k$ tending to infinity. Then, one can define $x_k := \arg \min_x L_{c_k}(x)$. It is by no means the case that $g_i(x_k) = 0$ for any i. But since the increasing sequence of c-values penalizes the constraints more and more heavily, it can be expected that $x_k$ eventually satisfies the constraints, in the sense that if $x_k$ converges to $x_*$ then $g_i(x_*) = 0$ for all i. Additionally, it can be expected that $x_*$ is a solution of Equation 76.

A problem with the penalty method is that the increasing sequence of c-values can make it harder and harder to minimize $L_c(x)$ numerically due to poor conditioning. The augmented Lagrangian method can remedy this problem. This algorithm minimizes an "augmented Lagrangian"

$$L_c(x, \mu) := f(x) \sum_i \mu_k^i g_i(x) + \frac{c}{2} \sum_i [g_i(x)]^2 \qquad (77)$$

and also maintains a sequence of Lagrange multipliers $\mu n$ and increasing penalty parameters $c_k$. Again, one can define $x_k := \arg \min_x L_{c_k}(x, \mu_k)$. These sequences are updated in such a way that $c_k$ stabilizes on some large but finite value (hence avoiding the ill-conditioning inherent to general penalty methods). This occurs while $x_k$ converges to a solution $x_*$ of Equation 76 (it is thus optimal and feasible) and $\mu_k$ converges to the Lagrange multiplier $\mu_*$ associated to $x_*$ in the KKT conditions. Since the augmented Lagrangian method iterates on both the primal variable x and the "dual" variable $\mu$, this algorithm is an example of a primal-dual optimization method.

The general framework for the augmented Lagrangian algorithm can require a method to increase the penalty parameters and a method for tightening tolerances 1. Choose a final tolerance $T_{final}$.
2. Set k=0. Start with an initial tolerance $c_0$, $\mu_0$. Start with an initial tolerance $T_0$ less restrained than $T_{final}$.
3. While not converged to within tolerance $T_{final}$:
   a. Apply an unconstrained optimization algorithm to the problem $\min_x L_{c_k}(x, \mu_k)$. Stop the algorithm when a convergence to within tolerance $T_k$ is reached. Output $x_{k+1}$ to be the x-value at this level of convergence.
   b. Check constraint satisfaction
      (i) If the constraints are not satisfied to within tolerance $T_k$, let $c_{k+1} := $ Increase $(c_k)$ and $\mu_{k+1} := \mu_k$.
      (ii) If the constraints are satisfied to within tolerance $T_k$, update the Lagrange multipliers by $\mu_{k+1}^i := \mu_k^i + c_k g_i(x_{k+1})$.
   c. Set the tolerance $T_{k+i} := $ Tighten $(T_k)$.
   d. Increment k.

Note the feature of the above algorithm that is the update of the Lagrange multiplier. It can be understood as follows. The unconstrained minimum of the augmented Lagrangian at iteration k satisfies $\nabla L_{c_k}(x_k, \mu_k) = 0$ or $$\nabla f(x_k) + \Sigma_i (\mu_k^i + c_k g_i(x_k)) \nabla g_i(x_k) = 0 \qquad (78)$$

Of course, the solution $x_*$ and the Lagrange multipliers $\mu_*^i$ for the equality-constrained optimization Equation 76 satisfy $$\nabla f(x_*) + \Sigma_i \mu_*^i \nabla g_i(x_*) = 0 \qquad (79)$$

$$g_i(x_*) = 0 \text{ for } i=1, \ldots, k \qquad (80)$$

In the augmented Lagrangian algorithm, since it is desirable to ensure that the iterates $x_k$ converge to $x_*$, it is desirable to have $\mu_k^i \to \mu_*$ and $g_i(x_k) \to 0$ are consistent with this aim. Therefore, the Lagrange multiplier update can be construed as a fixed-point iteration scheme in the form $\mu_{k+1}^i := \mu_k^i + c_k g_i(x_{k+1})$ to achieve this.

Inequality Constraints

An elegant extension of the classical equality-constrained augmented Lagrangian algorithm to the classical inequality-constrained case can hinge on two facts. For fact 1, the problem $$\min_{x \in \mathbb{R}^n} f(x) \qquad (81)$$

$$\text{s.t. } g_i(x) \leq 0 \text{ for } i = 1, \ldots, k.$$

is equivalent to the problem $$\min_{(x, z) \in \mathbb{R}^n \times \mathbb{R}^k} f(x) \qquad (82)$$

$$\text{s.t. } g_i(x) + z_i^2 = 0 \text{ for } i = 1, \ldots, k$$

The new z-variables in Equation 82 are known as slack variables and satisfy $z_i = \sqrt{-g_i(x_*)}$ at the feasible optimum, where $x_*$ is the feasible optimum for Equation 81.

For fact 2, the augmented Lagrangian for Equation 82 is $$L_c(x, z, \mu) := f(x) + \sum_i \mu^i [g_i(x) + z_i^2] + \frac{c}{2} \sum_i [g_i(x) + z_i^2]^2 \qquad (83)$$

and the unconstrained optimization arising in the augmented Lagrangian algorithm can be decomposed and partially solved as follows:

$$\min_{(x, z) \in \mathbb{R}^n \times \mathbb{R}^k} L_c(x, z, \mu) = \min_{x \in \mathbb{R}^n} \min_{z \in \mathbb{R}^k} L_c(x, z, \mu) \qquad (84)$$

$$= \min_{x \in \mathbb{R}^n} f(x) +$$

$$\min_{x \in \mathbb{R}^k} \sum_i \mu^i [g_i(x) + z_i^2] +$$

$$\frac{c}{2} \sum_i [g_i(x) + z_i^2]^2$$

$$= \min_{x \in \mathbb{R}^n} f(x) + \qquad (85)$$

$$\sum_i \mu^i g_i^+(x, \mu^i, c) +$$

$$\frac{c}{2} \sum_i [g_i^+(x, \mu^i, c)]^2$$

which has introduced $$g_i^+(x, \mu, c) := \max\left\{ g_i(x), -\frac{\mu^i}{c} \right\}.$$

This is because the minimization can be performed over $z \in \mathbb{R}^n$ explicitly using elementary calculus techniques and phrase the result in terms of the $g_i^+$ function.

The upshot is that one can solve the inequality constrained Equation 81 by applying the augmented Lagrangian algorithm (see Equality Constraints above) to the modified Lagrangian function $$\tilde{L}_c(x, \mu) := f(x) + \sum_i \mu^i g_i^+(x, \mu^i, c) + \frac{c}{2} \sum_i [g_i^+(x, \mu^i, c)]^2 \qquad (86)$$

whose gradient (after some manipulation) is $$\nabla \tilde{L}_c(x, \mu) = \nabla f(x) + \Sigma_i \max\{0, \mu^i + c g_i(x)\} \nabla g_i(x). \qquad (87)$$

Note that for completeness, the solution of the minimization over the z-variables appears in Equation 84. Substituting for this solution yields Equation 85. For simplicity, the minimization over the z-variables is rephrased in the form $$\min_{z \in \mathbb{R}} a(s + z^2) + b(s + z^2)^2 \qquad (88)$$

where a, b, s are fixed parameters, which can be solved as follows.

The first step is to substitute $y := z^2$ and replace the above minimization problem by $\min_{y \in \mathbb{R}_+} a(s+y) + b(s+y)^2$. This new problem is now quite simple, since the function $\Phi := a(s+y) + b(s+y)^2$ is a simple parabola, and the problem $\min_{y \in \mathbb{R}_+} \Phi(y)$ finds the minimum of this parabola constrained to the region $y \geq 0$. Therefore the global constrained minimum is either at the global unconstrained minimum of $\Phi$ or else at the $y=0$ boundary of the constrained region, whichever is smaller. This results in either $y_* = -a/2b - s$, or $y_* = 0$; from which is selected the result for which $\Phi_* := \Phi(y_*)$ is least. Consequently $$\Phi_* = \min\{\Phi(0), \Phi(-a/2b - s)\} \qquad (89)$$

$$= \min\{as + bs^2, -a^2/4b\}$$

$$= a\max\{s, -a/2b\} + b[\max\{s, -a/2b\}]^2$$

after algebraic re-arrangement. With $s = g_i(x)$ and $a = \mu^i$ and $b = c/2$, Equation 85 is obtained.

Application to Constrained Shape Optimization Problems

The augmented Lagrangian algorithm can be applied to solve the Equations 73-75 with one scalar equality constraint and one scalar inequality constraint for simplicity. Then, $\Omega \in \text{Adm}$ can be interpreted to mean that $\Omega$ satisfies admissibility constraints of the following form. The surface of every $\Omega \in \text{Adm}$ contains pre-defined ports; every $\Omega \in \text{Adm}$ contains pre-defined keep-in regions; and every $\Omega \in \text{Adm}$ avoids pre-defined keep-out regions.

The classical augmented Lagrangian algorithm (see Equality Constraints above) can be mimicked for both equality and inequality constraints but can be adapted for shapes satisfying admissibility constraints. The augmented Lagrangian is defined as $$L_c(\Omega, \mu^E, \mu^I) := F(\Omega) + \mu^E G_E(\Omega) + \frac{c}{2}[G_E(\Omega)]^2 + \mu^I G_I^+(\Omega, \mu, c)^2 + \frac{c}{2}[G_I^+(\Omega, \mu, c)]^2 \quad (90)$$

with $G_I^+(\Omega, \mu, c) := \max\{G_I(\Omega), -\mu^I/c\}$. The dependence of F, $G_E$, $G_I$ on the solution of $\mu_\Omega$ of the linear elastic PDE has not been indicated for simplicity. To consider only shape functions that are surface or volume integrals of shape-dependent quantities, it is known from general principles that the shape gradient of a function L of this type, evaluated at a given shape $\Omega$, is a scalar-valued function of $\partial\Omega$ that is denoted as $dL(\Omega): \partial\Omega \to \mathbb{R}$. The shape gradient of the augmented Lagrangian at the shape $\Omega$ is $$dL_c(\Omega,\mu^E,\mu^I) = dF(\Omega) + (\mu^E + cG_E(\Omega))dG_E(\Omega) + \max\{0, \mu^I + cG_I(\Omega)\}dG_I(\Omega) \quad (91)$$

where $dF(\Omega)$, $dG_E(\Omega)$, $dG_I(\Omega)$ are the shape gradients of the objective and constraint function, respectively, at the shape $\Omega$.

It is also known from general principles that updating the shape $\Omega$ to reduce the value of $L_c$ while maintaining the admissibility constraint can be achieved by advecting the level set function representing $\Omega$ for a certain time (determined via a line-search or related procedure) with respect to a speed function constructed from an extension of a projection of the shape gradient of $L_c$ (e.g., the shape gradient of $L_c$ can be zeroed out appropriately when a violation of admissibility is detected and use the Adalsteinsson-Sethian velocity extension algorithm to extend the values of $dL_c(\Omega)$ from $\partial\Omega$, to a narrow band of $\partial\Omega$). This is the basis for an unconstrained, gradient-based shape optimization algorithm for solving the problem $\min_{\Omega \in Adm} L_c(\Omega, \mu^E, \mu^I)$ at any fixed values of c, $\mu^E$, $\mu^I$.

The augmented Lagrangian algorithm for solving Equations 73-75 can now be given as follows. It requires a method to increase the penalty parameters and a method for tightening tolerances.
1. Choose a final tolerance $T_{final}$
2. Set k=0. Start with initial $c_0$, $\mu_0^E$, $\mu_0^I$. Start with an initial tolerance $T_0$ less restrictive than $T_{final}$.
3. Initialize the shape $\Omega_0$.
4. While not converged to within tolerance $T_{final}$:
   a. Apply an unconstrained, gradient-based shape optimization algorithm to the problem $$\min_{\Omega \in Adm} L_{c_k}(\Omega, \mu_k^E, \mu_k^I)$$

until convergence occurs to within tolerance $T_k$. Output the shape $\Omega_{k+1}$ at this level of convergence
   b. Check constraint satisfaction.
      (i) If the constraints are not satisfied to within tolerance $T_k$, let $c_{k+1}$:=Increase ($c_k$) multipliers by $\mu_{k+1}^E$:=$\mu_k^E$ and $\mu_{k+1}^I$:=$\mu_k^I$.
      (ii) If the constraints are satisfied to within tolerance $T_k$, update the Lagrange multipliers by $\mu_{k+1}^E$:= $\mu_k^E + c_k G_E(\Omega_k)$ and $\mu_{k+1}^I$:=max $\{0, \mu_k^I + c_k G_I(\Omega_{k+1})\}$.
   c. Set the tolerance $T_{k+1}$:=Tighten ($T_k$).
   d. Increment k.

Figure 8:
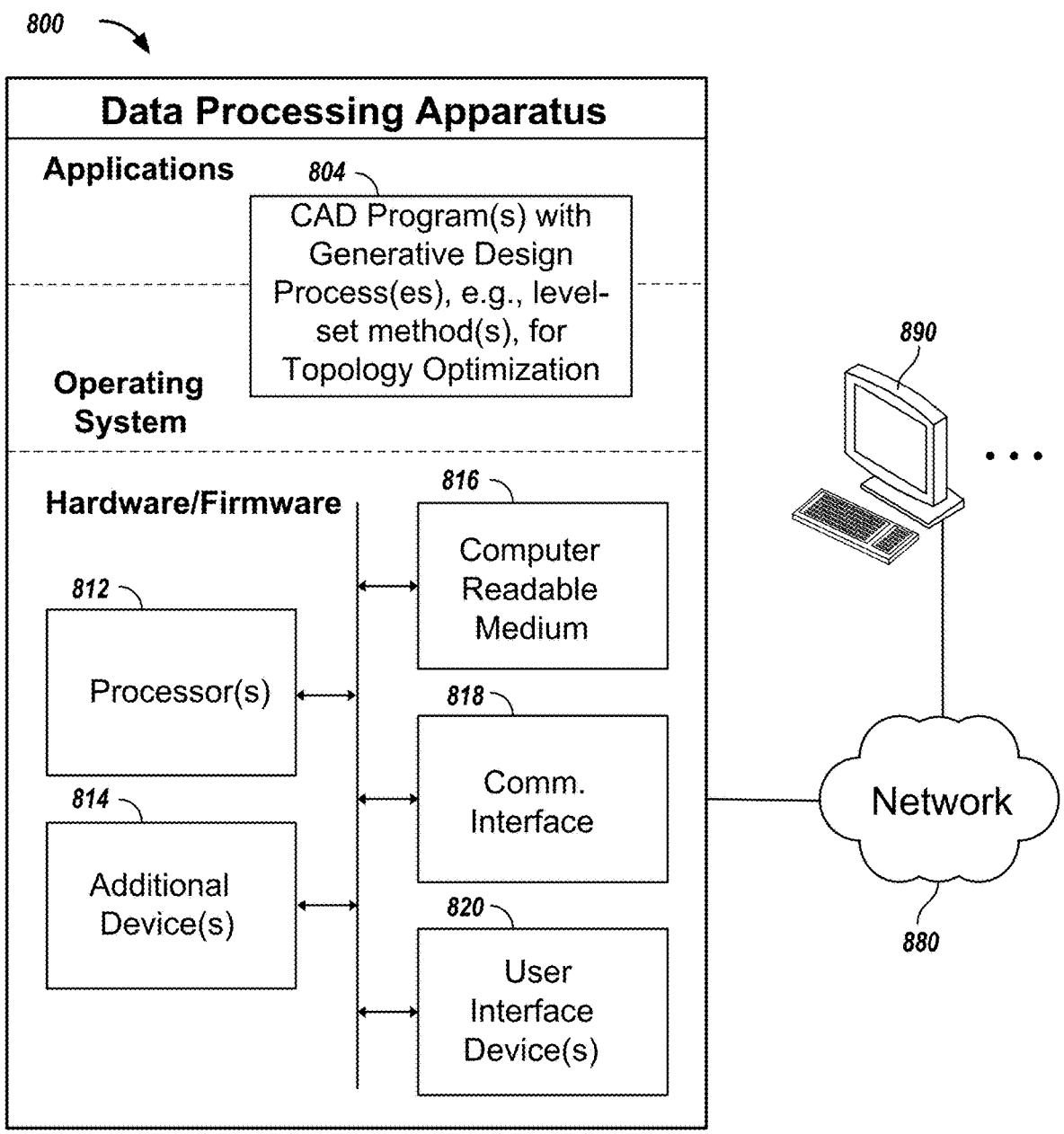
FIG. 8 is a schematic diagram of a data processing system including a data processing apparatus, which can be programmed as a client or as a server.

FIG. 8 is a schematic diagram of a data processing system including a data processing apparatus 800, which can be programmed as a client or as a server. The data processing apparatus 800 is connected with one or more computers 890 through a network 880. While only one computer is shown in FIG. 8 as the data processing apparatus 800, multiple computers can be used. The data processing apparatus 800 includes various software modules, which can be distributed between an applications layer and an operating system. These can include executable and/or interpretable software programs or libraries, including tools and services of one or more 3D modeling programs 804 that implement the systems and techniques described above. Thus, the 3D modeling program(s) 804 can be CAD program(s) 804 and can implement one or more generative design processes (e.g., using level-set based method(s) for generative design) for topology optimization and physical simulation operations (finite element analysis (FEA) or other). Further, the program(s) 804 can potentially implement manufacturing control operations (e.g., generating and/or applying toolpath specifications to effect manufacturing of designed objects). The number of software modules used can vary from one implementation to another. Moreover, the software modules can be distributed on one or more data processing apparatus connected by one or more computer networks or other suitable communication networks.

The data processing apparatus 800 also includes hardware or firmware devices including one or more processors 812, one or more additional devices 814, a computer readable medium 816, a communication interface 818, and one or more user interface devices 820. Each processor 812 is capable of processing instructions for execution within the data processing apparatus 800. In some implementations, the processor 812 is a single or multi-threaded processor. Each processor 812 is capable of processing instructions stored on the computer readable medium 816 or on a storage device such as one of the additional devices 814. The data processing apparatus 800 uses the communication interface 818 to communicate with one or more computers 890, for example, over the network 880. Examples of user interface devices 820 include a display, a camera, a speaker, a microphone, a tactile feedback device, a keyboard, a mouse, and VR and/or AR equipment. The data processing apparatus 800 can store instructions that implement operations associated with the program(s) described above, for example, on the computer readable medium 816 or one or more additional devices 814, for example, one or more of a hard disk device, an optical disk device, a tape device, and a solid state memory device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, e.g., after delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, a runtime environment, or a combination of one or more of them. In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a browser user interface through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, actions recited in the claims can be performed in a different order and still achieve desirable results.

What is claimed is:

1. A method comprising:
obtaining, by a computer aided design program, a design space for an object to be manufactured, a setup for physical simulation of the object, at least one design objective for the object, and at least one design constraint for the object;
iteratively modifying, by the computer aided design program, both a three dimensional topology of a generative model for the object and one or more outer shapes of the three dimensional topology using a generative design process that represents the three dimensional topology of the generative model as one or more boundaries between one or more solid regions and one or more void regions within the design space, wherein the modifying comprises
changing a constitutive model for the physical simulation in accordance with (i) a current iteration of the three dimensional topology and the one or more outer shapes of the three dimensional topology being offset inward to define an internal cavity of a hollow structure in the three dimensional topology and (ii) a homogenized lattice material representation that expresses stiffness of a lattice, which is composed of solid beams and lattice void regions, as a function of lattice topology and volume fraction for the lattice with a thickness of the beams in the lattice being uniform,
performing the physical simulation of the object using the changed constitutive model to produce a physical assessment with respect to the at least one design objective and the at least one design constraint,
computing shape change velocities for the one or more outer shapes of the three dimensional topology in the current iteration in accordance with the physical assessment, and
updating the generative model for the object with the generative design process using the shape change velocities;
adjusting, by the computer aided design program after the modifying completes changes to both the three dimensional topology and the one or more outer shapes of the three dimensional topology, a thickness of the hollow structure, by changing the internal cavity, in accordance with the physical simulation, the at least one design objective and the at least one design constraint, while keeping the one or more outer shapes of the three dimensional topology constant;
adjusting, by the computer aided design program after the modifying completes changes to both the three dimensional topology and the one or more outer shapes of the three dimensional topology, (i) the thickness of the beams in the lattice, or (ii) a density of the lattice, in accordance with the physical simulation, the at least one design objective and the at least one design constraint, while keeping both the one or more outer shapes of the three dimensional topology and the adjusted thickness of the hollow structure constant; and
providing, by the computer aided design program, a three dimensional model of the object in accordance with the three dimensional topology, the one or more outer shapes of the three dimensional topology, the adjusted thickness of the hollow structure and the adjusted lattice, for use in manufacturing a physical structure corresponding to the object using one or more computer-controlled manufacturing systems.

2. The method of claim 1, wherein the modifying comprises adjusting the volume fraction for the homogenized lattice material representation in accordance with a constitutive matrix for the homogenized lattice material representation of lattice topology.

3. The method of claim 1, wherein performing the physical simulation comprises performing finite element analysis simulation using a body-fitted mesh based solver, and the constitutive model is changed by mapping geometric field data and finite element simulation data between voxel grid points of a level-set representation of the generative model and elements of a solid mesh model used by the finite element analysis simulation.

4. The method of claim 1, wherein computing the shape change velocities comprises using an augmented Lagrangian method to compute advection velocities.

5. The method of claim 1, wherein adjusting the thickness of the hollow structure comprises, starting from one or more inner shapes defining the internal cavity of the hollow structure, iteratively modifying the one or more inner shapes of the three dimensional topology using the generative design process, including changing the constitutive model for the physical simulation in accordance with (i) a current iteration of the three dimensional topology and the one or more inner shapes and (ii) the homogenized lattice material representation, such that the thickness of the hollow structure varies across the three dimensional topology after modifying the one or more inner shapes is completed.

6. The method of claim 5, wherein the generative model comprises a level-set representation of the one or more inner shapes and the one or more outer shapes of the three dimensional topology, and the generative design process employs a level-set method of topology optimization to iteratively modify the one or more inner shapes and the one or more outer shapes of the three dimensional topology.

7. The method of claim 5, comprising:
identifying (i) stress levels, (ii) ease of formation or removal of supporting material, (iii) ability to support or inhibit material formation during fabrication, (iv) visibility of a hole for aesthetic considerations, or (v) a combination thereof, in different regions of the three dimensional topology of the hollow structure; and
determining locations for one or more holes in the three dimensional topology of the hollow structure, for formation or removal of support material used during manufacturing, based on the identified (i) stress levels, (ii) ease of formation or removal of supporting material, (iii) ability to support or inhibit material formation during fabrication, (iv) visibility of the hole for aesthetic considerations, or (v) a combination thereof, for a subset of the different regions as compared to remaining regions.

8. The method of claim 1, wherein the offset inward to define the internal cavity of the hollow structure is a constant offset selected by a user of the computer aided design program.

9. The method of claim 1, wherein the obtaining comprises receiving input indicating an initial three dimensional model defining at least a portion of the design space.

10. The method of claim 1, wherein the homogenized lattice material representation expresses structural behavior of a given lattice as an anisotropic solid material being a continuous material with properties approximately equivalent to the given lattice.

11. The method of claim 1, wherein the one or more computer-controlled manufacturing systems comprise an additive manufacturing machine, and the providing comprises:
generating toolpath specifications for the additive manufacturing machine from the three dimensional model; and
manufacturing the physical structure corresponding to the object with the additive manufacturing machine using the toolpath specifications.

12. A system comprising:
a non-transitory storage medium having instructions of a computer aided design program stored thereon; and
one or more data processing apparatus configured to run the instructions of the computer aided design program to
obtain a design space for an object to be manufactured, a setup for physical simulation of the object, at least one design objective for the object, and at least one design constraint for the object,
iteratively modify both a three dimensional topology of a generative model for the object and one or more outer shapes of the three dimensional topology using a generative design process that represents the three dimensional topology of the generative model as one or more boundaries between one or more solid regions and one or more void regions within the design space, wherein the iterative modification comprises: changing a constitutive model for the physical simulation in accordance with (i) a current iteration of the three dimensional topology and the one or more outer shapes of the three dimensional topology being offset inward to define an internal cavity of a hollow structure in the three dimensional topology and (ii) a homogenized lattice material representation that expresses stiffness of a lattice, which is composed of solid beams and lattice void regions, as a function of lattice topology and volume fraction for the lattice with a thickness of the beams in the lattice being uniform, performing the physical simulation of the object using the changed constitutive model to produce a physical assessment with respect to the at least one design objective and the at least one design constraint, computing shape change velocities for the one or more outer shapes of the three dimensional topology in the current iteration in accordance with the physical assessment, and updating the generative model for the object with the generative design process using the shape change velocities;
adjust, after the iterative modification completes changes to both the three dimensional topology and the one or more outer shapes of the three dimensional topology, a thickness of the hollow structure, by changing the internal cavity, in accordance with the physical simulation, the at least one design objective and the at least one design constraint, while keeping the one or more outer shapes of the three dimensional topology constant;
adjust, after the iterative modification completes changes to both the three dimensional topology and the one or more outer shapes of the three dimensional topology, (i) the thickness of the beams in the lattice, or (ii) a density of the lattice, in accordance with the physical simulation, the at least one design objective and the at least one design constraint, while keeping both the one or more outer shapes of the three dimensional topology and the adjusted thickness of the hollow structure constant; and
provide a three dimensional model of the object in accordance with the three dimensional topology, the one or more outer shapes of the three dimensional topology, the adjusted thickness of the hollow structure and the adjusted lattice, for use in manufacturing a physical structure corresponding to the object using one or more computer-controlled manufacturing systems.

13. The system of claim 12, wherein the iterative modification comprises adjusting the volume fraction for the homogenized lattice material representation in accordance with a constitutive matrix for the homogenized lattice material representation of lattice topology.

14. The system of claim 12, wherein performing the physical simulation comprises performing finite element analysis simulation using a body-fitted mesh based solver, and the constitutive model is changed by mapping geometric field data and finite element simulation data between voxel grid points of a level-set representation of the generative model and elements of a solid mesh model used by the finite element analysis simulation.

15. The system of claim 12, wherein computing the shape change velocities comprises using an augmented Lagrangian method to compute advection velocities.

16. The system of claim 12, wherein the one or more data processing apparatus are configured to run the instructions of the computer aided design program to adjust the thickness of the hollow structure by performing operations comprising: starting from one or more inner shapes defining the internal cavity of the hollow structure, iteratively modifying the one or more inner shapes of the three dimensional topology using the generative design process, including changing the constitutive model for the physical simulation in accordance with (i) a current iteration of the three dimensional topology and the one or more inner shapes and (ii) the homogenized lattice material representation, such that the thickness of the hollow structure varies across the three dimensional topology after modifying the one or more inner shapes is completed.

17. The system of claim 16, wherein the generative model comprises a level-set representation of the one or more inner shapes and the one or more outer shapes of the three dimensional topology, and the generative design process employs a level-set method of topology optimization to iteratively modify the one or more inner shapes and the one or more outer shapes of the three dimensional topology.

18. The system of claim 16, wherein the one or more data processing apparatus are configured to run the instructions of the computer aided design program to:
identify (i) stress levels, (ii) ease of formation or removal of supporting material, (iii) ability to support or inhibit material formation during fabrication, (iv) visibility of a hole for aesthetic considerations, or (v) a combination thereof, in different regions of the three dimensional topology of the hollow structure; and
determine locations for one or more holes in the three dimensional topology of the hollow structure, for formation or removal of support material used during manufacturing, based on the identified (i) stress levels, (ii) ease of formation or removal of supporting material, (iii) ability to support or inhibit material formation during fabrication, (iv) visibility of the hole for aesthetic considerations, or (v) a combination thereof, for a subset of the different regions as compared to remaining regions.

19. The system of claim 12, comprising an additive manufacturing machine, wherein the one or more data processing apparatus are configured to run the instructions of the computer aided design program to generate toolpath specifications for the additive manufacturing machine from the three dimensional model, and manufacture the physical structure corresponding to the object with the additive manufacturing machine using the toolpath specifications.

20. A non-transitory computer-readable medium encoding a computer aided design program operable to cause one or more data processing apparatus to perform operations comprising:
obtaining, by a computer aided design program, a design space for an object to be manufactured, a setup for physical simulation of the object, at least one design objective for the object, and at least one design constraint for the object;
iteratively modifying, by the computer aided design program, both a three dimensional topology of a generative model for the object and one or more outer shapes of the three dimensional topology using a generative design process that represents the three dimensional topology of the generative model as one or more boundaries between one or more solid regions and one or more void regions within the design space, wherein the modifying comprises
changing a constitutive model for the physical simulation in accordance with (i) a current iteration of the three dimensional topology and the one or more outer shapes of the three dimensional topology being offset inward to define an internal cavity of a hollow structure in the three dimensional topology and (ii) a homogenized lattice material representation that expresses stiffness of a lattice, which is composed of solid beams and lattice void regions, as a function of lattice topology and volume fraction for the lattice with a thickness of the beams in the lattice being uniform,
performing the physical simulation of the object using the changed constitutive model to produce a physical assessment with respect to the at least one design objective and the at least one design constraint,
computing shape change velocities for the one or more outer shapes of the three dimensional topology in the current iteration in accordance with the physical assessment, and
updating the generative model for the object with the generative design process using the shape change velocities;
adjusting, by the computer aided design program after the modifying completes changes to both the three dimensional topology and the one or more outer shapes of the three dimensional topology, a thickness of the hollow structure, by changing the internal cavity, in accordance with the physical simulation, the at least one design objective and the at least one design constraint, while keeping the one or more outer shapes of the three dimensional topology constant;
adjusting, by the computer aided design program after the modifying completes changes to both the three dimensional topology and the one or more outer shapes of the three dimensional topology, (i) the thickness of the beams in the lattice, or (ii) a density of the lattice, in accordance with the physical simulation, the at least one design objective and the at least one design constraint, while keeping both the one or more outer shapes of the three dimensional topology and the adjusted thickness of the hollow structure constant; and
providing, by the computer aided design program, a three dimensional model of the object in accordance with the three dimensional topology, the one or more outer shapes of the three dimensional topology, the adjusted thickness of the hollow structure and the adjusted lattice, for use in manufacturing a physical structure corresponding to the object using one or more computer-controlled manufacturing systems.

21. The non-transitory computer-readable medium of claim 20, wherein the modifying comprises adjusting the volume fraction for the homogenized lattice material representation in accordance with a constitutive matrix for the homogenized lattice material representation of lattice topology.

22. The non-transitory computer-readable medium of claim 20, wherein performing the physical simulation comprises performing finite element analysis simulation using a body-fitted mesh based solver, and the constitutive model is changed by mapping geometric field data and finite element simulation data between voxel grid points of a level-set representation of the generative model and elements of a solid mesh model used by the finite element analysis simulation.

23. The non-transitory computer-readable medium of claim 20, wherein computing the shape change velocities comprises using an augmented Lagrangian method to compute advection velocities.

24. The non-transitory computer-readable medium of claim 20, wherein adjusting the thickness of the hollow structure comprises, starting from one or more inner shapes defining the internal cavity of the hollow structure, iteratively modifying the one or more inner shapes of the three dimensional topology using the generative design process, including changing the constitutive model for the physical simulation in accordance with (i) a current iteration of the three dimensional topology and the one or more inner shapes and (ii) the homogenized lattice material representation, such that the thickness of the hollow structure varies across the three dimensional topology after modifying the one or more inner shapes is completed.

25. The non-transitory computer-readable medium of claim 24, wherein the generative model comprises a level-set representation of the one or more inner shapes and the one or more outer shapes of the three dimensional topology, and the generative design process employs a level-set method of topology optimization to iteratively modify the one or more inner shapes and the one or more outer shapes of the three dimensional topology.

26. The non-transitory computer-readable medium of claim 24, wherein the operations comprise:
identifying (i) stress levels, (ii) ease of formation or removal of supporting material, (iii) ability to support or inhibit material formation during fabrication, (iv) visibility of a hole for aesthetic considerations, or (v) a combination thereof, in different regions of the three dimensional topology of the hollow structure; and
determining locations for one or more holes in the three dimensional topology of the hollow structure, for formation or removal of support material used during manufacturing, based on the identified (i) stress levels, (ii) ease of formation or removal of supporting material, (iii) ability to support or inhibit material formation during fabrication, (iv) visibility of the hole for aesthetic considerations, or (v) a combination thereof, for a subset of the different regions as compared to remaining regions.

27. The non-transitory computer-readable medium of claim 20, wherein the offset inward to define the internal cavity of the hollow structure is a constant offset selected by a user of the computer aided design program.

28. The non-transitory computer-readable medium of claim 20, wherein the obtaining comprises receiving input indicating an initial three dimensional model defining at least a portion of the design space.

29. The non-transitory computer-readable medium of claim 20, wherein the homogenized lattice material representation expresses structural behavior of a given lattice as an anisotropic solid material being a continuous material with properties approximately equivalent to the given lattice.

30. The non-transitory computer-readable medium of claim 20, wherein the one or more computer-controlled manufacturing systems comprise an additive manufacturing machine, and the operations comprise:
   generating toolpath specifications for the additive manufacturing machine from the three dimensional model; and
   manufacturing the physical structure corresponding to the object with the additive manufacturing machine using the toolpath specifications.

* * * * *

UNITED STATES PATENT AND TRADEMARK OFFICE
CERTIFICATE OF CORRECTION

PATENT NO. : 10,635,088 B1
APPLICATION NO. : 16/256954
DATED : April 28, 2020
INVENTOR(S) : Konara Mudiyanselage Kosala Bandara et al.

Page 1 of 1

It is certified that error appears in the above-identified patent and that said Letters Patent is hereby corrected as shown below:

On the Title Page

Item [72], Lines 5 and 6:
Delete "Andriy Banadyga, Uxbridge (GB);" and insert --Andriy Banadyha, Uxbridge (GB);-- therefor.

Signed and Sealed this
Sixteenth Day of November, 2021

Drew Hirshfeld
*Performing the Functions and Duties of the
Under Secretary of Commerce for Intellectual Property and
Director of the United States Patent and Trademark Office*